US012662572B2

(12) United States Patent
Tanji et al.

(10) Patent No.: US 12,662,572 B2
(45) Date of Patent: Jun. 23, 2026

(54) FLUORINE-CONTAINING ETHER COMPOUND, METHOD FOR PRODUCING SAME, LUBRICANT FOR MAGNETIC RECORDING MEDIA, AND MAGNETIC RECORDING MEDIA

(71) Applicant: Resonac Corporation, Tokyo (JP)

(72) Inventors: Yutaka Tanji, Tokyo (JP); Tsuyoshi Kato, Tokyo (JP); Daisuke Yagyu, Tokyo (JP); Naoya Fukumoto, Tokyo (JP); Ayano Asano, Tokyo (JP); Natsumi Yoshimura, Tokyo (JP)

(73) Assignee: Resonac Corporation, Tokyo (JP)

( * ) Notice: Subject to any disclaimer, the term of this patent is extended or adjusted under 35 U.S.C. 154(b) by 0 days.

(21) Appl. No.: 18/861,332

(22) PCT Filed: Aug. 29, 2023

(86) PCT No.: PCT/JP2023/031187
§ 371 (c)(1),
(2) Date: Oct. 29, 2024

(87) PCT Pub. No.: WO2024/048569
PCT Pub. Date: Mar. 7, 2024

(65) Prior Publication Data

US 2025/0297063 A1    Sep. 25, 2025

(30) Foreign Application Priority Data

Aug. 31, 2022 (JP) ................................ 2022-137937

(51) Int. Cl.
*C08G 65/00* (2006.01)
*C10M 107/30* (2006.01)
(Continued)

(52) U.S. Cl.
CPC ......... *C08G 65/007* (2013.01); *C10M 107/30* (2013.01); *G11B 5/7257* (2020.08);
(Continued)

(58) Field of Classification Search
CPC ............. C08G 65/007; C08G 2650/48; C10M 107/30; C10M 2213/0606; G11B 5/7257; C10N 2040/18
See application file for complete search history.

(56) References Cited

U.S. PATENT DOCUMENTS

| | | | | |
|---|---|---|---|---|
| 9,911,447 B2 * | 3/2018 | Sagata | ................. | G11B 5/7257 |
| 11,332,686 B2 * | 5/2022 | Fukumoto | ............ | G11B 5/7257 |

(Continued)

FOREIGN PATENT DOCUMENTS

| | | |
|---|---|---|
| JP | 2007-231056 A | 9/2007 |
| JP | 6763980 B2 | 9/2020 |

(Continued)

*Primary Examiner* — Cephia D Toomer
(74) *Attorney, Agent, or Firm* — Sughrue Mion, PLLC

(57) ABSTRACT

A fluorine-containing ether compound represented by the following formula. $R^1—CH_2—R^{2a}—CH_2—R^{3a}—CH_2—R^{2b}—CH_2—R^{3b}—CH_2—R^{2c}—CH_2—R^{3c}—CH_2—R^{2d}—CH_2—R^4$ ($R^{2a}$, $R^{2b}$, $R^{2c}$ and $R^{2d}$ are each a perfluoropolyether chain, $R^{3a}$, $R^{3b}$, and $R^{3c}$ are each a divalent linking group having one or more polar groups, at least one of $R^{3a}$, $R^{3b}$, and $R^{3c}$ is represented by $—OCH_2CH(OH)CH_2O—$, and $R^1$ and $R^4$ are each a terminal group having 1 to 50 carbon atoms and one or more polar groups, and may be the same as or different from each other).

16 Claims, 2 Drawing Sheets

(51) Int. Cl.
*G11B 5/725* (2006.01)
*C10N 40/18* (2006.01)

(52) U.S. Cl.
CPC .................. *C08G 2650/48* (2013.01); *C10M 2213/0606* (2013.01); *C10N 2040/18* (2013.01)

(56) References Cited

U.S. PATENT DOCUMENTS

| | | | | |
|---|---|---|---|---|
| 11,421,172 | B2 * | 8/2022 | Hatta | C07C 43/225 |
| 11,820,742 | B2 * | 11/2023 | Fukumoto | C08G 65/14 |
| 2016/0260452 | A1 | 9/2016 | Pathem | |

FOREIGN PATENT DOCUMENTS

| | | | |
|---|---|---|---|
| WO | 2017/145995 | A1 | 8/2017 |
| WO | 2018/116742 | A1 | 6/2018 |
| WO | 2018/147017 | A1 | 8/2018 |
| WO | 2021/131961 | A1 | 7/2021 |
| WO | 2021/131993 | A1 | 7/2021 |
| WO | 2021/251335 | A1 | 12/2021 |

* cited by examiner

FLUORINE-CONTAINING ETHER COMPOUND, METHOD FOR PRODUCING SAME, LUBRICANT FOR MAGNETIC RECORDING MEDIA, AND MAGNETIC RECORDING MEDIA

TECHNICAL FIELD

The present invention relates to a fluorine-containing ether compound, a lubricant for a magnetic recording medium, and a magnetic recording medium.

This is a National Stage of International Application No. PCT/JP2023/031187 filed Aug. 29, 2023, claiming priority based on Japanese Patent Application No. 2022-137937 filed Aug. 31, 2022, the content of which is incorporated herein by reference.

BACKGROUND ART

Development of a magnetic recording medium suitable for a high recording density has been advanced in order to improve a recording density in a magnetic recording and reproducing device.

In the related art, as a magnetic recording medium, there is a magnetic recording medium in which a recording layer is formed on a substrate and a protective layer with carbon and the like is formed on the recording layer. The protective layer protects the information recorded in the recording layer and also improves the slidability of a magnetic head. However, the durability of the magnetic recording medium is not sufficiently obtained simply by providing the protective layer on the recording layer. Therefore, a lubricant is generally applied to a surface of the protective layer to form a lubricating layer.

As a lubricant used in a case of forming a lubricating layer of a magnetic recording medium, for example, a lubricant that contains a compound having a polar group such as a hydroxy group and an amino group at a terminal of a fluorine-based polymer having a repeating structure including $—CF_2—$ has been proposed.

For example, Patent Document 1 discloses a fluorine-containing ether compound having a skeleton where two perfluoropolyether chains are bonded to both ends of a glycerin structure ($—OCH_2CH(OH)CH_2O—$) through a methylene group ($—CH_2—$), in which terminal groups having a polar group are bonded to both terminals of the skeleton through the methylene group.

In addition, Patent Document 2 and Patent Document 3 disclose a fluorine-containing ether compound having a skeleton where three perfluoropolyether chains are bonded through a linking group having one polar group, in which terminal groups having a polar group are each bonded to both sides of the skeleton through a methylene group ($—CH_2—$).

In addition, Patent Document 4 discloses a fluorine-containing ether compound having a skeleton where three perfluoropolyether chains are bonded through a linking group having one or more polar groups, in which terminal groups having a polar group are bonded to both sides of the skeleton through methylene groups ($—CH_2—$).

In addition, Patent Document 5 discloses a fluorine-containing polymer in which a plurality of perfluoropolyether chains are linked by an aliphatic hydrocarbon chain having a polar group.

In addition, Patent Document 6 discloses a fluoropolyether compound in which a plurality of perfluoropolyether groups are linked through a linking group consisting of a hydrocarbon group having at least one hydroxy group, and terminal groups having at least one hydroxy group are arranged at both terminals.

CITATION LIST

Patent Documents

Patent Document 1: PCT International Publication No. WO2021/251335

Patent Document 2: PCT International Publication No. WO2018/116742

Patent Document 3: PCT International Publication No. WO2017/145995

Patent Document 4: United States Patent Application, Publication No. 2016/0260452

Patent Document 5: Japanese Unexamined Patent Application, First Publication No. 2007-231056

Patent Document 6: Japanese Patent No. 6763980

SUMMARY OF INVENTION

Technical Problem

In a magnetic recording and reproducing device, it is required to further reduce the floating amount of a magnetic head. Therefore, it is required to further reduce a thickness of a lubricating layer in the magnetic recording medium.

However, in general, in a case where the thickness of the lubricating layer is reduced, the corrosion resistance of the magnetic recording medium tends to be decreased. In addition, in a case where the thickness of the lubricating layer is reduced, the floating stability of a magnetic head may be insufficient.

The present invention has been made in view of the circumstances, and an object of the present invention is to provide a fluorine-containing ether compound which can form a lubricating layer having good floating stability of a magnetic head and a high corrosion suppressing effect of a magnetic recording medium, and can thus be suitably used as a material for a lubricant for a magnetic recording medium, and a method for producing the same.

Another object of the present invention is to provide a lubricant for a magnetic recording medium capable of forming a lubricating layer which includes the fluorine-containing ether compound of the present invention and has good floating stability of a magnetic head and a high corrosion suppressing effect on a magnetic recording medium.

Still another object of the present invention is to provide a magnetic recording medium, which includes a lubricating layer including the fluorine-containing ether compound of the present invention, and has good floating stability of a magnetic head and an excellent corrosion resistance.

Solution to Problem

The present invention includes the following aspects.

A first aspect of the present invention provides the following fluorine-containing ether compound.

[1]A fluorine-containing ether compound represented by Formula (1).

$$R^1—CH_2—R^{2a}—CH_2—R^{3a}—CH_2—R^{2b}—CH_2—R^{3b}—CH_2—R^{2c}—CH_2—R^{3c}—CH_2—R^{2d}—CH_2—R^4 \quad (1)$$

(in Formula (1), $R^{2a}$, $R^{2b}$, $R^{2c}$, and $R^{2a}$ are each a perfluoropolyether chain; $R^{2a}$, $R^{2b}$, $R^{2c}$, and $R^{2d}$ may be partially or entirely the same as or different from each other; $R^{3a}$, $R^{3b}$, and $R^{3c}$ are each a divalent linking group having one or more polar groups; $R^{3a}$, $R^{3b}$, and $R^{3c}$ may be partially or entirely the same as or different from each other; at least one of $R^{3a}$, $R^{3b}$, and $R^{3c}$ is represented by Formula (3); and $R^1$ and $R^4$ are each a terminal group having 1 to 50 carbon atoms and one or more polar groups, and may be the same as or different from each other)

$$-OCH_2CH(OH)CH_2O- \qquad (3)$$

It is preferable that the fluorine-containing ether compound of the first aspect of the present invention has the following features described in [2] to [12]. The features described in [2] to [12] are also preferably any of combinations of two or more thereof.

[2] The fluorine-containing ether compound according to [1], in which at least one of $R^1$ and $R^4$ in Formula (1) is a terminal group of any of Formulae (2-1) to (2-4).

(2-1)

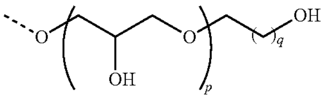

(2-2)

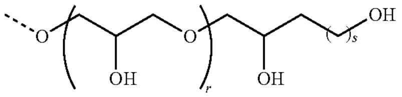

(2-3)

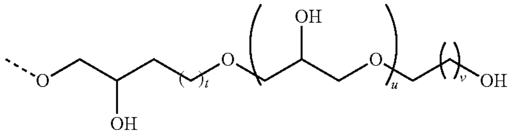

(2-4)

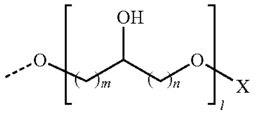

(in Formula (2-1), p represents an integer of 1 to 3, and q represents an integer of 1 to 3)

(in Formula (2-2), r represents an integer of 0 to 2, and s represents an integer of 1 to 3)

(in Formula (2-3), t represents an integer of 1 to 3, u represents an integer of 0 to 2, and v represents an integer of 1 to 3)

(in Formula (2-4), 1 represents an integer of 1 to 3, 1 pieces of m's each independently represent an integer of 1 to 4, and 1 pieces of n's each independently represent an integer of 1 to 4; and X represents an organic group including a double bond or a triple bond)

[3] The fluorine-containing ether compound according to [1] or [2], in which all of the polar groups contained in $R^{3a}$, $R^{3b}$, and $R^{3c}$ in Formula (1) are hydroxy groups.

[4] The fluorine-containing ether compound according to any one of [1] to [3], in which a total number of hydroxy groups contained in $R^1$ and hydroxy groups contained in $R^4$ in Formula (1) is 2 to 6.

[5] The fluorine-containing ether compound according to any one of [1] to [4], in which all of $R^{3a}$, $R^{3b}$, and $R^{3c}$ in Formula (1) are represented by Formula (3).

[6] The fluorine-containing ether compound according to any one of [1] to [4], in which one or two of $R^{3a}$, $R^{3b}$, and $R^{3c}$ in Formula (1) are divalent linking groups that are not Formula (3), and the divalent linking groups that are not Formula (3) are each independently a divalent linking group having one to three hydroxy groups and 4 to 9 carbon atoms.

[7] The fluorine-containing ether compound according to [6], in which the divalent linking groups that are not Formula (3) are each independently a linking group represented by any of Formulae (3-1) to (3-4).

(3-1)

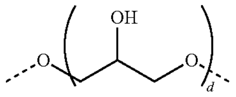

(3-2)

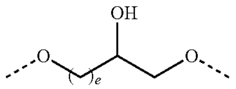

(3-3)

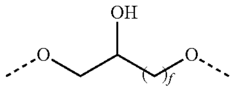

(3-4)

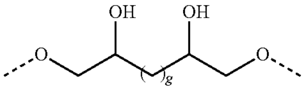

(in Formula (3-1), d represents 2 or 3)

(in Formula (3-2), e represents an integer of 2 to 4; in Formula (3-2), an oxygen atom on a left side is bonded to a methylene group on an $R^1$ side in Formula (1), and an oxygen atom on a right side is bonded to the methylene group on an $R^4$ side in Formula (1))

(in Formula (3-3), f represents an integer of 2 to 4; in Formula (3-3), an oxygen atom on a left side is bonded to the methylene group on the $R^1$ side in Formula (1), and an oxygen atom on a right side is bonded to the methylene group on the $R^4$ side in Formula (1))

(in Formula (3-4), g represents an integer of 0 to 4)

[8] The fluorine-containing ether compound according to any one of [1] to [7], in which in Formula (1), $R^{2a}$ and $R^{2d}$ are the same as each other, $R^{2b}$ and $R^{2c}$ are the same as each other, atoms included in $R^{3a}$ and atoms included in $R^{3c}$ are symmetrically arranged with respect to $R^{3b}$, and $R^1$ and $R^4$ are the same as each other.

[9] The fluorine-containing ether compound according to [5], in which $R^{2a}$, $R^{2b}$, $R^{2c}$, and $R^{2d}$ in Formula (1) are entirely the same as each other, all of $R^{3a}$, $R^{3b}$, and $R^{3c}$ are represented by Formula (3), and $R^1$ and $R^4$ are the same as each other.

[10] The fluorine-containing ether compound according to any one of [1] to [9], in which $R^{2a}$, $R^{2b}$, $R^{2c}$, and $R^{2d}$ in Formula (1) are each independently a perfluoropolyether chain represented by Formula (4).

$$-(CF_2)_{w1}-O-(CF_2O)_{w2}-(CF_2CF_2O)_{w3}-(CF_2CF_2CF_2O)_{w4}-(CF_2CF_2CF_2CF_2O)_{w5}-(CF_2)_{w6}- \qquad (4)$$

(in Formula (4), w2, w3, w4, and w5 each indicate an average degree of polymerization and each independently represent 0 to 20, provided that all of w2, w3, w4, and w5 are not 0 at the same time; w1 and w6 each indicate an average value of the number of $CF_2$'s and each independently represent 1 to 3; and ($CF_2O$), ($CF_2CF_2O$), ($CF_2CF_2CF_2O$), and ($CF_2CF_2CF_2CF_2O$), which are repeating units in Formula (4) are not particularly limited in the sequence order)

[11] The fluorine-containing ether compound according to any one of [1] to [9], in which $R^{2a}$, $R^{2b}$, $R^{2c}$, and $R^{2d}$ in Formula (1) are each independently any one selected from the perfluoropolyether chains represented by Formulae (4-1) to (4-4).

$$—CF_2—(OCF_2CF_2)_h—(OCF_2)_i—OCF_2— \quad (4\text{-}1)$$

(in Formula (4-1), h and i each indicate an average degree of polymerization, h represents 1 to 20, and i represents 0 to 20)

$$—CF_2CF_2—(OCF_2CF_2CF_2)_j—OCF_2CF_2— \quad (4\text{-}2)$$

(in Formula (4-2), j indicates an average degree of polymerization and represents 1 to 15)

$$—CF_2CF_2CF_2—(OCF_2CF_2CF_2CF_2)_k—OCF_2CF_2CF_2— \quad (4\text{-}3)$$

(in Formula (4-3), k indicates an average degree of polymerization and represents 1 to 10)

$$—(CF_2)_{w7}—O—(CF_2CF_2CF_2O)_{w8}—(CF_2CF_2O)_{w9}—(CF_2)_{w10}— \quad (4\text{-}4)$$

(in Formula (4-4), w8 and w9 each indicate an average degree of polymerization and each independently represent 1 to 20; and w7 and w10 are each an average value indicating the number of $CF_2$'s and each independently represent 1 or 2)

[12] The fluorine-containing ether compound according to any one of [1] to [11]

in which the fluorine-containing ether compound has a number-average molecular weight in a range of 500 to 10,000.

A second aspect of the present invention provides the following lubricant for a magnetic recording medium.

[13]A lubricant for a magnetic recording medium, including:

the fluorine-containing ether compound according to any one of [1] to [12].

A third aspect of the present invention provides the following magnetic recording medium.

[14]A magnetic recording medium including, in the following order, on a substrate, at least:

a magnetic layer;

a protective layer; and a lubricating layer, in which the lubricating layer includes the fluorine-containing ether compound according to any one of [1] to [12].

It is preferable that the magnetic recording medium according to the third aspect of the present invention has the following features described in [15].

[15] The magnetic recording medium according to [14], in which an average film thickness of the lubricating layer is 0.5 nm to 2.0 nm.

A fourth aspect of the present invention provides the following method for producing a fluorine-containing ether compound.

[16]A method for producing the fluorine-containing ether compound according to [1], the method including: an end part producing step of producing an intermediate compound 1a having a group corresponding to $R^1—CH_2—R^{2a}—CH_2—$ in Formula (1) and an intermediate compound 1b having a group corresponding to $—CH_2—R^{2a}—CH_2—R^4$ in Formula (1); a linked structure producing step of producing an intermediate compound 3 having a group corresponding to $—R^{3a}—CH_2—R^{2b}—CH_2—R^{3b}—CH_2—R^{2c}—CH_2—R^{3c}—$ in Formula (1); and a compound structure producing step including an $R^1$-side reaction step of reacting an $R^{3a}$-side end part of the intermediate compound 3 with the intermediate compound 1a, and an $R^4$-side reaction step of reacting an $R^{3c}$-side end part of the intermediate compound 3 with the intermediate compound 1b, in which the linked structure producing step includes a linking end part producing step of producing an intermediate compound 2a having a group corresponding to $—R^{3a}—CH_2—R^{2b}—CH_2—$ in Formula (1) and an intermediate compound 2b having a group corresponding to $—CH_2—R^{2c}—CH_2—R^{3c}—$ in Formula (1), an $R^{2b}$-side reaction step of reacting an $R^{2b}$-side end part of a compound having a group corresponding to $R^{3b}$ in Formula (1) with the intermediate compound 2a, and an $R^{2c}$-side reaction step of reacting an $R^{2c}$-side end part of the compound having a group corresponding to $R^{3b}$ with the intermediate compound 2b.

It is preferable that the method for producing a fluorine-containing ether compound of the fourth aspect of the present invention has the following features described in [17].

[17] The method for producing a fluorine-containing ether compound according to [16], in which in Formula (1), $R^{2a}$ and $R^{2d}$ are the same as each other, $R^{2b}$ and $R^{2c}$ are the same as each other, atoms included in $R^{3a}$ and atoms included in $R^{3c}$ are symmetrically arranged with respect to $R^{3b}$, and $R^1$ and $R^4$ are the same as each other, in the end part producing step, the intermediate compound 1a and the intermediate compound 1b are produced at the same time, in the linking end part producing step, the intermediate compound 2a and the intermediate compound 2b are produced at the same time, and the $R^{2b}$-side reaction step and the $R^{2c}$-side reaction step are performed at the same time, and in the compound structure producing step, the $R^1$-side reaction step and the $R^4$-side reaction step are performed at the same time.

Advantageous Effects of Invention

The fluorine-containing ether compound of the present invention is a compound represented by Formula (1) and is suitable as a material for a lubricant for a magnetic recording medium.

According to the method for producing a fluorine-containing ether compound of the present invention, it is possible to produce the compound represented by Formula (1).

The lubricant for a magnetic recording medium of the present invention includes the fluorine-containing ether compound of the present invention. Therefore, the lubricant for a magnetic recording medium of the present invention can be evenly applied with thin thickness, and can form a lubricating layer of thin thickness, good floating stability of a magnetic head, and a high corrosion suppressing effect on a magnetic recording medium.

The magnetic recording medium of the present invention includes a lubricating layer including the fluorine-containing ether compound of the present invention. The lubricating layer contained in the magnetic recording medium of the present invention makes it possible to obtain good floating stability of a magnetic head and to effectively suppress the corrosion of the magnetic recording medium even in a case where the thickness is small. Therefore, in the magnetic recording medium of the present invention, the thickness of the lubricating layer can be reduced and the floating amount of the magnetic head can be reduced. In addition, the magnetic recording medium of the present invention has a lubricating layer which has good floating stability of a magnetic head and a high corrosion suppressing effect on a magnetic recording medium, and thus, has excellent reliability and durability.

DESCRIPTION OF EMBODIMENTS

Figure 1:
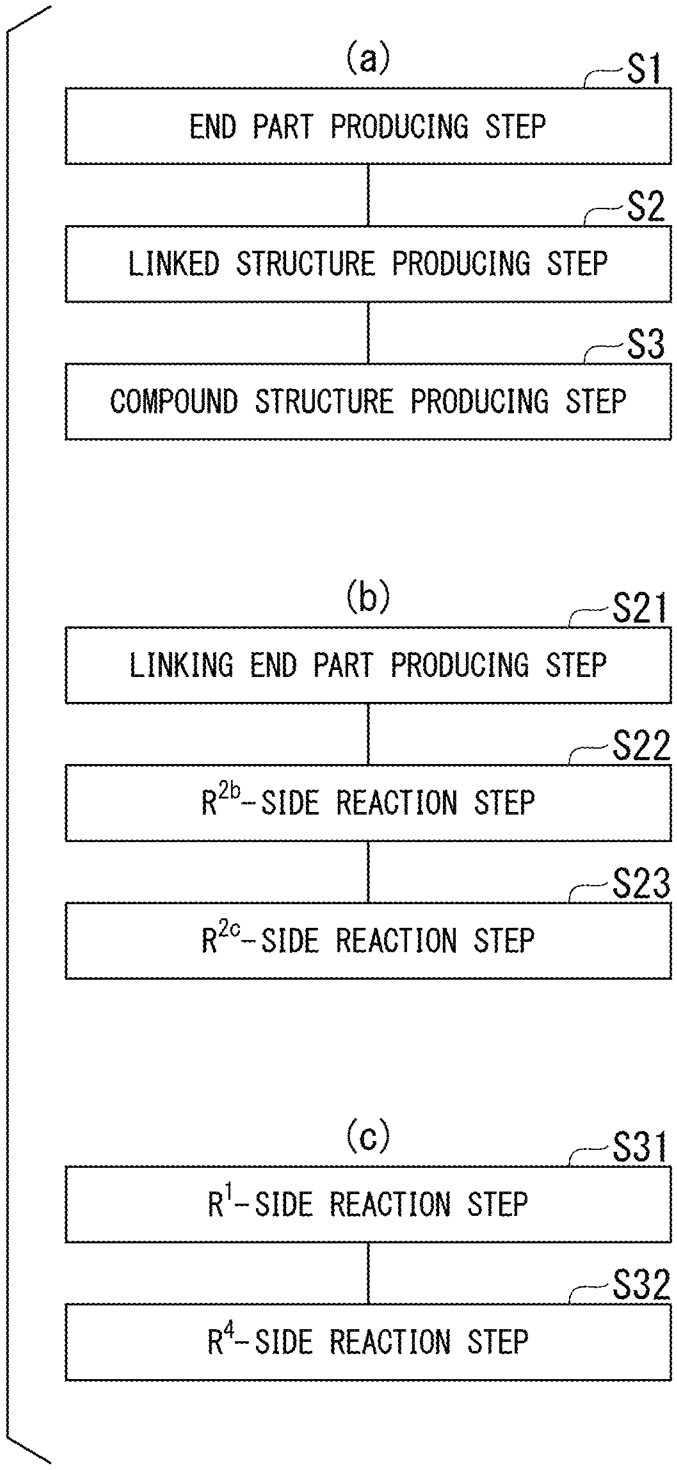
FIG. 1 is a flowchart for showing an example of the method for producing a fluorine-containing ether compound of the present invention.

The present inventors have conducted extensive research as shown below in order to accomplish the objects.

In the related art, a fluorine-containing ether compound having polar groups such as a hydroxy group at a terminal of a chain-like structure has been preferably used as a material for a lubricant for a magnetic recording medium (which may hereinafter be simply referred to as a "lubricant") which is applied onto a surface of a protective layer. The polar groups in the fluorine-containing ether compound are bonded to active points on the protective layer to improve the adhesion of the lubricating layer to the protective layer. Thus, a fluorine-containing ether compound having polar groups not only at a central portion of a chain-like structure but also at a terminal of the chain-like structure is particularly preferably used as a material for the lubricant.

However, in a case where a lubricating layer of thin thickness is formed on the protective layer using the lubricant in the related art, as shown below, it is difficult to realize a lubricating layer having good floating stability of a magnetic head and a high corrosion suppressing effect on a magnetic recording medium.

That is, in a case where a lubricant is applied onto a protective layer to form a thin lubricating layer, and the adhesion of the lubricant to the protective layer is insufficient, a state of the lubricant applied onto the protective layer is bulky and it is difficult to evenly apply the lubricant onto the protective layer. Therefore, in a case where the thickness of the lubricating layer is reduced, a protrusion or the like is likely to be formed in the lubricating layer and the floating stability of the lubricating layer is insufficient. In addition, in a case where a coating state of the lubricating layer on the protective layer is uneven, the corrosion suppressing effect by the lubricating layer is not sufficiently obtained. Therefore, in a case where the adhesion of the lubricant to the protective layer was insufficient, it was not possible to obtain sufficient floating stability and corrosion resistance unless the film thickness was increased and the coating state of the lubricating layer on the protective layer was made even.

Therefore, the present inventors have focused on a bond between a polar group included in the fluorine-containing ether compound and an active point on the protective layer. Thus, the present inventors have conducted extensive research in order to realize a fluorine-containing ether compound which is not likely to generate polar groups that are not involved in bonding to an active point on the protective layer, and can form a lubricating layer having good adhesion to the protective layer, providing an even coating state with respect to the protective layer even in a case where the thickness is small, having high floating stability of a magnetic head and a high corrosion suppressing effect on a magnetic recording medium.

As a result, it was found that the compound may be a fluorine-containing ether compound having a skeleton where four perfluoropolyether chains are bonded through divalent linking groups having one or more polar groups, each interposed between two methylene groups ($—CH_2—$), in which at least one of three linking groups included in the skeleton has a glycerin structure ($—OCH_2CH(OH)CH_2O—$), and terminal groups having one or more polar groups and 1 to 50 carbon atoms are bonded to both sides of the skeleton through a methylene group ($—CH_2—$).

In such a fluorine-containing ether compound, polar groups that are not bonded to a functional group (active point) present in large numbers on the protective layer are not likely to be generated for the following reasons, and thus, the fluorine-containing ether compound has good adhesion to the protective layer. Thus, it is presumed that the fluorine-containing ether compound can form a lubricating layer having an even coating state even in a case where the thickness is small.

That is, in the fluorine-containing ether compound, the perfluoropolyether chains are each arranged among the three divalent linking groups in the fluorine-containing ether compound, and between the divalent linking group and the two terminal groups. Therefore, the distance among the polar groups contained in the adjacent divalent linking groups, and the distance between the polar group contained in the terminal group and the polar group contained in the divalent linking group adjacent to the terminal group are appropriate. In addition, at least one of the three divalent linking groups is a glycerin structure ($—OCH_2CH(OH)CH_2O—$) having excellent flexibility. The oxygen atoms arranged at both end parts of the glycerin structure form an ether bond ($—O—$) with methylene groups ($—CH_2—$) arranged on both sides thereof. These two ether bonds impart moderate flexibility to the fluorine-containing ether compound, and increase the affinity between the fluorine-containing ether compound with one hydroxy group contained in the glycerin structure and the protective layer.

In this way, in the fluorine-containing ether compound, since the distance among the polar groups contained in the two terminal groups and the three divalent linking groups is appropriate, the polar groups contained in the two terminal groups and the three divalent linking groups are not likely to be aggregated and the polar groups which are not bonded to the active point on the protective layer are not likely to be generated. In addition, both end parts of the four perfluoropolyether chains each closely adhere to the protective layer by a polar group contained in the terminal group and/or the divalent linking group. Furthermore, one hydroxy group ($—OH$) contained in at least one glycerin structure ($—OCH_2CH(OH)CH_2O—$) included in the fluorine-containing ether compound is to cause the fluorine-containing ether compound and the protective layer to adhere to each other. Thus, a state of the fluorine-containing ether compound applied onto the protective layer is not likely to be bulky and the fluorine-containing ether compound is likely to wet-spread on the protective layer. As a result, it is presumed that the fluorine-containing ether compound can form a lubricating layer having an even coating state even in a case where the thickness is small.

Furthermore, the present inventors have confirmed that by using the lubricant including the fluorine-containing ether compound, it is possible to form a lubricating layer having good floating stability of a magnetic head and a high corrosion suppressing effect on a magnetic recording medium even in a case where the thickness is small, thereby leading to the present invention.

Hereinafter, preferred examples of the fluorine-containing ether compound, the method for producing the same, the lubricant for a magnetic recording medium, and the magnetic recording medium of the present invention will be described in detail. Furthermore, the present invention is not limited to embodiments shown below. In the present invention, numbers, amounts, positions, ratios, materials, configurations, the types, the orders, and the like may be modified, added, omitted, or substituted to an extent that the gist of the present invention is maintained.

[Fluorine-Containing Ether Compound]

The fluorine-containing ether compound of the present embodiment is represented by Formula (1).

$$R^1—CH_2—R^{2a}—CH_2—R^{3a}—CH_2—R^{2b}—CH_2—R^{3b}—CH_2—R^{2c}—CH_2—R^{3c}—CH_2—R^{2d}—CH_2—R^4 \quad (1)$$

(in Formula (1), $R^{2a}$, $R^{2b}$, $R^{2c}$, and $R^{2d}$ are each a perfluoropolyether chain; $R^{2a}$, $R^{2b}$, $R^{2c}$, and $R^{2d}$ may be partially or entirely the same as or different from each other; $R^{3a}$, $R^{3b}$, and $R^{3c}$ are each a divalent linking group having one or more polar groups; $R^{3a}$, $R^{3b}$, and $R^{3c}$ may be partially or entirely the same as or different from each other; at least one of $R^{3a}$, $R^{3b}$, and $R^{3c}$ is represented by Formula (3); and $R^1$ and $R^4$ are each a terminal group having 1 to 50 carbon atoms and one or more polar groups, and may be the same as or different from each other)

$$—OCH_2CH(OH)CH_2O— \quad (3)$$

The fluorine-containing ether compound of the present embodiment has three divalent linking groups having one or more polar groups, represented by $R^{3a}$, $R^{3b}$, and $R^{3c}$ (which may hereinafter be collectively referred to as "$R^3$"), and has four perfluoropolyether chains (which may hereinafter be collectively referred to as "PFPE chains") represented by $R^{2a}$, $R^{2b}$, $R^{2c}$, and $R^{2d}$ (which may hereinafter be collectively referred to as "$R^2$"), as shown in Formula (1). As shown in Formula (1), a methylene group and a terminal group represented by $R^1$ or $R^4$ are bonded in this order on both sides of the skeleton formed by the bonding of four perfluoropolyether chains $R^2$ through the divalent linking groups $R^3$, each interposed between two methylene groups.

The fluorine-containing ether compound of the present embodiment has a structure where a divalent linking group $R^{3b}$ having one or more polar groups is arranged as the center, and PFPE chains ($R^{2b}$ and $R^{2c}$), divalent linking groups ($R^{3a}$ and $R^{3c}$), and PFPE chains ($R^{2a}$ and $R^{2d}$) are each arranged in this order on both sides thereof, in which terminal groups ($R^1$ or $R^4$) are each arranged on both sides of the skeleton. Therefore, the fluorine-containing ether compound of the present embodiment makes it possible to easily obtain a lubricating layer that has good adhesion to the protective layer, is easily wet-spread evenly on the protective layer, and has an even film thickness even in a case where the thickness is small.

On the other hand, for example, since in a compound having two PFPE chains, which has a skeleton where the PFPE chains are each arranged on both sides of a divalent linking group having one or more polar groups, and a compound having three PFPE chains, which has a skeleton where the PFPE chain is arranged at the center, and divalent linking groups having one or more polar groups and a PFPE chain are arranged in this order on both sides thereof, the number of the linking groups contained in the skeleton is small, the adhesion to the protective layer is insufficient. As a result, wet-spreading is not likely to occur on the protective layer and a coating state of the fluorine-containing ether compound with respect to the protective layer is likely to be uneven. In addition, since in a compound having a skeleton where the PFPE chains and the divalent linking groups having one or more polar groups are alternately arranged, in which the skeleton is composed of five or more PFPE chains and four or more divalent linking groups, the entire molecule is larger and the motion is decreased, whereby the compound is not likely to wet-spread on the protective layer. Therefore, a compound having a skeleton consisting of five or more PFPE chains and four or more divalent linking groups is also likely to have an uneven coating state of the fluorine-containing ether compound with respect to the protective layer.

(Divalent Linking Group Represented by $R^3$ ($R^{3a}$, $R^{3b}$, and $R^{3c}$))

In the fluorine-containing ether compound represented by Formula (1), three $R^3$'s are each a divalent linking group having one or more polar groups. At least one of the three $R^3$'s is represented by Formula (3). In the present specification, the linking group represented by Formula (3) may be referred to as a "glycerin structure". $R^3$ is each arranged among the four PFPE chains represented by $R^2$. As a result, $R^3$ causes the fluorine-containing ether compound and the protective layer to adhere to each other, and thus, a thin lubricating layer having a sufficient coating rate is formed.

In Formula (1), three $R^3$'s may be partially or entirely the same as or different from each other. At least one of the three $R^3$'s is Formula (3), it is preferable that two of the three $R^3$'s are Formula (3), and it is more preferable that all of the three $R^3$'s are Formula (3). In a case where two of the three $R^3$'s are Formula (3), the adhesion between the fluorine-containing ether compound and the protective layer is even better. In addition, in a case where two of the three $R^3$'s are Formula (3), it is preferable that $R^{3a}$ and $R^{3c}$ are Formula (3). This is because the coating state of the fluorine-containing ether compound with respect to the protective layer is further even. In a case where all of the three $R^3$'s ($R^{3a}$, $R^{3b}$, and $R^{3c}$) are each Formula (3), the coating state of the fluorine-containing ether compound with respect to the protective layer is further even, and a lubricating layer having higher floating stability of a magnetic head and higher corrosion suppressing effect on a magnetic recording medium can be formed.

The divalent linking group represented by $R^3$ is preferably a group having oxygen atoms arranged at both end parts of the linking group. The oxygen atoms arranged at both end parts of the linking group form an ether bond (—O—) with methylene groups (—$CH_2$—) arranged on both sides of $R^3$. These two ether bonds impart moderate flexibility to the fluorine-containing ether compound represented by Formula (1), and increases the affinity between the polar group contained in the divalent linking group represented by $R^3$ and the protective layer.

The divalent linking group represented by $R^3$ is preferably a group having oxygen atoms at both end parts, in which polar groups are bonded onto one or more carbon atoms contained in an alkylene group having 3 to 9 carbon atoms, which may include an oxygen atom between carbon atoms. As the alkylene group having 3 to 9 carbon atoms, an alkylene group having 3 to 6 carbon atoms is preferable, and an alkylene group having 3 or 4 carbon atoms is more preferable. The alkylene group having 3 to 9 carbon atoms preferably has a linear chain-like structure. $R^3$ is particularly preferably a polar group bonded to a carbon atom which is not adjacent to an oxygen atom in a linear alkylene group having 3 to 9 carbon atoms. This is because a coating state of the fluorine-containing ether compound with respect to the protective layer is more even, and the lubricating layer has better adhesion.

Examples of the polar group contained in $R^3$ include a hydroxy group (—OH), an amino group (—$NH_2$), a carboxy group (—COOH), a formyl group (—(C═O)H), a carbonyl group (—CO—), a sulfo group (—$SO_3H$), a cyano group (—CN), and a group having an amide bond (for example, —$CONH_2$ or —$NHCOCH_3$). Among these, it is particularly preferable that three $R^3$'s each include a hydroxy group as the polar group. The hydroxy group has a large interaction with a protective layer, in particular, a protective layer formed of a carbon-based material. Therefore, in a case where three $R^3$'s each include a hydroxy group as the polar group, the lubricating layer including the fluorine-containing ether compound has even higher adhesion to the protective layer. In the present embodiment, it is more preferable that all the polar groups contained in three $R^3$'s ($R^{3a}$, $R^{3b}$, and $R^{3c}$) are hydroxy groups since the fluorine-containing ether compound has even higher adhesion to the protective layer.

The number of the polar groups contained in each of the three $R^3$'s is preferably 1 to 3, and more preferably 1 or 2. In a case where any of $R^3$'s has two or more polar groups, the types of the polar groups may be partially or entirely the same as or different from each other.

In a case where one or two of $R^{3a}$, $R^{3b}$, and $R^{3c}$ in Formula (1) are divalent linking groups that are not Formula (3), it is preferable that the divalent linking groups that are not Formula (3) are each independently a divalent linking group having one to three hydroxy groups and 4 to 9 carbon atoms. The divalent linking group which is not represented by Formula (3) is more preferably a divalent linking group consisting of a combination of an oxygen atom (—O—), a methylene group (—$CH_2$—), and a methylene group to which a hydroxy group is bonded (—CH(OH)—).

The divalent linking groups that are not Formula (3) are preferably each independently any of Formulae (3-1) to (3-4). In Formulae (3-1) to (3-4), the leftmost oxygen atom is bonded to the methylene group on the $R^1$ side in Formula (1), and the rightmost oxygen atom is bonded to the methylene group on the $R^4$ side in Formula (1).

In a case where the divalent linking groups that are not represented by Formula (3) are each independently any of Formulae (3-1) to (3-4), it is easy to synthesize the fluorine-containing ether compound represented by Formula (1), which is thus preferable.

(3-1)

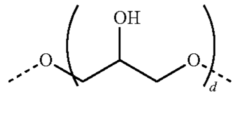

(3-2)

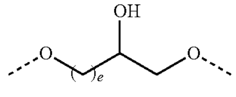

-continued (3-3)

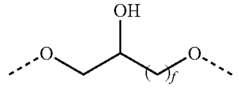

(3-4)

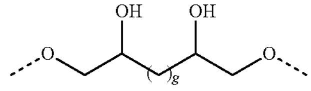

(in Formula (3-1), d represents 2 or 3)

(in Formula (3-2), e represents an integer of 2 to 4; in Formula (3-2), an oxygen atom on a left side is bonded to a methylene group on an $R^1$ side in Formula (1), and an oxygen atom on a right side is bonded to the methylene group on an $R^4$ side in Formula (1))

(in Formula (3-3), f represents an integer of 2 to 4; in Formula (3-3), an oxygen atom on a left side is bonded to the methylene group on the $R^1$ side in Formula (1), and an oxygen atom on a right side is bonded to the methylene group on the $R^4$ side in Formula (1))

(in Formula (3-4), g represents an integer of 0 to 4)

d in Formula (3-1) is 2 or 3, and preferably 2. In a case where d in Formula (3-1) is 2, the hydrophilicity of the divalent linking group represented by $R^3$ is not excessively increased, water which causes corrosion can be prevented from being attracted to the lubricating layer and a lubricating layer having better corrosion resistance can be obtained.

In Formula (3-2), e is an integer of 2 to 4, preferably 2 or 3, and more preferably 2. This is because a coating state of the fluorine-containing ether compound with respect to the protective layer is more even, and the lubricating layer has better adhesion.

In Formula (3-3), f is an integer of 2 to 4, preferably 2 or 3, and more preferably 2. This is because a coating state of the fluorine-containing ether compound with respect to the protective layer is more even, and the lubricating layer has better adhesion.

In Formula (3-4), g is an integer of 0 to 4, preferably an integer of 0 to 2, and more preferably 0. This is because a coating state of the fluorine-containing ether compound with respect to the protective layer is more even, and the lubricating layer has better adhesion.

The linking group represented by Formulae (3-2) and (3-3) has a structure in which 1 to 3 methylene groups are extended from Formula (3) (glycerin structure). Therefore, in the lubricating layer including the fluorine-containing ether compound in which at least one of the three $R^3$'s is Formula (3-2) or (3-3), the lubricating layer has better hydrophobicity, as compared with a compound in which all of the three $R^3$'s are Formula (3) (glycerin structure). As a result, it is possible to effectively inhibit the intrusion of water, which causes the corrosion of a magnetic recording medium, and the lubricating layer has a high corrosion suppressing effect on a magnetic recording medium.

In Formula (1), it is preferable that atoms included in $R^{3a}$ and atoms included in $R^{3c}$ are symmetrically arranged with respect to $R^{3b}$. Examples thereof include a compound in which $R^{3a}$ and $R^{3c}$ are each represented by Formula (3); a compound in which $R^{3a}$ and $R^{3c}$ are each represented by Formula (3-1) and the values of d in Formula (3-1) are the same; a compound in which one of $R^{3a}$ and $R^{3c}$ is represented by Formula (3-2), and the other is represented by Formula (3-3), and e in Formula (3-2) and f in Formula (3-3) have the same value; and a compound in which $R^{3a}$ and $R^{3c}$ are each represented by Formula (3-4) and the values of g in Formula (3-4) are the same. In a case where one of $R^{3a}$ or $R^{3c}$ is represented by Formula (3-2) and the other is represented by Formula (3-3), and e in Formula (3-2) and f in Formula (3-3) are the same value, it is preferable that $R^{3a}$ is represented by Formula (3-3) and $R^{3c}$ is represented by Formula (3-2).

(PFPE Chain Represented by $R^2$ ($R^{2a}$, $R^{2b}$, $R^{2c}$, and $R^{2d}$))

In the fluorine-containing ether compound represented by Formula (1), $R^2$ is a perfluoropolyether chain. In a case where the lubricant including the fluorine-containing ether compound of the present embodiment is applied onto the protective layer to form a lubricating layer, the PFPE chain represented by $R^2$ coats a surface of the protective layer and imparts lubricity to the lubricating layer, thereby reducing a frictional force between the magnetic head and the protective layer. The PFPE chain represented by $R^2$ is appropriately selected according to the performance required for the lubricant including the fluorine-containing ether compound.

The fluorine-containing ether compound represented by Formula (1) includes four PFPE chains of $R^{2a}$, $R^{2b}$, $R^{2c}$, and $R^{2d}$. Since the fluorine-containing ether compound represented by Formula (1) includes four PFPE chains, the polar groups contained in the terminal groups ($R^1$ and $R^4$ in Formula (1)) and the linking groups included in the skeleton ($R^{3a}$, $R^{3b}$, and $R^{3c}$ in Formula (1)) are not likely to be aggregated with each other, for example, as compared to a fluorine-containing ether compound having a skeleton having only one PFPE chain, or a skeleton having two or three PFPE chains bonded through a linking group having a polar group. Therefore, in the fluorine-containing ether compound represented by Formula (1), it is suppressed that insufficient adhesion to the protective layer due to the aggregation among the polar groups in the molecule causes a decrease in floating stability and corrosion resistance.

Four $R^2$'s may be partly or entirely the same as each other, or different from each other. Among the four $R^2$'s, it is preferable that $R^{3a}$ and $R^{2d}$ are the same as each other and $R^{2b}$ and $R^{2c}$ are the same as each other, and it is more preferable that all four $R^2$'s are the same as each other. This is because a coating state of the fluorine-containing ether compound with respect to the protective layer is more even, and the lubricating layer has better adhesion.

The expression, two or more $R^2$'s among four $R^2$'s being the same as each other means that four $R^2$'s include two or more $R^2$'s having the same structure of the repeating units of the PFPE chain. The same $R^2$'s may also include repeating units having the same structure but different average degrees of polymerization.

Examples of the PFPE chain represented by $R^2$ include a polymer or copolymer of perfluoroalkylene oxide. Examples of the perfluoroalkylene oxide include perfluoromethylene oxide, perfluoroethylene oxide, perfluoro-n-propylene oxide, perfluoroisopropylene oxide, and perfluorobutylene oxide.

It is preferable that $R^2$'s in Formula (1) are each independently a PFPE chain represented by Formula (4) derived from, for example, a polymer or copolymer of perfluoroalkylene oxide.

$$-(CF_2)_{w1}-O-(CF_2O)_2-(CF_2CF_2O)_{w3}-(CF_2CF_2CF_2O)_{w4}-(CF_2CF_2CF_2CF_2O)_{w5}-(CF_2)_{w6}- \quad (4)$$

(in Formula (4), w2, w3, w4, and w5 each indicate an average degree of polymerization and each independently represent 0 to 20, provided that all of w2, w3, w4, and w5 are not 0 at the same time; w1 and w6 each indicate an average value of the number of $CF_2$'s and each independently represent 1 to 3; and ($CF_2O$), ($CF_2CF_2O$), ($CF_2CF_2CF_2O$), and ($CF_2CF_2CF_2CF_2O$), which are repeating units in Formula (4) are not particularly limited in the sequence order)

In Formula (4), w2, w3, w4, and w5 indicate an average degree of polymerization, and each independently represent 0 to 20, preferably 0 to 15, and more preferably 0 to 10.

In Formula (4), w1 and w6 are average values indicating the number of $CF_2$'s and each independently represent 1 to 3. w1 and w6 are determined depending on the structure of the repeating unit arranged at the end part of the chain-like structure in the PFPE chain represented by Formula (4) or the like.

($CF_2O$), ($CF_2CF_2O$), ($CF_2CF_2CF_2O$), and ($CF_2CF_2CF_2CF_2O$) in Formula (4) are repeating units. The repeating units in Formula (4) is not particularly limited in the sequence order. In addition, the number of kinds of repeating units in Formula (4) is also not particularly limited.

Specifically, the PFPE chains represented by $R^2$ are each independently preferably any one selected from PFPE chains represented by Formulae (4-1) to (4-4).

In a case where four $R^2$'s are each any one selected from the PFPE chains represented by Formulae (4-1) to (4-4), the fluorine-containing ether compound makes it possible to obtain a lubricating layer having good lubricity. In addition, in a case where four $R^2$'s are each any one selected from the PFPE chains represented by Formulae (4-1) to (4-4), a proportion of the number of oxygen atoms (number of ether bonds (—O—)) to the number of carbon atoms in the PFPE chain is appropriate. Therefore, the fluorine-containing ether compound has moderate hardness. Therefore, the fluorine-containing ether compound applied onto the protective layer is not likely to be aggregated on the protective layer, and a lubricating layer of even thinner thickness can be formed on the protective layer with a sufficient coating rate. In addition, since the fluorine-containing ether compound has moderate flexibility, a lubricating layer having better floating stability can be formed.

$$-CF_2-(OCF_2CF_2)_h-(OCF_2)_i-OCF_2- \quad (4\text{-}1)$$

(in Formula (4-1), h and i each indicate an average degree of polymerization, h represents 1 to 20, and i represents 0 to 20)

$$-CF_2CF_2-(OCF_2CF_2CF_2)_j-OCF_2CF_2- \quad (4\text{-}2)$$

(in Formula (4-2), j indicates an average degree of polymerization and represents 1 to 15)

$$-CF_2CF_2CF_2-(OCF_2CF_2CF_2CF_2)_k-OCF_2CF_2CF_2- \quad (4\text{-}3)$$

(in Formula (4-3), k indicates an average degree of polymerization and represents 1 to 10)

$$-(CF_2)_{w7}-O-(CF_2CF_2CF_2O)_{w8}-(CF_2CF_2O)_{w9}-(CF_2)_{w10}- \quad (4\text{-}4)$$

(in Formula (4-4), w8 and w9 each indicate an average degree of polymerization and each independently represent 1 to 20; and w7 and w10 are each an average value indicating the number of $CF_2$'s and each independently represent 1 or 2)

In Formula (4-1), ($OCF_2CF_2$) and ($OCF_2$) which are the repeating units is not particularly limited in the sequence order. In Formula (4-1), the number h of ($OCF_2CF_2$)'s and the number i of ($OCF_2$)'s may be the same as or different from each other. The PFPE chain represented by Formula (4-1) may be a polymer of ($OCF_2CF_2$). In addition, the PFPE chain represented by Formula (4-1) may be any of a random copolymer, a block copolymer, or an alternating copolymer consisting of ($OCF_2CF_2$) and ($OCF_2$).

In Formulae (4-1) to (4-3), h indicating the average degree of polymerization is 1 to 20, i is 0 to 20, j is 1 to 15, and k is 1 to 10, and thus, the fluorine-containing ether compound makes it possible to obtain a lubricating layer having good lubricity. In addition, in Formulae (4-1) to (4-3), h and i each indicating an average degree of polymerization are 20 or less, j is 15 or less, and k is 10 or less, and thus, the viscosity of the fluorine-containing ether compound is not excessively high, and a lubricant including the fluorine-containing ether compound is easy to apply, which is thus preferable. h, i, j, and k, each indicating an average degree of polymerization, are each preferably 1 to 10, more preferably 1.5 to 8, and still more preferably 2 to 7 since the fluorine-containing ether compound is likely to wet-spread on the protective layer and makes it possible to obtain a lubricating layer having an even film thickness.

In Formula (4-4), ($CF_2CF_2CF_2O$) and ($CF_2CF_2O$), which are the repeating units, is not particularly limited in the sequence order. In Formula (4-4), the number w8 of ($CF_2CF_2CF_2O$)'s and the number w9 of ($CF_2CF_2O$)'s, each indicating an average degree of polymerization, may be the same as or different from each other. Formula (4-4) may include any of a random copolymer, a block copolymer, and an alternating copolymer, each consisting of monomer units ($CF_2CF_2CF_2O$) and ($CF_2CF_2O$).

In Formula (4-4), w8 and w9, each indicating an average degree of polymerization, are each independently 1 to 20, preferably 1 to 15, and more preferably 1 to 10.

w7 and w10 in Formula (4-4) are average values indicating the number of $CF_2$'s and each independently represent 1 or 2. w7 and w10 are determined depending on the structure of the repeating unit arranged at an end part of the chain-like structure in the PFPE chain represented by Formula (4-4) or the like.

(Terminal Groups Represented by $R^1$ and $R^4$)

In the fluorine-containing ether compound represented by Formula (1), $R^1$ and $R^4$ are each a terminal group having one or more polar groups and having 1 to 50 carbon atoms. In the fluorine-containing ether compound represented by Formula (1), since $R^1$ and $R^4$ each have one or more polar groups, in a case where a lubricant including the fluorine-containing ether compound is used to form a lubricating layer on the protective layer, a suitable interaction occurs between the lubricating layer and the protective layer. $R^1$ and $R^4$ can be appropriately selected according to the performance required for the lubricant including the fluorine-containing ether compound.

$R^1$ and $R^4$ may be the same as or different from each other. In a case where $R^1$ and $R^4$ are the same as each other, a coating state of the fluorine-containing ether compound with respect to the protective layer is more even, and a lubricating layer having better adhesion can be formed.

Examples of the polar group contained in $R^1$ and $R^4$ include a hydroxy group (—OH), an amino group (—$NH_2$), a carboxy group (—COOH), a formyl group (—(C═O)H), a carbonyl group (—CO—), a sulfo group (—$SO_3H$), a cyano group (—CN), and a group having an amide bond (for example, —$CONH_2$ or —$NHCOCH_3$).

The number of the polar groups included in each of $R^1$ and $R^4$ is 1 or more, preferably 1 to 3, and more preferably 2 or 3. This is because the fluorine-containing ether compound can form a lubricating layer having high adhesion to the protective layer and being more excellent in floating stability and a corrosion suppressing effect.

In a case where the number of the polar groups included in $R^1$ and/or $R^4$ is 2 or more, the polar groups contained in $R^1$ and/or $R^4$, including two or more polar groups, may be of only one kind or of two or more kinds.

It is preferable that $R^1$ and $R^4$ each include one or more hydroxy groups as the polar group. In a case where the polar groups contained in $R^1$ and/or $R^4$ include a hydroxy group, the total number of the hydroxy groups included in $R^1$ and the hydroxy groups included in $R^4$ in Formula (1) is preferably 2 to 6, more preferably 3 to 5, and most preferably 3 or 4. In a case where the total number of the hydroxy groups is 2 or more, the interaction between the hydroxy groups contained in $R^1$ and $R^4$ and the protective layer is more effectively obtained. As a result, the fluorine-containing ether compound can form a lubricating layer having high adhesion to the protective layer. In addition, in a case where the total number of the hydroxy groups is 6 or less, the number of the hydroxy groups that are not involved in the bonding between the lubricating layer and the active point on the protective layer is reduced. Therefore, the hydroxy groups that are not involved in the bonding between the lubricating layer and the active point on the protective layer are aggregated to form a protrusion, and it is possible to prevent the collision with the magnetic head. Therefore, a lubricating layer having more excellent floating stability can be formed. In addition, in a case where the total number of the hydroxy groups is 4 or less, the hydrophobicity of the lubricating layer including the fluorine-containing ether compound is sufficiently high. Therefore, it is possible to prevent water which causes corrosion of a magnetic recording medium, from being attracted to the lubricating layer. Accordingly, it is possible to form a lubricating layer that can more effectively suppress contamination and corrosion of a magnetic recording medium.

In a case where $R^1$ and/or $R^4$ has only a hydroxy group as the polar group, the number of the hydroxy groups included in $R^1$ and/or $R^4$ having only a hydroxy group as the polar group is preferably 2 or 3, and more preferably 2. In a case where the number of the hydroxy groups included in $R^1$ and/or $R^4$, in which the polar group is only a hydroxy group, is 2 or more, the lubricating layer including the fluorine-containing ether compound has high adhesiveness (adhesion) to the protective layer, and the floating stability of the magnetic recording medium is improved. In addition, in a case where the number of the hydroxy groups included in each of $R^1$ and/or $R^4$, in which the polar group is only a hydroxy group, is 3 or less, in a magnetic recording medium including a lubricating layer including the fluorine-containing ether compound, the polarity of the fluorine-containing ether compound is excessively high, and water that causes corrosion can be prevented from being induced to a surface of the protective layer by the lubricating layer. Furthermore, in a case where the number of the hydroxy groups included in each of $R^1$ and/or $R^4$, in which the polar group is only a hydroxy group, is 2 or less, in the lubricating layer including the fluorine-containing ether compound, the aggregation of the hydroxy groups included in the terminal groups of the fluorine-containing ether compound can be prevented.

The number of carbon atoms in the terminal group represented by each of $R^1$ and $R^4$ is 1 to 50, preferably 3 to 20, and more preferably 4 to 15. Since the number of carbon atoms in the terminal group represented by $R^1$ and $R^4$ is 1 or more, the hydrophobicity of the terminal group portion can be ensured. This makes it possible to prevent water which causes corrosion from being attracted to the lubricating layer, and to form a lubricating layer having good corrosion resistance. Since the number of carbon atoms in the terminal group represented by $R^1$ and $R^4$ is 50 or less, the terminal group portion has a flexible structure. As a result, a lubricating layer of thin thickness can be formed with a sufficient coating rate, resulting in good floating stability.

The terminal group represented by $R^1$ preferably has an oxygen atom at an end part on the side bonded to $CH_2$ adjacent to $R^{2a}$. In addition, the terminal group represented by $R^4$ preferably has an oxygen atom at an end part on the side bonded to $CH_2$ adjacent to $R^{2d}$. The oxygen atom arranged at the end part of the terminal group represented by $R^1$ and $R^4$ forms an ether bond (—O—) with the atoms bonded to both sides thereof. These ether bonds impart moderate flexibility to the fluorine-containing ether compound represented by Formula (1) and increase the affinity between the polar group contained in the terminal group represented by $R^1$ and $R^4$ and the protective layer.

In the fluorine-containing ether compound represented by Formula (1), it is preferable that at least one of $R^1$ and $R^4$ is a terminal group of any of Formulae (2-1) to (2-4), and it is more preferable that both of $R^1$ and $R^4$ are each independently a terminal group of any of Formulae (2-1) to (2-4).

(2-1)

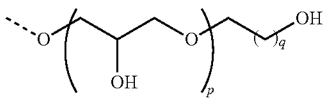

(2-2)

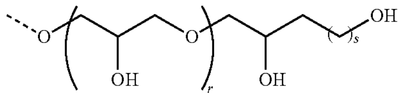

(2-3)

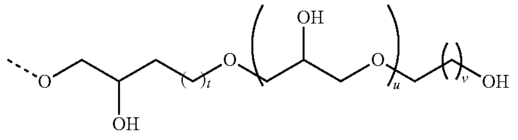

(2-4)

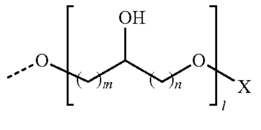

(in Formula (2-1), p represents an integer of 1 to 3, and q represents an integer of 1 to 3)

(in Formula (2-2), r represents an integer of 0 to 2, and s represents an integer of 1 to 3)

(in Formula (2-3), t represents an integer of 1 to 3, u represents an integer of 0 to 2, and v represents an integer of 1 to 3)

(in Formula (2-4), l represents an integer of 1 to 3, l pieces of m's each independently represent an integer of 1 to 4, and l pieces of n's each independently represent an integer of 1 to 4; and X represents an organic group including a double bond or a triple bond)

Each hydroxy group included in Formulae (2-1) to (2-3) is bonded to different carbon atoms. In Formulae (2-1) to (2-3), the carbon atoms to which the hydroxy groups are bonded are bonded to each other through a linking group including carbon atoms to which hydroxy groups are not bonded. Therefore, in a case where at least one of $R^1$ and $R^4$ is any of Formulae (2-1) to (2-3), the fluorine-containing ether compound represented by Formula (1) has better hydrophobicity, for example, as compared with a case of having a terminal group in which carbon atoms to which hydroxy groups are bonded are bonded to each other. As a result, in a case where at least one of $R^1$ and $R^4$ is any of Formulae (2-1) to (2-3), it is presumed that the lubricating layer including the fluorine-containing ether compound represented by Formula (1) can prevent the intrusion of water and can effectively suppress the corrosion of a magnetic recording medium. In addition, in a case where carbon atoms to which hydroxy groups are bonded are bonded to each other through a linking group including carbon atoms to which hydroxy groups are not bonded, both the terminal hydroxy group and a hydroxy group adjacent to the terminal hydroxy group can be aligned to be in close contact with the protective layer by the linking group including carbon atoms to which hydroxy groups are not bonded. Therefore, it is presumed that excellent floating stability is obtained.

Thus, it is preferable that at least one of $R^1$ and $R^4$ is any of Formulae (2-1) to (2-3).

Furthermore, in the terminal group represented by Formulae (2-1) and (2-3), the linking group between a carbon atom to which the terminal hydroxy group is bonded and a carbon atom to which a hydroxy group adjacent to the terminal hydroxy group is bonded does not include an oxygen atom. The linking group has a linear chain-like structure consisting of 3 to 8 atoms including carbon atoms to which hydroxy groups are not bonded. Even in a case where the linking group includes an oxygen atom, the linking group is a linear chain-like structure consisting of 3 or more atoms including carbon atoms to which hydroxy groups are not bonded, the fluorine-containing ether compound has good hydrophobicity. Moreover, in a case where the linking group has a linear chain-like structure consisting of 3 or more atoms, the molecular motion is appropriate, the intramolecular aggregation is not likely to occur, and excellent adhesion to the protective layer is obtained. In addition, in a case where the linking group has a linear chain-like structure formed of 8 or less atoms, the hydrophobicity of the linking group is not excessively high to impair the adhesion to the protective layer. Thus, the lubricating layer including the fluorine-containing ether compound, in which the linking group has a linear chain-like structure including an oxygen atom and consisting of the above-described number of atoms, has excellent adhesion to the protective layer, exhibits high floating stability, can prevent the intrusion of water, and has a high corrosion suppressing effect on a magnetic recording medium.

In addition, in the terminal group represented by Formula (2-2), the linking group between a carbon atom to which the terminal hydroxy group is bonded and a carbon atom to which a hydroxy group adjacent to the terminal hydroxy group is bonded does not include an oxygen atom. Therefore, the intramolecular interaction is small, the intramolecular aggregation is not likely to occur, and thus, the adhesion to the protective layer is excellent. In addition, the linking group has a linear chain-like structure consisting of 1 to 3 atoms including carbon atoms to which hydroxy groups are not bonded. In a case where the linking group includes an oxygen atom, the linking group is a linear chain-like structure consisting of one or more atoms including carbon atoms to which hydroxy groups are not bonded, the fluorine-containing ether compound has good hydrophobicity. In addition, in a case where the linking group has a linear chain-like structure formed of 3 or less atoms, the hydrophobicity of the linking group is not excessively high to impair the adhesion to the protective layer. Thus, the lubricating layer including the fluorine-containing ether compound, in which the linking group does not include an oxygen atom and has a linear chain-like structure consisting of the above-described number of atoms, has excellent adhesion to the protective layer, exhibits high floating stability, can prevent the intrusion of water, and has a high corrosion suppressing effect on a magnetic recording medium.

In the terminal group represented by Formulae (2-1) to (2-3), a carbon atom included in a linking group arranged between the hydroxy groups bonded to the carbon atoms plays a role in improving the hydrophobicity of the fluorine-containing ether compound. On the other hand, in a case where the number of carbon atoms included in the linking group is too large, the flexibility of the terminal groups ($R^1$ and $R^4$) is decreased, and it may be difficult to evenly coat the entire surface of the protective layer.

Therefore, in Formula (2-1), q is preferably 1 or 2, and more preferably 1. In addition, in Formula (2-2), s is preferably 1 or 2, and more preferably 1. Similarly, in Formula (2-3), t is preferably 1 or 2, and more preferably 1. v is preferably 1 or 2, and more preferably 1.

All terminal groups represented by Formulae (2-1) to (2-3) have only a hydroxy group as a polar group. As described above, in a case where $R^1$ and/or $R^4$ has only a hydroxy group as the polar group, the number of the hydroxy groups included in $R^1$ and/or $R^4$ having only a hydroxy group as the polar group is preferably 2 or 3, and more preferably 2.

In Formula (2-1), since the number of the hydroxy groups is p+1, p is preferably 1 or 2, and more preferably 1. In Formula (2-2), since the number of the hydroxy groups is r+2, r is preferably 0 or 1, and more preferably 0. In Formula (2-3), since the number of the hydroxy groups is u+2, u is preferably 0 or 1, and more preferably 0.

In the organic group including a double bond or a triple bond represented by X in Formula (2-4), the double bond may be any of a carbon-carbon bond, a carbon-oxygen bond, and a carbon-nitrogen bond, and the triple bond may be any of a carbon-carbon bond and a carbon-nitrogen bond. Specific examples of the organic group including a double bond or a triple bond, represented by X, include an organic group including at least one selected from an aromatic hydrocarbon, an unsaturated heterocyclic ring, an alkenyl group, an alkynyl group, a cyano group, and a group having an amide bond. The organic group represented by X may include a polar group. The number of carbon atoms included in the organic group represented by X is preferably 2 to 15, and more preferably 2 to 10.

Here, a bond between the terminal group represented by Formula (2-4) and an active point on the protective layer will be described. In the functional groups (active points) present in a large number on the protective layer, a locally charged site and a site having charges distributed widely are each present. The hydroxy group included in Formula (2-4) exhibits an adsorption ability by interacting with a locally charged site on the protective layer through a hydrogen bond between hydrogen atoms. On the other hand, the aromatic hydrocarbon, the unsaturated heterocyclic ring, the alkenyl group, and the alkynyl group have a delocalized charge. Therefore, in a case where the organic group represented by X included in Formula (2-4) is an organic group including at least one selected from an aromatic hydrocarbon, an unsaturated heterocyclic ring, an alkenyl group, or an alkynyl group, the organic group represented by X exhibits an adsorption ability by interacting with a site having charges distributed widely on the protective layer. In addition, the cyano group and the group having an amide bond have a delocalized charge and also have a widely polarized charge. Therefore, in a case where the organic group represented by X included in Formula (2-4) includes at least one selected from a cyano group and a group having an amide bond, the organic group represented by X can interact with both a locally charged site and a site having charges distributed widely on the protective layer.

Accordingly, the hydroxy group included in Formula (2-4) and the organic group including a double bond or a triple bond can be adsorbed to different sites on the protective layer. Therefore, the hydroxy group included in Formula (2-4) and the organic group including a double bond or a triple bond can each independently interact with the functional group (active point) on the protective layer. As a result, the lubricating layer including the fluorine-containing ether compound in which at least one of $R^1$ and $R^4$ is Formula (2-4) has excellent adhesion to the protective layer, exhibits high floating stability, can prevent the intrusion of water, and has a high corrosion suppressing effect on a magnetic recording medium.

Thus, it is preferable that at least one of $R^1$ and $R^4$ is Formula (2-4).

l in Formula (2-4) is an integer of 1 to 3, preferably an integer of 1 or 2, and most preferably 1. The number of the hydroxy groups in the terminal group included in $R^1$ or $R^4$ is the same as the number of the hydroxy groups in l in Formula (2-4). In a case where l (the number of the hydroxy groups) in Formula (2-4) is 3 or less, there are too many hydroxy groups in the terminal group represented by Formula (2-4). Thus, water which causes corrosion can be prevented from being attracted to the lubricating layer, and a lubricating layer having good corrosion resistance can be obtained.

In a case where l in Formula (2-4) is 2 or 3, combinations of m's and n's in the two or three repeating units ($-(CH_2)_m-CH(OH)-(CH_2)_n-O-$) may be different from each other, or may be partially or entirely the same as each other.

l pieces of m's in Formula (2-4) each independently represent an integer of 1 to 4 and l pieces of n's each independently represent an integer of 1 to 4. m+n in one repeating unit ($-(CH_2)_m-CH(OH)-(CH_2)_n-O-$) in Formula (2-4) is preferably 2 to 4, and more preferably 2 or 3. This is because the structure of the repeating unit is not rigid due to the too large number of carbon atoms in the alkylene group in the repeating unit. Accordingly, the terminal group portion has a flexible structure, and a lubricating layer of even thinner thickness can be formed with a sufficient coating rate, resulting in a lubricating layer having good floating stability.

It is preferable that at least one of m and n in one repeating unit ($-(CH_2)_m-CH(OH)-(CH_2)_n-O-$) in Formula (2-4) is 1. This is because the motion of the hydroxy group is not decreased due to the too large number of carbon atoms in the alkylene group between the carbon atom to which a hydroxy group is bonded and the ether oxygen atom.

In a case where X in Formula (2-4) includes an aromatic hydrocarbon or an unsaturated heterocyclic ring, it is preferable that X is $-(CH_2)_{z1}-R^5$ (in the formula, z1 represents an integer of 0 to 3; and $R^5$ represents an aromatic hydrocarbon or an unsaturated heterocyclic ring). The aromatic hydrocarbon and the unsaturated heterocyclic ring may have a substituent on the ring structure. Examples of the substituent include a methyl group, an ethyl group, a methoxy group, an ethoxy group, a halogeno group, a cyano group, an acetamide group ($-NH(C=O)CH_3$), and a carboxamide group ($-(C=O)NH_2$).

In a case where X in Formula (2-4) includes an alkenyl group or an alkynyl group, it is preferable that X is an alkenyl group having 2 to 8 carbon atoms or an alkynyl group having 3 to 8 carbon atoms.

In a case where X in Formula (2-4) includes a group having a cyano group or an amide bond, it is preferable that X is $-(CH_2)_{z2}-R^6$ (in the formula, z2 represents an integer of 1 to 5; and $R^6$ represents $-CN$, $-NH(C{=}O)CH_3$, or $-(C{=}O)NH_2$). In addition, X may be an organic group including an aromatic hydrocarbon or unsaturated heterocyclic ring, which has a cyano group, an acetamide group, or a carboxamide group as a substituent, as described above.

Specific examples of the organic group including a double bond or a triple bond, represented by X in Formula (2-4), include a phenyl group, a methoxyphenyl group, a fluorinated phenyl group, a naphthyl group, a phenethyl group, a methoxyphenethyl group, a fluorinated phenethyl group, a benzyl group, a methoxybenzyl group, a naphthylmethyl group, a methoxynaphthyl group, a pyrrolyl group, a pyrazolyl group, a methylpyrazolylmethyl group, an imidazolyl group, a furyl group, a furfuryl group, an oxazolyl group, an isoxazolyl group, a thienyl group, a thienylethyl group, a thiazolyl group, a methylthiazolylethyl group, an isothiazolyl group, a pyridyl group, a pyrimidinyl group, a pyridazinyl group, a pyrazinyl group, an indolinyl group, a benzofuranyl group, a benzothienyl group, a benzimidazolyl group, a benzoxazolyl group, a benzothiazolyl group, a benzopyrazolyl group, a benzoisoxazolyl group, a benzoisothiazolyl group, a quinolyl group, an isoquinolyl group, a quinazolinyl group, a quinoxalinyl group, a phthalazinyl group, a cinnolinyl group, a vinyl group, an allyl group, a butenyl group, a propynyl group, a propargyl group, a butynyl group, a methylbutynyl group, a pentynyl group, a methylpentynyl group, a hexynyl group, a cyanoethyl group, a cyanopropyl group, a cyanophenyl group, an acetamidoethyl group ($-CH_2CH_2NH(C{=}O)CH_3$), an acetamidopropyl group ($-CH_2CH_2CH_2NH(C{=}O)CH_3$), an acetamidophenyl group, a carboxamidoethyl group ($-CH_2CH_2(C{=}O)NH_2$), a carboxamidopropyl group ($-CH_2CH_2CH_2(C{=}O)NH_2$), and a carboxamidophenyl group.

Among those, the organic group represented by X in Formula (2-4) is preferably any selected from a phenyl group, a methoxyphenyl group, a thienylethyl group, a naphthyl group, a butenyl group, an allyl group, a propargyl group, a phenethyl group, a methoxyphenethyl group, a fluorinated phenethyl group, a cyanoethyl group, a cyanopropyl group, an acetamidoethyl group, and an acetamidopropyl group, and more preferably any selected from a phenyl group, a methoxyphenyl group, an allyl group, a butenyl group, a thienylethyl group, a cyanoethyl group, a cyanopropyl group, an acetamidoethyl group, and an acetamidopropyl group.

In particular, in a case where the organic group represented by X in Formula (2-4) is any one of a cyanoethyl group or an acetamidoethyl group, the organic group represented by X has high polarity, so that a lubricating layer having even more excellent adhesion to the protective layer and better floating stability can be formed. In addition, in a case where the organic group represented by X is any of an allyl group, a methoxyphenyl group, or a thienylethyl group, the organic group represented by X has high hydrophobicity, so that a lubricating layer having better corrosion resistance can be formed.

In a case where one of $R^1$ and $R^4$ is the terminal group of any of Formulae (2-1) to (2-4) and the other is a terminal group other than the terminal group represented by any of Formulae (2-1) to (2-4), the other terminal group may be the terminal group having 1 to 50 carbon atoms and one or more polar groups.

In this case, examples of the other terminal group include a terminal group having a hydroxy group, which is other than the terminal groups represented by Formulae (2-1) to (2-4). Specific examples of the other terminal group include $-OCH_2CH_2OH$, $-OCH_2CH_2CH_2OH$, $-OCH_2CH(OH)CH_2OH$, and $-OCH_2CH(OH)CH_2OCH_2CH(OH)CH_2OH$.

In the fluorine-containing ether compound represented by Formula (1), it is preferable that in Formula (1), $R^{2a}$ and $R^{2d}$ are the same as each other, $R^{2b}$ and $R^{2c}$ are the same as each other, atoms included in $R^{3a}$ and atoms included in $R^{3c}$ are symmetrically arranged with respect to $R^{3b}$, and $R^1$ and $R^4$ are the same as each other. This is because it is possible to produce the fluorine-containing ether compound easily and efficiently.

Furthermore, in the fluorine-containing ether compound represented by Formula (1), it is more preferable that all four $R^2$'s in Formula (1) are the same as each other, atoms included in $R^{3a}$ and atoms included in $R^{3c}$ are symmetrically arranged with respect to $R^{3b}$, and $R^1$ and $R^4$ are the same as each other. This is because it is possible to produce the fluorine-containing ether compound easily and efficiently. Furthermore, in a case where the three $R^3$'s are the fluorine-containing ether compound represented by Formula (3), the compound can be more easily and efficiently produced, which is thus more preferable.

In the fluorine-containing ether compound represented by Formula (1), a total number of the hydroxy groups included in the molecule is preferably 5 to 9, and more preferably 5 to 8. In a case where the total number of the hydroxy groups included in the molecule is 5 or more, the adsorption force of the molecule on the protective layer can be ensured and a lubricating layer of even thinner thickness can be formed with a sufficient coating rate. As a result, a lubricating layer having better floating stability can be formed. In addition, in a case where the total number of the hydroxy groups included in the molecule is 9 or less, the hydrophilicity of the entire molecule is not excessively increased, water which causes corrosion can be prevented from being attracted to the lubricating layer, and thus, a lubricating layer having better corrosion resistance can be formed.

The fluorine-containing ether compound represented by Formula (1) is specifically preferably any of compounds represented by Formulae (A) to (Z).

In a case where the compound represented by Formula (1) is any of the compounds represented by Formulae (A) to (Z), a raw material is easily available, and a lubricating layer having more excellent adhesion even with a small thickness, even better floating stability, and a high corrosion suppressing effect on a magnetic recording medium can be formed.

In the compounds represented by Formulae (A) to (Z), $Rf_1$, $Rf_2$, and $Rf_3$ representing PFPE chains each have the following structure. That is, in the compounds represented by Formulae (A) to (W) and (Z), $Rf_1$ is the PFPE chain represented by Formula (4-1). In the compounds represented by Formulae (X) and (Z), $Rf_2$ is the PFPE chain represented by Formula (4-2). In the compound represented by Formula (Y), $Rf_3$ is the PFPE chain represented by Formula (4-3). Furthermore, h and i in $Rf_1$, j in $Rf_2$, and k in $Rf_3$, each representing the PFPE chain in Formulae (A) to (Z), are values indicating an average degree of polymerization, which are thus not necessarily integers.

$Rf_1$ = 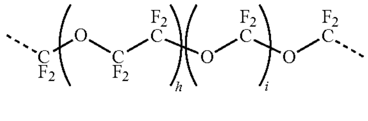

-continued

Rf2 =

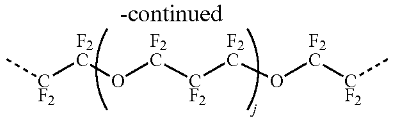

Rf3 =

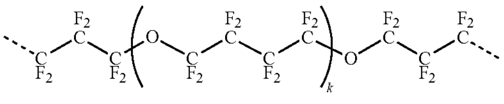

All the compounds represented by Formulae (A) to (R), and (X) to (Z) are compounds in which three $R^3$'s are each the linking group represented by Formula (3).

All the compounds represented by Formulae (A) to (Z) are compounds in which at least one of $R^1$ and $R^4$ is the terminal group represented by any of Formulae (2-1) to (2-4).

In the compound represented by Formula (A), $R^1$ and $R^4$ in Formula (1) each represent the terminal group represented by Formula (2-1), in which p is 1 and q is 1. Four $R^2$'s are each the PFPE chain represented by Formula (4-1).

In the compound represented by Formula (B), $R^1$ and $R^4$ in Formula (1) each represent the terminal group represented by Formula (2-1), in which p is 1 and q is 2. Four $R^2$'s are each the PFPE chain represented by Formula (4-1).

In the compound represented by Formula (C), $R^1$ and $R^4$ in Formula (1) each represent the terminal group represented by Formula (2-2), in which r is 0 and s is 1. Four $R^2$'s are each the PFPE chain represented by Formula (4-1).

In the compound represented by Formula (D), $R^1$ and $R^4$ in Formula (1) are each the terminal group represented by Formula (2-3), in which t is 1, u is 0, and v is 1. Four $R^2$'s are each the PFPE chain represented by Formula (4-1).

In the compound represented by Formula (E), $R^1$ in Formula (1) is the terminal group represented by Formula (2-1), in which p is 1 and q is 1. $R^4$ is $—OCH_2CH(OH)CH_2OH$. Four $R^2$'s are each the PFPE chain represented by Formula (4-1).

In the compound represented by Formula (F), $R^1$ in Formula (1) is the terminal group represented by Formula (2-1), in which p is 1 and q is 1. $R^4$ is $—OCH_2CH(OH)CH_2OCH_2CH(OH)CH_2OH$. Four $R^2$'s are each the PFPE chain represented by Formula (4-1).

In the compound represented by Formula (G), $R^1$ and $R^4$ in Formula (1) each represent the terminal group represented by Formula (2-1), in which p is 2 and q is 1. Four $R^2$'s are each the PFPE chain represented by Formula (4-1).

In the compound represented by Formula (H), in Formula (1), $R^1$ is the terminal group represented by Formula (2-1), in which p is 1 and q is 1, and $R^4$ is the terminal group represented by Formula (2-1), in which p is 2 and q is 1. Four $R^2$'s are each the PFPE chain represented by Formula (4-1).

In the compound represented by Formula (I), $R^1$ and $R^4$ in Formula (1) each represent the terminal group represented by Formula (2-2), in which r is 1 and s is 1. Four $R^2$'s are each the PFPE chain represented by Formula (4-1).

In the compound represented by Formula (J), $R^1$ and $R^4$ in Formula (1) each represent the terminal group represented by Formula (2-3), in which t is 1, u is 1, and v is 1. Four $R^2$'s are each the PFPE chain represented by Formula (4-1).

In the compound represented by Formula (K), $R^1$ and $R^4$ in Formula (1) each represent the terminal group represented by Formula (2-4), in which 1 is 2, m is 1, n is 1, and X is an allyl group. Four $R^2$'s are each the PFPE chain represented by Formula (4-1).

In the compound represented by Formula (L), $R^1$ and $R^4$ in Formula (1) are each the terminal group represented by Formula (2-4), in which 1 is 1, m is 1, n is 1, and X is a p-methoxyphenyl group. Four $R^2$'s are each the PFPE chain represented by Formula (4-1).

In the compound represented by Formula (M), in Formula (1), $R^1$ is the terminal group represented by Formula (2-1), in which p is 1 and q is 1, $R^4$ is the terminal group represented by Formula (2-4), in which 1 is 1, m is 1, n is 1, and X is a p-methoxyphenyl group. Four $R^2$'s are each the PFPE chain represented by Formula (4-1).

In the compound represented by Formula (N), $R^1$ and $R^4$ in Formula (1) each represent the terminal group represented by Formula (2-4), in which 1 is 1, m is 1, n is 1, and X is a thienylethyl group. Four $R^2$'s are each the PFPE chain represented by Formula (4-1).

In the compound represented by Formula (O), $R^1$ and $R^4$ in Formula (1) each represent the terminal group represented by Formula (2-4), in which l is 1, m is 1, n is 1, and X is a cyanoethyl group. Four $R^2$'s are each the PFPE chain represented by Formula (4-1).

In the compound represented by Formula (P), in Formula (1), $R^1$ is the terminal group represented by Formula (2-1), in which p is 1 and q is 1, and $R^4$ is the terminal group represented by Formula (2-4), in which 1 is 1, m is 1, n is 1, and X is a cyanoethyl group. Four $R^2$'s are each the PFPE chain represented by Formula (4-1).

In the compound represented by Formula (Q), in Formula (1), $R^1$ and $R^4$ are each a terminal group represented by Formula (2-4), 1 is 1, m is 1, n is 1, and X is an acetamidoethyl group. Four $R^2$'s are each the PFPE chain represented by Formula (4-1).

In the compound represented by Formula (R), in Formula (1), $R^1$ is the terminal group represented by Formula (2-1), in which p is 1 and q is 1, and $R^4$ is the terminal group represented by Formula (2-4), in which 1 is 1, m is 1, n is 1, and X is an acetamidoethyl group. Four $R^2$'s are each the PFPE chain represented by Formula (4-1).

In the compound represented by Formula (S), $R^1$ and $R^4$ in Formula (1) each represent the terminal group represented by Formula (2-1), in which p is 1 and q is 1. $R^{3a}$ is the linking group represented by Formula (3-3), in which f is 2, $R^{3b}$ is the linking group represented by Formula (3), and $R^{3c}$ is the linking group represented by Formula (3-2), in which e is 2. Four $R^2$'s are each the PFPE chain represented by Formula (4-1).

In the compound represented by Formula (T), $R^1$ and $R^4$ in Formula (1) each represent the terminal group represented by Formula (2-1), in which p is 1 and q is 1. $R^{3a}$ and $R^{3c}$ are each the linking group represented by Formula (3), and $R^{3b}$ is the linking group represented by Formula (3-3), in which f is 2. Four $R^2$'s are each the PFPE chain represented by Formula (4-1).

In the compound represented by Formula (U), $R^1$ and $R^4$ in Formula (1) each represent the terminal group represented by Formula (2-1), in which p is 1 and q is 1. $R^{3a}$ and $R^{3c}$ are each the linking group represented by Formula (3), and $R^{3b}$ is the linking group represented by Formula (3-1), in which d is 2. Four $R^2$'s are each the PFPE chain represented by Formula (4-1).

In the compound represented by Formula (V), $R^1$ and $R^4$ in Formula (1) each represent the terminal group represented by Formula (2-1), in which p is 1 and q is 1. $R^{3a}$ and $R^{3c}$ are each the linking group represented by Formula (3), and $R^{3b}$ is the linking group represented by Formula (3-4), in which g is 0. Four $R^2$'s are each the PFPE chain represented by Formula (4-1).

In the compound represented by Formula (W), $R^1$ and $R^4$ in Formula (1) are each the terminal group represented by Formula (2-1), in which p is 1 and q is 1. $R^{3a}$ and $R^{3c}$ are each the linking group represented by Formula (3), and $R^{3b}$ is the linking group represented by Formula (3-4) in which g is 4. Four $R^2$'s are each the PFPE chain represented by Formula (4-1).

In the compound represented by Formula (X), $R^1$ and $R^4$ in Formula (1) each represent the terminal group represented by Formula (2-1), in which p is 1 and q is 1. Four $R^2$'s are the PFPE chain represented by Formula (4-2).

In the compound represented by Formula (Y), $R^1$ and $R^4$ in Formula (1) are each the terminal group represented by Formula (2-1), in which p is 1 and q is 1. Four $R^2$'s are the PFPE chain represented by Formula (4-3).

In the compound represented by Formula (Z), $R^1$ and $R^4$ in Formula (1) are each the terminal group represented by Formula (2-1), in which p is 1 and q is 1. $R^{2a}$ and $R^{2d}$ are each the PFPE chain represented by Formula (4-2), and $R^{2b}$ and $R^{2a}$ are each the PFPE chain represented by Formula (4-1).

(A)
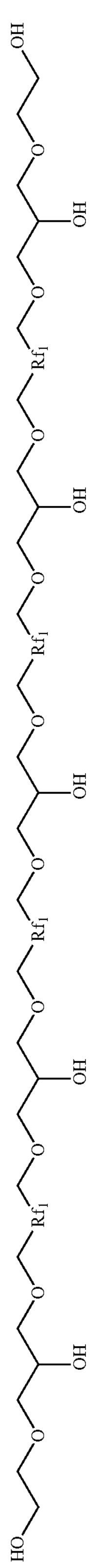
(B)
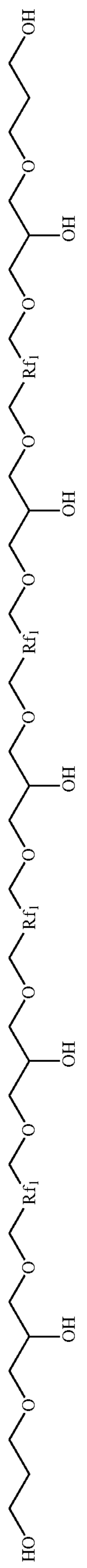
(C)
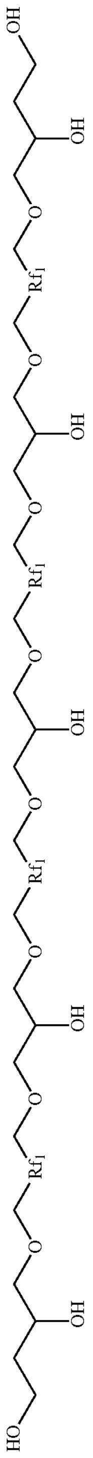

(in the four $Rf_1$'s in Formula (A), h and i each indicate an average degree of polymerization, h represents 1 to 20, and i represents 0 to 20; and h and i in the four $Rf_1$'s may be different from each other or may be partially or entirely the same as each other)

(in the four $Rf_1$'s in Formula (B), h and i each indicate an average degree of polymerization, h represents 1 to 20, and i represents 0 to 20; and h and i in the four $Rf_1$'s may be different from each other or may be partially or entirely the same as each other)

(in the four $Rf_1$'s in Formula (C), h and i each indicate an average degree of polymerization, h represents 1 to 20, and i represents 0 to 20; and h and i in the four $Rf_1$'s may be different from each other or may be partially or entirely the same as each other)

(D)
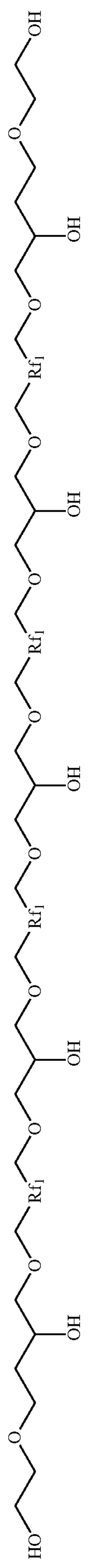
(E)
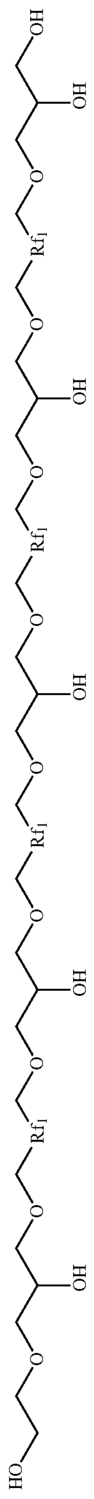
(F)
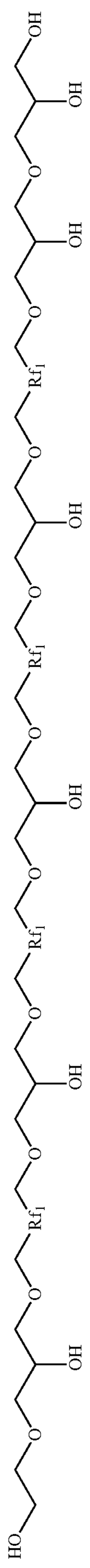

(in the four $Rf_1$'s in Formula (D), h and i each indicate an average degree of polymerization, h represents 1 to 20, and i represents 0 to 20; and h and i in the four $Rf_1$'s may be different from each other or may be partially or entirely the same as each other)

(in the four $Rf_1$'s in Formula (E), h and i each indicate an average degree of polymerization, h represents 1 to 20, and i represents 0 to 20; and h and i in the four $Rf_1$'s may be different from each other or may be partially or entirely the same as each other)

(in the four $Rf_1$'s in Formula (F), h and i each indicate an average degree of polymerization, h represents 1 to 20, and i represents 0 to 20; and h and i in the four $Rf_1$'s may be different from each other or may be partially or entirely the same as each other)

(G)
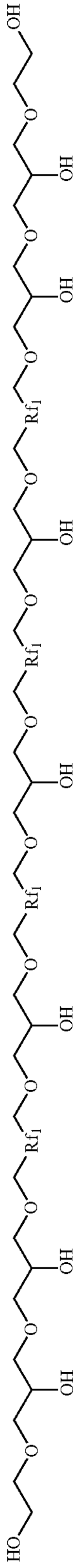
(H)
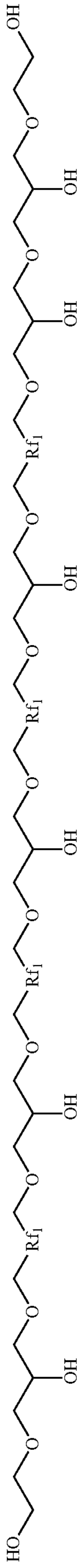
(I)
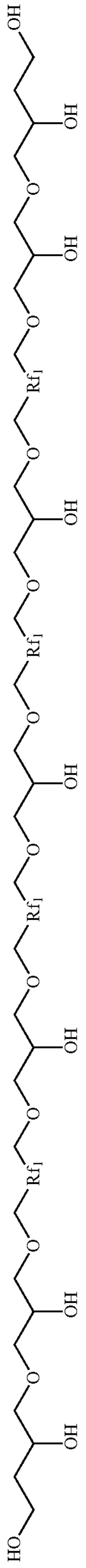

(in the four $Rf_1$'s in Formula (G), h and i each indicate an average degree of polymerization, h represents 1 to 20, and i represents 0 to 20; and h and i in the four $Rf_1$'s may be different from each other or may be partially or entirely the same as each other)

(in the four $Rf_1$'s in Formula (H), h and i each indicate an average degree of polymerization. h represents 1 to 20. and i represents 0 to 20; and h and i in the four $Rf_1$'s may be different from each other or may be partially or entirely the same as each other)

(in the four $Rf_1$'s in Formula (1), h and i each indicate an average degree of polymerization, h represents 1 to 20, and i represents 0 to 20; and h and i in the four $Rf_1$'s may be different from each other or may be partially or entirely the same as each other)

(J)
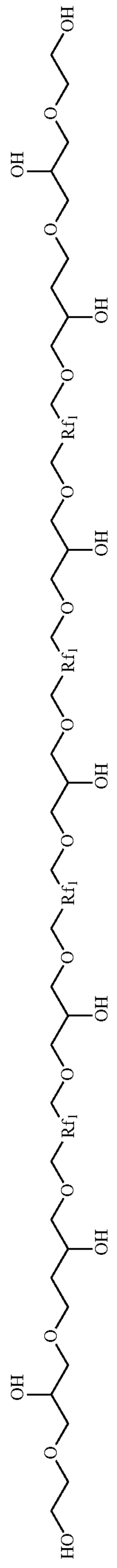
(K)
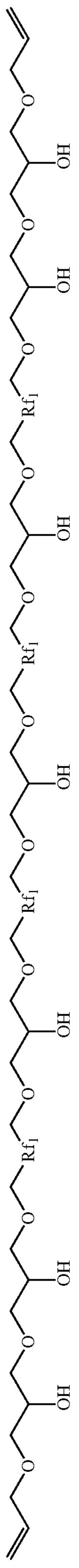
(L)
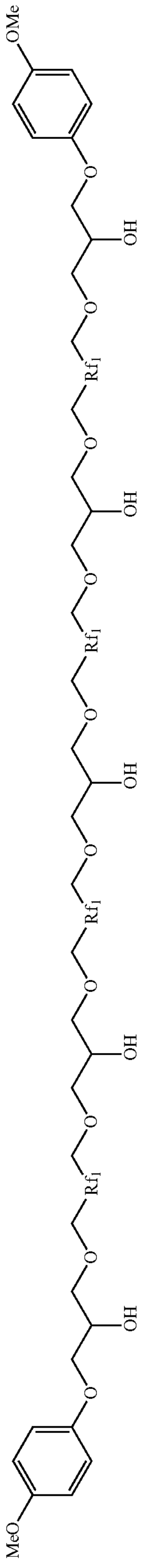

(in the four $Rf_1$'s in Formula (J), h and i each indicate an average degree of polymerization, h represents 1 to 20, and i represents 0 to 20; and h and i in the four $Rf_1$'s may be different from each other or may be partially or entirely the same as each other)

(in the four $Rf_1$'s in Formula (K), h and i each indicate an average degree of polymerization, h represents 1 to 20, and i represents 0 to 20; and h and i in the four $Rf_1$'s may be different from each other or may be partially or entirely the same as each other)

(in the four $Rf_1$'s in Formula (L), h and i each indicate an average degree of polymerization, h represents 1 to 20, and i represents 0 to 20; h and i in the four $Rf_1$'s may be different from each other or may be partially or entirely the same; and Me represents a methyl group)

(M)
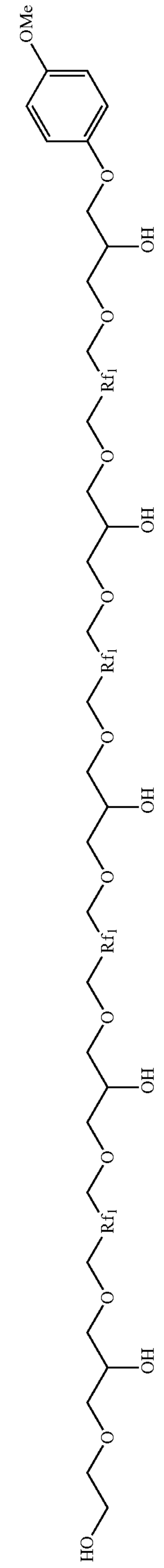
(N)
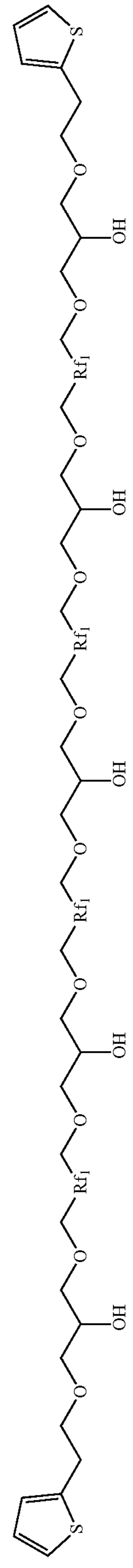
(O)
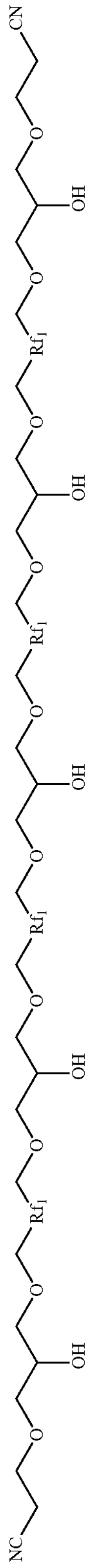

(in the four $Rf_1$'s in Formula (M), h and i each indicate an average degree of polymerization, h represents 1 to 20, and i represents 0 to 20; h and i in the four $Rf_1$'s may be different from each other or may be partially or entirely the same; and Me represents a methyl group)

(in the four $Rf_1$'s in Formula (N), h and i each indicate an average degree of polymerization, h represents 1 to 20, and i represents 0 to 20; and h and i in the four $Rf_1$'s may be different from each other or may be partially or entirely the same as each other)

(in the four $Rf_1$'s in Formula (0), h and i each indicate an average degree of polymerization, h represents 1 to 20, and i represents 0 to 20; and h and i in the four $Rf_1$'s may be different from each other or may be partially or entirely the same as each other)

(P)
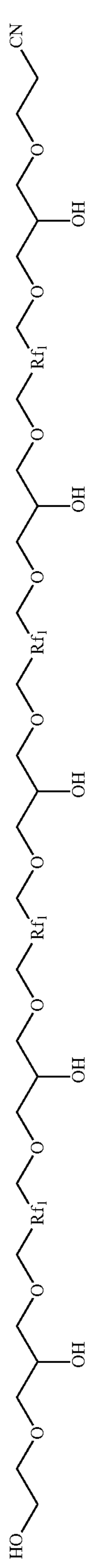
(Q)
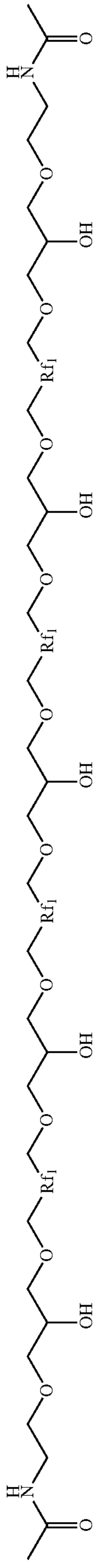
(R)
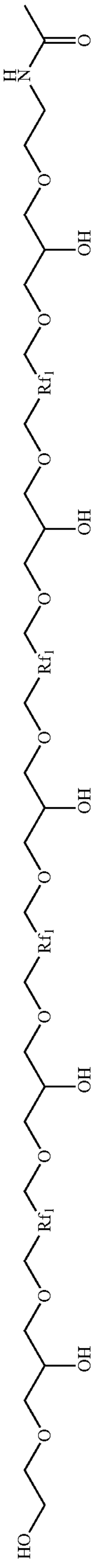

(in the four $Rf_1$'s in Formula (P), h and i each indicate an average degree of polymerization, h represents 1 to 20, and i represents 0 to 20; and h and i in the four $Rf_1$'s may be different from each other or may be partially or entirely the same as each other)

(in the four $Rf_1$'s in Formula (Q), h and i each indicate an average degree of polymerization, h represents 1 to 20, and i represents 0 to 20; and h and i in the four $Rf_1$'s may be different from each other or may be partially or entirely the same as each other)

(in the four $Rf_1$'s in Formula (R), h and i each indicate an average degree of polymerization, h represents 1 to 20, and i represents 0 to 20; and h and i in the four $Rf_1$'s may be different from each other or may be partially or entirely the same as each other)

(S)
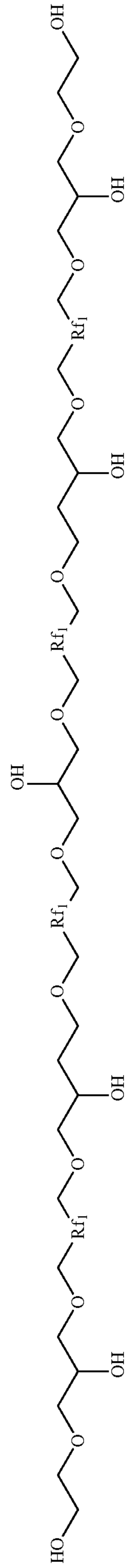
(T)
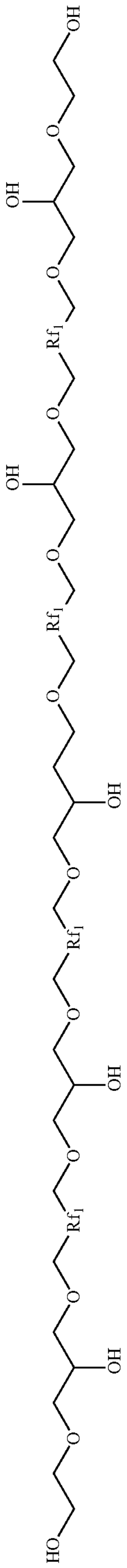
(U)
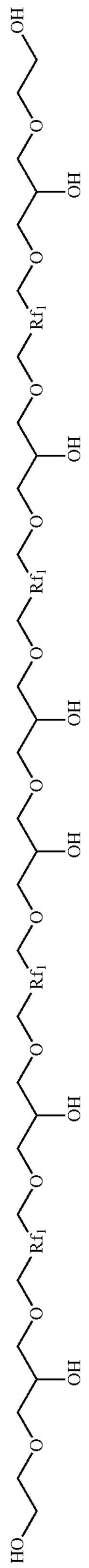

(in the four $Rf_1$'s in Formula(S), h and i each indicate an average degree of polymerization, h represents 1 to 20, and i represents 0 to 20; and h and i in the four $Rf_1$'s may be different from each other or may be partially or entirely the same as each other)

(in the four $Rf_1$'s in Formula (T), h and i each indicate an average degree of polymerization, h represents 1 to 20, and i represents 0 to 20; and h and i in the four $Rf_1$'s may be different from each other or may be partially or entirely the same as each other)

(in the four $Rf_1$'s in Formula (U), h and i each indicate an average degree of polymerization, h represents 1 to 20, and i represents 0 to 20; and h and i in the four $Rf_1$'s may be different from each other or may be partially or entirely the same as each other)

(V)
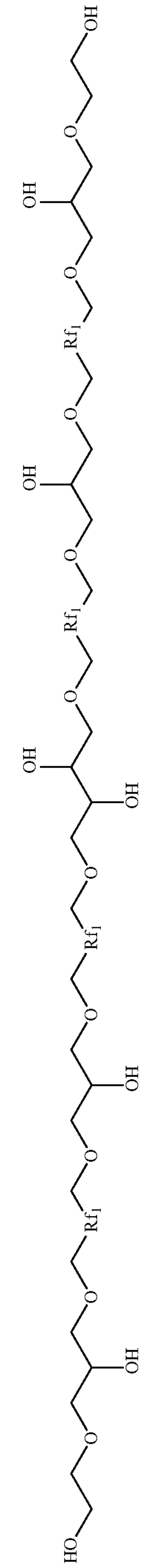
(W)
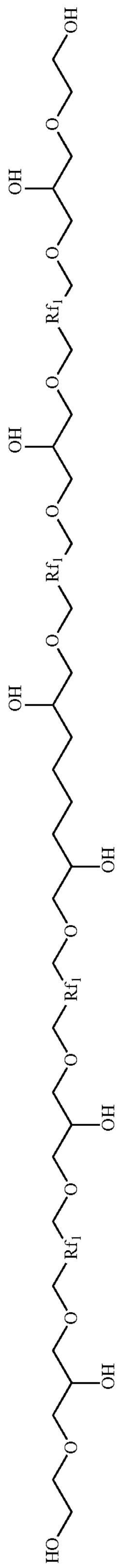

(in the four $Rf_1$'s in Formula (V), h and i each indicate an average degree of polymerization, h represents 1 to 20, and i represents 0 to 20; and h and i in the four $Rf_1$'s may be different from each other or may be partially or entirely the same as each other)

(in the four $Rf_1$'s in Formula (W), h and i each indicate an average degree of polymerization, h represents 1 to 20, and i represents 0 to 20; and h and i in the four $Rf_1$'s may be different from each other or may be partially or entirely the same as each other)

repeating units of the PFPE chain is calculated from an integrated value measured by $^{19}$F-NMR to determine the number-average molecular weight. In the measurement of nuclear magnetic resonance (NMR), a sample is diluted with a solvent of hexafluorobenzene/d-acetone (4/1 v/v) and measured. A reference of the $^{19}$F-NMR chemical shift is a peak of hexafluorobenzene at −164.7 ppm and a reference of the $^{1}$H-NMR chemical shift is a peak of acetone at 2.2 ppm.

The fluorine-containing ether compound of the present embodiment is preferably subjected to molecular weight (X)

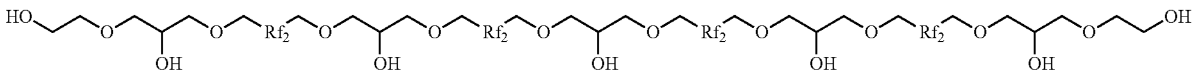

(Y)

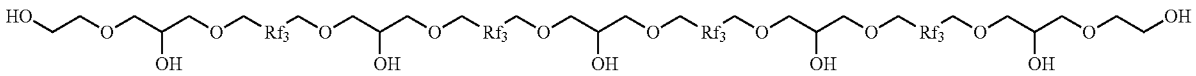

(Z)

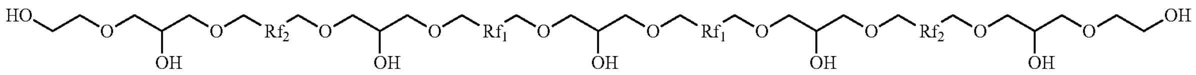

(in the four $Rf_2$'s in Formula (X), j indicates an average degree of polymerization and represents 1 to 15; and j's in the four $Rf_2$'s may be different from each other, or may be partially or entirely the same each other)

(in the four $Rf_3$'s in Formula (Y), k indicates an average degree of polymerization and represents 1 to 10; and k's in the four $Rf_3$'s may be different from each other, or may be partially or entirely the same each other)

(in the two $Rf_2$'s in Formula (Z), j indicates an average degree of polymerization and represents 1 to 15; in the two $Rf_2$'s, j's may be the same as or different from each other; in the two $Rf_1$'s in Formula (Z), h and i each indicate an average degree of polymerization, h represents 1 to 20, and i represents 0 to 20; and in the two $Rf_1$'s, h and i may be the same as or different from each other)

A number-average molecular weight (Mn) of the fluorine-containing ether compound of the present embodiment is preferably in a range of 500 to 10,000, more preferably in a range of 1,000 to 8,000, still more preferably in a range of 1,500 to 7,000, and particularly preferably in a range of 2,000 to 6,000. In a case where the number-average molecular weight is 500 or more, the lubricating layer consisting of the lubricant including the fluorine-containing ether compound of the present embodiment has excellent heat resistance. The number-average molecular weight of the fluorine-containing ether compound is more preferably 1,000 or more. In addition, in a case where the number-average molecular weight is 10,000 or less, the viscosity of the fluorine-containing ether compound is appropriate, and a lubricating layer with a small film thickness can be easily formed by applying the lubricant including the fluorine-containing ether compound. The number-average molecular weight of the fluorine-containing ether compound is more preferably 8,000 or less since a viscosity which is easy to handle is obtained in a case of being applied to the lubricant.

The number-average molecular weight (Mn) of the fluorine-containing ether compound is a value measured by $^{1}$H-NMR and $^{19}$F-NMR using AVANCE III 400 manufactured by Bruker BioSpin GmbH. Specifically, the number of fractionation by an appropriate method to have a polydispersity (ratio of a weight average molecular weight (Mw)/a number-average molecular weight (Mn)) of 1.3 or less.

In the present embodiment, a method for fractionating the molecular weight is not particularly limited, and for example, a molecular weight fractionation by a silica gel column chromatography method, a gel permeation chromatography (GPC) method, or the like, a molecular weight fractionation by a supercritical extraction method, or the like can be used.

"Production Method"

A method for producing a fluorine-containing ether compound of the present embodiment is not particularly limited, and the fluorine-containing ether compound can be produced by a known production method in the related art. The fluorine-containing ether compound of the present embodiment can be produced, for example, by a production method shown below.

FIG. 1 is a flowchart for showing an example of the method for producing a fluorine-containing ether compound of the present invention. (a) in FIG. 1 is a flowchart showing all steps in the method for producing a fluorine-containing ether compound. (b) shown in FIG. 1 is a flowchart showing a linked structure producing step in (a) shown in FIG. 1. (c) shown in FIG. 1 is a flowchart showing a compound structure producing step in (a) shown in FIG. 1.

The method for producing a fluorine-containing ether compound of the present embodiment includes an end part producing step S1, a linked structure producing step S2, and a compound structure producing step S3, as shown in (a) shown in FIG. 1.

[End Part Producing Step S1]

In the end part producing step S1, an intermediate compound 1a having a group corresponding to $R^1$—$CH_2$—$R^{2a}$—$CH_2$— in Formula (1) and an intermediate compound 1b having a group corresponding to —$CH_2$—$R^{2d}$—$CH_2$—$R^4$ in Formula (1) are produced. Either the intermediate compound 1a or the intermediate compound 1b may be produced first.

In the production method of the present embodiment, in a case where a compound in which $R^{2a}$ and $R^{2d}$ in Formula (1) are the same as each other and $R^1$ and $R^4$ are the same as each other is produced as the fluorine-containing ether compound, the intermediate compound 1a and the intermediate compound 1b can be produced at the same time in the end part producing step S1. Therefore, a compound in which $R^{2a}$ and $R^{2d}$ in Formula (1) are the same as each other and $R^1$ and $R^4$ are the same as each other can be efficiently and easily produced.

An intermediate compound 1a and an intermediate compound 1b can be specifically produced by, for example, a method shown below.

<Case where at Least One of $R^{2a}$ and $R^{2d}$ or $R^1$ and $R^4$ is Different from Each Other (Case where Intermediate Compound 1a and Intermediate Compound 1b are Different from Each Other)>

First, a fluorine-based compound in which hydroxymethyl groups ($—CH_2OH$) are arranged at both terminals of a perfluoropolyether chain corresponding to $R^{2a}$ in Formula (1) is prepared, and the hydroxy group of the hydroxymethyl group arranged at one terminal and an epoxy compound having a group corresponding to $R^1$ in Formula (1) are reacted with each other. Thus, an intermediate compound 1a having a group corresponding to $R^1$ at one of terminals of the perfluoropolyether chain corresponding to $R^{2a}$ is obtained.

Next, a fluorine-based compound in which hydroxymethyl groups ($—CH_2OH$) are arranged at both terminals of a perfluoropolyether chain corresponding to $R^{2d}$ in Formula (1) is prepared, and the hydroxy group of the hydroxymethyl group arranged at one terminal and an epoxy compound having a group corresponding to $R^4$ in Formula (1) are reacted with each other. Thus, an intermediate compound 1b having a group corresponding to $R^4$ at one of terminals of the perfluoropolyether chain corresponding to $R^{2d}$ is obtained.

<Case where $R^{2a}$ and $R^{2d}$ are Same as Each Other, and $R^1$ and $R^4$ are Same as Each Other (Case where Intermediate Compound 1a and Intermediate Compound 1b are Same as Each Other)>

First, a fluorine-based compound in which a hydroxymethyl group ($—CH_2OH$) is arranged at each of both terminals of a perfluoropolyether chain corresponding to $R^{2a}$ ($R^{2d}$) in Formula (1) is prepared. Next, the hydroxy group of the hydroxymethyl group arranged at one of terminals of the fluorine-based compound and an epoxy compound having a group corresponding to $R^1$ (=a group corresponding to $R^4$) in Formula (1) are reacted with each other. Thus, an intermediate compound 1a (=an intermediate compound 1b) having a group corresponding to $R^1$ (=a group corresponding to $R^4$) at one of terminals of the perfluoropolyether chain corresponding to $R^{2a}$ (=$R^{2d}$) is obtained.

As the epoxy compound having a group corresponding to $R^1$ (or a group corresponding to $R^4$) in Formula (1), for example, compounds represented by Formulae (5-1) to (5-14) can be used. THP in Formulae (5-1) to (5-10) represents a tetrahydropyranyl group. In Formula (5-11), Me represents a methyl group.

In a case where the fluorine-based compound and the epoxy compound are reacted with each other to synthesize the intermediate compound 1a (or the intermediate compound 1b), the hydroxy group contained in the epoxy compound may be protected using an appropriate protective group, and then the product may be reacted with the fluorine-based compound.

(5-1)

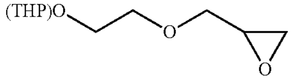

(5-2)

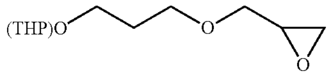

(5-3)

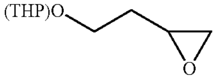

(5-4)

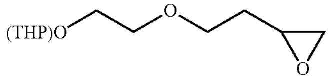

(5-5)

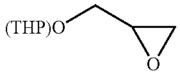

(5-6)

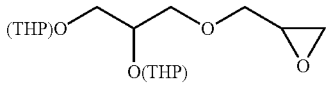

(5-7)

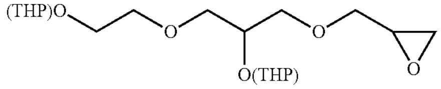

(5-8)

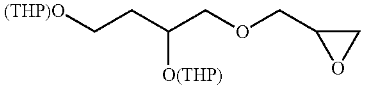

(5-9)

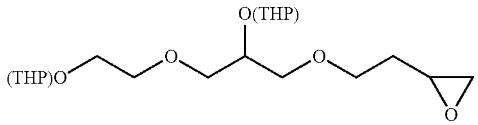

(5-10)

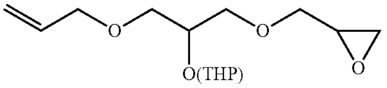

(5-11)

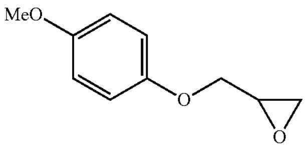

(5-12)

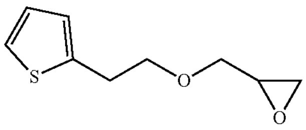

(5-13)

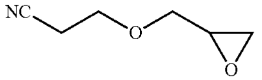

(5-14)

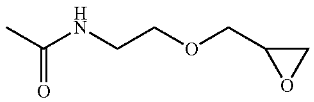

The epoxy compound having a group corresponding to $R^1$ in Formula (1) (or a group corresponding to $R^4$) can be produced by, for example, a method shown below. That is, the epoxy compound can be produced using a method in which an alcohol having a structure corresponding to a part of the terminal group represented by $R^1$ (or $R^4$) in Formula (1) and a halogen compound having an epoxy group are reacted with each other, as shown in Formula (6-1).

(6-1)

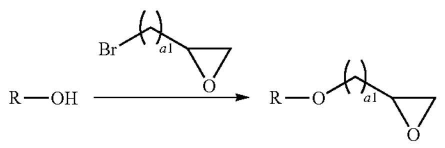

(in Formula (6-1), R represents a structure corresponding to a part of the terminal group represented by $R^1$ or $R^4$ in Formula (1); and a1 represents an integer of 1 or more)

In addition, the epoxy compound can also be produced using a method shown below. That is, an alcohol having a structure corresponding to a part of the terminal group represented by $R^1$ (or $R^4$) in Formula (1) and a halogen compound having an alkenyl group are reacted with each other, as shown in Formula (6-2). Thereafter, a method in which the obtained compound is oxidized with m-chloroperbenzoic acid (mCPBA) can be used to produce the epoxy compound.

(6-2)

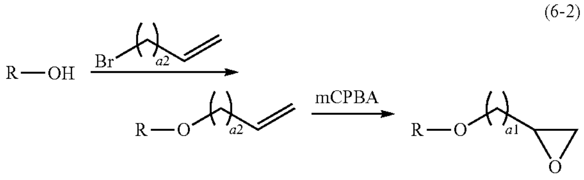

(in Formula (6-2), R represents a structure corresponding to a part of the terminal group represented by $R^1$ or $R^4$ in Formula (1); and a2 represents an integer of 1 or more)

In addition, the epoxy compound can also be produced using a method shown below. That is, an alcohol having a structure corresponding to a part of the terminal group represented by $R^1$ (or $R^4$) in Formula (1) and a compound having an alkenyl group and an epoxy group are subjected to an addition reaction, as shown in Formula (6-3). Thereafter, a method in which the compound obtained by the addition reaction is oxidized with m-chloroperbenzoic acid (mCPBA) can be used to produce the epoxy compound. After appropriately protecting the hydroxy group generated by the addition reaction, the product may be oxidized using mCPBA.

(6-3)

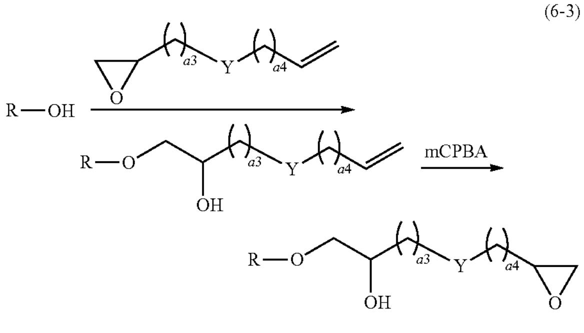

(in Formula (6-3), R represents a structure corresponding to a part of the terminal group represented by $R^1$ or $R^4$ in Formula (1); a3 and a4 each represent an integer of 0 or more; and Y represents O or $CH_2$)

[Linked Structure Producing Step S2]

In the linked structure producing step S2, an intermediate compound 3 having a group corresponding to $—R^{3a}—CH_2—R^{2b}—CH_2—R^{3b}—CH_2—R^{2c}—CH_2—R^{3c}—$ in Formula (1) is produced.

The linked structure producing step S2 may be performed after the end part producing step S1 or may be performed before the end part producing step S1.

The linked structure producing step S2 includes a linking end part producing step S21, an $R^{2b}$-side reaction step S22, and an $R^{2c}$-side reaction step S23, as shown in (b) of FIG. 1.

In the linking end part producing step S21, an intermediate compound 2a having a group corresponding to $—R^{3a}—CH_2—R^{2b}—CH_2—$ in Formula (1) and an intermediate compound 2b having a group corresponding to $—CH_2—R^{2c}—CH_2—R^{3c}—$ in Formula (1) are produced. Either of the intermediate compound 2a or the intermediate compound 2b may be produced first.

In the $R^{2b}$-side reaction step S22, the $R^{2b}$-side end part of the compound having a group corresponding to $R^{3b}$ in Formula (1) and the intermediate compound 2a are reacted with each other. In the $R^{2c}$-side reaction step S23, the $R^{2c}$-side end part of the compound having a group corresponding to $R^{3b}$ in Formula (1) and the intermediate compound 2b are reacted with each other. The $R^{2c}$-side reaction step S23 may be performed after the $R^{2b}$-side reaction step S22 or may be performed before the $R^{2b}$-side reaction step S22.

In the production method of the present embodiment, in a case of producing a compound in which $R^{2b}$ and $R^{2c}$ in Formula (1) are the same as each other, and atoms included in $R^{3a}$ and atoms included in $R^{3c}$ are symmetrically arranged with respect to $R^{3b}$ as the fluorine-containing ether compound, the intermediate compound 2a and the intermediate compound 2b can be produced at the same time in the linked structure producing step S2. Therefore, the compound in which $R^{2b}$ and $R^{2c}$ in Formula (1) are the same as each other and atoms included in $R^{3a}$ and atoms included in $R^{3c}$ are symmetrically arranged with respect to $R^{3b}$ can be efficiently and easily produced. In addition, in a case where the intermediate compound 2a and the intermediate compound 2b are produced at the same time, the intermediate compound 2a and the intermediate compound 2b are the same as each other. Therefore, the $R^{2b}$-side reaction step S22 and the $R^{2c}$-side reaction step S23 can be performed at the same time. Therefore, a compound in which $R^{2b}$ and $R^{2c}$ in Formula (1) are the same as each other, and atoms included in $R^{3a}$ and atoms included in $R^{3c}$ are symmetrically arranged with respect to $R^{3b}$ has excellent productivity.

The intermediate compound 2a and the intermediate compound 2b can be specifically produced by, for example, a method shown below.

<Case where $R^{2b}$ and $R^{2c}$ are Different from Each Other, and/or Atom Included in $R^{3a}$ and Atom Included in $R^{3}$% Re not Symmetrically Arranged with Respect to $R^{3b}$(Case where Intermediate Compound 2a and Intermediate Compound 2b are Different from Each Other)>

First, a fluorine-based compound in which hydroxymethyl groups ($—CH_2OH$) are each arranged at both terminals of a perfluoropolyether chain corresponding to $R^{2b}$ in Formula (1) is prepared, and the hydroxy group of the hydroxymethyl group arranged at one terminal and a halogen compound or epoxy compound having an alkenyl group corresponding to $R^{3a}$ are reacted with each other. Thus, an intermediate compound 2a having an alkenyl group corresponding to $R^{3a}$ at one of terminals of the perfluoropolyether chain corresponding to $R^{2b}$ is obtained.

Next, a fluorine-based compound in which hydroxymethyl groups (—$CH_2OH$) are each arranged at both terminals of a perfluoropolyether chain corresponding to $R^{2c}$ in Formula (1) is prepared, and the hydroxy group of the hydroxymethyl group arranged at one terminal and a halogen compound or epoxy compound having an alkenyl group corresponding to $R^{3c}$ are reacted with each other. Thus, an intermediate compound 2b having a group corresponding to $R^{3c}$ at one of terminals of the perfluoropolyether chain corresponding to $R^{2c}$ is obtained.

<Case where $R^{2b}$ and $R^{2c}$ are Same as Each Other, and Atom Included in $R^{3a}$ and Atom Included in $R^{3c}$ are Symmetrically Arranged with Respect to $R^{3b}$ (Case where Intermediate Compound 2a and Intermediate Compound 2b are Same as Each Other)>

A fluorine-based compound in which a hydroxymethyl group (—$CH_2OH$) is arranged at each of both terminals of a perfluoropolyether chain corresponding to $R^{2b}$ ($R^{2c}$) in Formula (1) is prepared. Next, the hydroxy group of the hydroxymethyl group arranged at one of terminals of the fluorine-based compound and a halogen compound or epoxy compound having an alkenyl group corresponding to $R^{3a}$ (=$R^{3c}$) are reacted with each other. As a result, an intermediate compound 2a (=an intermediate compound 2b) having an alkenyl group corresponding to $R^{3a}$ (=$R^{3c}$) at one of terminals of the perfluoropolyether chain corresponding to $R^{2b}$ (=$R^{2c}$) in Formula (1) is obtained.

As the halogen compound or epoxy compound having an alkenyl group corresponding to $R^{3a}$ (or $R^{3c}$) in Formula (1), for example, compounds represented by Formulae (7-1) to (7-5) can be used.

(7-1)

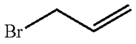

(7-2)

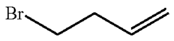

(7-3)

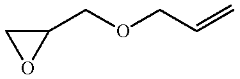

(7-4)

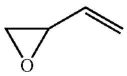

(7-5)

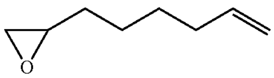

The $R^{2b}$-side reaction step S22 and the $R^{2c}$-side reaction step S23 can be specifically performed by, for example, a method shown below.

<Case where $R^{2b}$ and $R^{2c}$ are Different from Each Other, and/or Atom Included in $R^{3a}$ and Atom Included in $R^{3c}$ are not Symmetrically Arranged with Respect to $R^{3b}$(Case where Intermediate Compound 2a and Intermediate Compound 2b are Different from Each Other)>

One molecule of the intermediate compound 2a and a halogen compound or diepoxy compound having an epoxy group corresponding to $R^{3b}$ are reacted with each other ($R^{2b}$-side reaction step S22), and then the obtained compound is reacted with one molecule of the intermediate compound 2b ($R^{2c}$-side reaction step S23).

Alternatively, the halogen compound or diepoxy compound having an epoxy group corresponding to $R^{3b}$ and one molecule of the intermediate compound 2b are reacted with each other ($R^{2c}$-side reaction step S23), and then the obtained compound is reacted with one molecule of the intermediate compound 2a ($R^{2b}$-side reaction step S22).

Thus, the perfluoropolyether chains corresponding to $R^{2b}$ and $R^{2c}$ in Formula (1) are each bonded to the linking group corresponding to $R^{3b}$ through methylene groups, and an intermediate compound 3 having an alkenyl group corresponding to $R^{3a}$ and an alkenyl group corresponding to $R^{3c}$ at both terminals thereof is obtained.

<Case where $R^{2b}$ and $R^{2c}$ are Same as Each Other, and Atom Included in $R^{3a}$ and Atom Included in $R^{3}$% Re Symmetrically Arranged with Respect to $R^{3b}$ (Case where Intermediate Compound 2a and Intermediate Compound 2b are Same as Each Other)>

Two molecules of the intermediate compound 2a (=the intermediate compound 2b) and a halogen compound or diepoxy compound having an epoxy group corresponding to $R^{3b}$ are reacted with each other. Thus, the perfluoropolyether chain corresponding to $R^{2b}$ (=$R^{2c}$) in Formula (1) is bonded to the linking group corresponding to $R^{3b}$ through the methylene group, and an intermediate compound 3 having alkenyl groups corresponding to $R^{3a}$ (=$R^{3c}$) at both terminals is obtained.

As the halogen compound or diepoxy compound having an epoxy group, corresponding to $R^{3b}$ in Formula (1), compounds represented by, for example, Formulae (8-1) to (8-5) can be used.

(8-1)

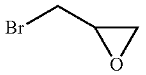

(8-2)

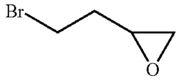

(8-3)

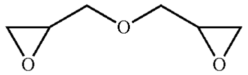

(8-4)

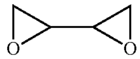

(8-5)

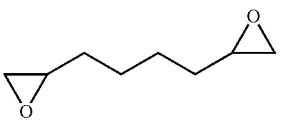

[Compound Structure Producing Step S3]

As shown in (c) of FIG. 1, the compound structure producing step S3 includes an $R^1$-side reaction step S31 and an $R^4$-side reaction step S32. In the $R^1$-side reaction step S31, the $R^{3a}$-side end part of the intermediate compound 3 (or an intermediate compound 3-1 which will be described later) and the intermediate compound 1a are reacted with each other. In the $R^4$-side reaction step S32, the $R^{3c}$-side end part of the intermediate compound 3 (or an intermediate compound 3-1 which will be described later) and the intermediate compound 1b are reacted with each other. The $R^4$-side reaction step S32 may be performed after the $R^1$-side reaction step S31 or may be performed before the $R^1$-side reaction step S31.

In the production method of the present embodiment, in a case where the compound represented by Formula (1) in which $R^{2a}$ and $R^{2d}$ are the same as each other and $R^1$ and $R^4$ are the same as each other is produced as the fluorine-containing ether compound, the $R^1$-side reaction step S31 and the $R^4$-side reaction step S32 can be performed at the same time since the group corresponding to $—R^1—CH_2—R^{2a}—CH_2$-contained in the intermediate compound 1a and the group corresponding to $—CH_2—R^{2a}—CH_2—R^4$ contained in the intermediate compound 1b are the same as each other. Therefore, a compound in which $R^{2a}$ and $R^{2d}$ in Formula (1) are the same as each other and $R^1$ and $R^4$ are the same as each other can be efficiently and easily produced.

In particular, in the production method of the present embodiment, in a case where the compound of Formula (1) in which $R^{2a}$ and $R^{2d}$ are the same as each other, $R^{2b}$ and $R^{2c}$ are the same as each other, atoms included in $R^{3a}$ and atoms included in $R^{3c}$ are symmetrically arranged with respect to $R^{3b}$, and $R^1$ and $R^4$ are the same as each other is produced as the fluorine-containing ether compound, a method in which in the end part producing step S1, the intermediate compound 1a and the intermediate compound 1b are produced at the same time, in the linked structure producing step S2, the intermediate compound 2a and the intermediate compound 2b are produced at the same time, the $R^{2b}$-side reaction step S22 and the $R^{2c}$-side reaction step S23 are performed at the same time, and in the compound structure producing step S3, the $R^1$-side reaction step S31 and the $R^4$-side reaction step S32 are performed at the same time, can be used, and thus, the compound can be produced more efficiently and easily.

The $R^1$-side reaction step S31 and the $R^4$-side reaction step S32 can be specifically carried out by, for example, a method shown below.

The intermediate compound 3 used in the compound structure producing step S3 only needs to have a group corresponding to $—R^{3a}—CH_2—R^{2b}—CH_2—R^{3b}—CH_2—R^{2c}—CH_2—R^{3c}—$ in Formula (1). Specifically, in a case of performing the compound structure producing step S3, the intermediate compound 3 produced in the linked structure producing step S2 of the present embodiment may be used as it is, or the intermediate compound 3 produced in the linked structure producing step S2 after being subjected to a treatment in which the carbon-carbon double bonds present at both terminals of the compound are oxidized to form epoxy groups, which can be appropriately determined depending on the types of the intermediate compound 1a and the intermediate compound 1b.

In the present embodiment, a case where an intermediate compound (hereinafter referred to as an "intermediate compound 3-1") in which the carbon-carbon double bonds present at both terminals of the intermediate compound 3 produced in the linked structure producing step S2 are oxidized to epoxy groups is used as the intermediate compound 3 will be described as an example. In the intermediate compound 3-1, the perfluoropolyether chain corresponding to $R^{2b}$ and the perfluoropolyether chain corresponding to $R^{2c}$ in Formula (1) are bonded to the linking group corresponding to $R^{3b}$, each through a methylene group, and thus, the epoxy group corresponding to $R^{3a}$ is present at the terminal on the $R^{2b}$ side and the epoxy group corresponding to $R^{3c}$ is present at the terminal on the $R^{2b}$ side.

A reaction of oxidizing the carbon-carbon double bonds present at both terminals of the intermediate compound 3 to generate the intermediate compound 3-1 may be carried out after appropriately protecting the hydroxy group contained in the intermediate compound 3.

<Case where at Least One of $R^{2a}$ and $R^{2d}$ or $R^1$ and $R^4$ is Different from Each Other (Case where Intermediate Compound 1a and Intermediate Compound 1b are Different from Each Other)>

One molecule of the intermediate compound 1a and the epoxy group present at the terminal of the intermediate compound 3-1 on $R^{2b}$ side are subjected to an addition reaction ($R^1$-side reaction step S31), and then the obtained compound is reacted with one molecule of the intermediate compound 1b ($R^4$-side reaction step S32).

Alternatively, one molecule of the intermediate compound 1b and the epoxy group present at the terminal of the intermediate compound 3-1 on the $R^{2c}$ side are subjected to an addition reaction ($R^4$-side reaction step S32), and then the obtained compound is reacted with one molecule of the intermediate compound 1a ($R^1$-side reaction step S31).

<Case where $R^{2a}$ and $R^{2d}$ are Same as Each Other, and $R^1$ and $R^4$ are Same as Each Other (Case where Intermediate Compound 1a and Intermediate Compound 1b are Same as Each Other)>

Two molecules of the intermediate compound 1a (=the intermediate compound 1b) and the epoxy groups present at both terminals of the intermediate compound 3-1 are subjected to an addition reaction.

Thus, after the $R^1$-side reaction step S31 and the $R^4$-side reaction step S32 are performed, a protective group contained in the reaction product is deprotected using an appropriate reaction agent.

By performing the steps above, the compound represented by Formula (1) can be produced.

The fluorine-containing ether compound of the present embodiment is a compound represented by Formula (1), and has a skeleton where four perfluoropolyether chains ($R^{2a}$, $R^{2b}$, $R^{2c}$, and $R^{2d}$) are bonded through divalent linking groups ($R^{3a}$, $R^{3b}$, and $R^{3c}$) having one or more polar groups between two methylene groups ($—CH_2—$), at least one of three linking groups forming the skeleton is represented by Formula (3), and terminal groups ($R^1$ and $R^4$) having 1 to 50 carbon atoms and having one or more polar groups are bonded to both sides of the skeleton through methylene groups ($—CH_2—$). Therefore, the lubricating layer formed on the protective layer using the lubricant including the fluorine-containing ether compound of the present embodiment has good floating stability of a magnetic head and a high corrosion suppressing effect on a magnetic recording medium.

In addition, in the method for producing a fluorine-containing ether compound of the present embodiment, an intermediate compound 1a having a group corresponding to $R^1—CH_2—R^{2a}—CH_2—$, an intermediate compound 1b having a group corresponding to $—CH_2—R^{2d}—CH_2—R^4$, an intermediate compound 2a having a group corresponding to $—R^{3a}—CH_2—R^{2b}—CH_2—$, and an intermediate compound 2b having a group corresponding to $—CH_2—R^{2c}—CH_2—R^{3c}—$ are produced. The $R^{2b}$-side end part of the compound having a group corresponding to $R^{3b}$ and the intermediate compound 2a are reacted with each other, and the $R^{2c}$-side end part of the compound having a group corresponding to $R^{3b}$ and the intermediate compound 2b are reacted with each other to produce an intermediate compound 3 having a group corresponding to $—R^{3a}—CH_2—R^{2b}—CH_2—R^{3b}—CH_2—R^{2c}—CH_2-R^{3c}$. Thereafter, the $R^{3a}$-side end part of the intermediate compound 3 (or the intermediate compound 3-1 obtained by oxidizing the intermediate compound 3) is reacted with the intermediate compound 1a, and the $R^{3c}$-side end part of the intermediate compound 3 (or the intermediate compound 3-1 obtained by oxidizing the intermediate compound 3) is reacted with the intermediate compound 1b. Therefore, the fluorine-containing ether compound of the present embodiment, represented by Formula (1), having a skeleton where four perfluoropolyether chains ($R^{2a}$, $R^{2b}$, $R^{2c}$, and $R^{2d}$) are bonded through divalent linking groups ($R^{3a}$, $R^{3b}$, and $R^{3c}$) each interposed between two methylene groups, can be selectively produced.

According to the method for producing a fluorine-containing ether compound of the present embodiment, it is possible to produce the fluorine-containing ether compound represented by Formula (1) with high purity. On the other hand, as a method for producing a fluorine-containing ether compound, there are <1> a method in which a fluorine-based compound having hydroxymethyl groups ($—CH_2OH$) arranged at both terminals of a perfluoropolyether chain is reacted with epichlorohydrin (for example, the method described in Patent Document 5), and <2> a method in which a fluorine-based compound having hydroxymethyl groups ($—CH_2OH$) arranged at both terminals of a perfluoropolyether chain is reacted with glycidol, and the obtained mixture is reacted with a diepoxy compound (for example, the method described in Patent Document 6).

In the methods of <1> and <2> that are known in the related art, a compound corresponding to the divalent linking groups ($R^{3a}$, $R^{3b}$, and $R^{3c}$) and a compound corresponding to the perfluoropolyether chains ($R^{2a}$, $R^{2b}$, $R^{2c}$, and $R^{2d}$) are randomly react with each other to generate a mixture of fluorine-containing ether compounds having different the numbers of perfluoropolyether chains included in the molecule. The target compound and by-products included in the generated mixture have similar polarities, whereby it is not likely to be separated by column chromatography, and have similar boiling points, whereby it is not likely to be separated by distillation. Accordingly, the generated mixture makes it difficult to isolate target compound. Therefore, in the methods of <1> and <2>, it is difficult to obtain a fluorine-containing ether compound having a desired skeleton where four perfluoropolyether chains ($R^{2a}$, $R^{2b}$, $R^{2c}$, and $R^{2a}$) are bonded through divalent linking groups ($R^{3a}$, $R^{3b}$, and $R^{3c}$), each interposed between two methylene groups with high purity.

In addition, the mixture obtained by the methods of <1> and <2> includes, as by-products, a large amount of a compound having 3 or less perfluoropolyether chains, which has poor adhesion to the protective layer, and/or a compound having 5 or more perfluoropolyether chains, which has poor fluidity of the molecule.

On the other hand, in the method for producing a fluorine-containing ether compound of the present embodiment, such generation of by-products can be suppressed and the fluorine-containing ether compound of the present embodiment, in which a lubricating layer having an even coating state and excellent adhesion to the protective layer is easily formed, can be selectively produced.

[Lubricant for Magnetic Recording Medium]

The lubricant for a magnetic recording medium of the present embodiment includes the fluorine-containing ether compound represented by Formula (1).

In the lubricant of the present embodiment, known materials used as a material for the lubricant can be used in mixture as necessary as long as the characteristics are not impaired by incorporating the fluorine-containing ether compound represented by Formula (1).

Specific examples of the known materials include FOMBLIN (registered trademark) ZDIAC, FOMBLIN ZDEAL, and FOMBLIN AM-2001 (all of which are manufactured by Solvay Solexis), and Moresco A20H (manufactured by Moresco).

The known material used in mixture with the lubricant of the present embodiment preferably has a number-average molecular weight of 1,000 to 10,000.

In a case where the lubricant of the present embodiment includes a material other than the fluorine-containing ether compound represented by Formula (1), a content of the fluorine-containing ether compound represented by Formula (1) in the lubricant of the present embodiment is preferably 50% by mass or more, more preferably 70% by mass or more, still more preferably 90% by mass or more, and particularly preferably 95% by mass or more.

The lubricant of the present embodiment includes the fluorine-containing ether compound represented by Formula (1). Therefore, the lubricant of the present embodiment can be evenly applied with thin thickness, and can form a lubricating layer of thin thickness, good floating stability of a magnetic head, and a high corrosion suppressing effect on a magnetic recording medium.

[Magnetic Recording Medium]

The magnetic recording medium of the present embodiment is formed by sequentially providing at least a magnetic layer, a protective layer, and a lubricating layer on a substrate.

In the magnetic recording medium of the present embodiment, one or two or more underlayers can be provided between the substrate and the magnetic layer, as necessary. In addition, at least one of an adhesion layer and a soft magnetic layer can be provided between the underlayer and the substrate.

Figure 2:
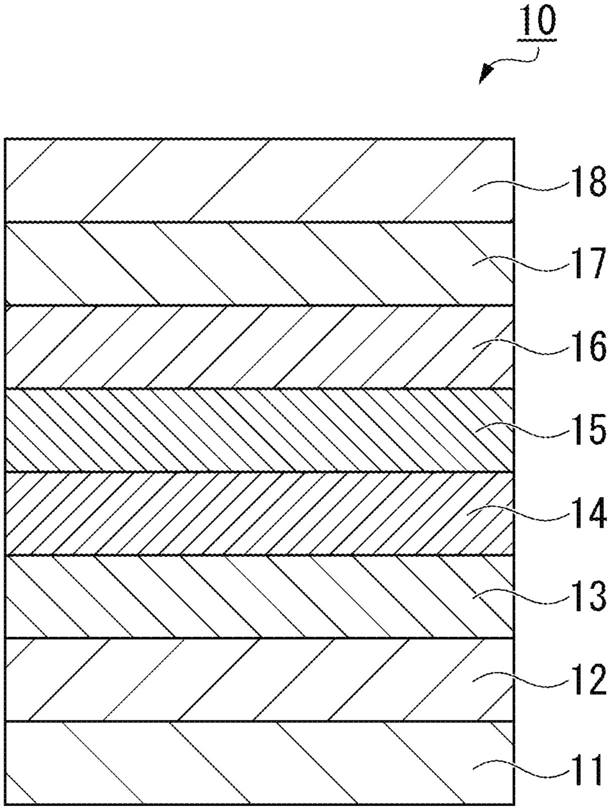
FIG. 2 is a schematic cross-sectional view showing an embodiment of the magnetic recording medium of the present invention.

FIG. 2 is a schematic cross-sectional view showing an embodiment of the magnetic recording medium of the present invention.

The magnetic recording medium 10 of the present embodiment has a structure in which an adhesion layer 12, a soft magnetic layer 13, a first underlayer 14, a second underlayer 15, a magnetic layer 16, a protective layer 17, and a lubricating layer 18 are sequentially provided on a substrate 11.

"Substrate"

As the substrate 11, for example, a non-magnetic substrate on which a film made of NiP or an NiP alloy is formed on a base made of a metal or an alloy material such as Al or an Al alloy can be used.

In addition, as the substrate 11, a non-magnetic substrate made of a non-metal material such as glass, ceramics, silicon, silicon carbide, carbon, or a resin may be used, or a non-magnetic substrate in which a film of NiP or an NiP alloy is formed on a base made of this non-metal material may be used.

"Adhesion Layer"

The adhesion layer 12 prevents the progress of corrosion of the substrate 11, which occurs in a case where the substrate 11 and the soft magnetic layer 13 provided on the adhesion layer 12 are arranged in contact with each other.

A material for the adhesion layer 12 can be appropriately selected from, for example, Cr, a Cr alloy, Ti, a Ti alloy, CrTi, NiAl, and an AlRu alloy. The adhesion layer 12 can be formed by, for example, a sputtering method.

"Soft Magnetic Layer"

The soft magnetic layer 13 preferably has a structure in which a first soft magnetic film, an intermediate layer consisting of an Ru film, and a second soft magnetic film are sequentially laminated. That is, the soft magnetic layer 13 preferably has a structure in which the intermediate layer made of an Ru film is interposed between two soft magnetic film layers to make the soft magnetic films above and below the intermediate layer be antiferromagnetically coupled (AFC).

Examples of materials for the first soft magnetic film and the second soft magnetic film include a CoZrTa alloy and a CoFe alloy.

Any of Zr, Ta, and Nb is preferably added to the CoFe alloy which is used in the first soft magnetic film and the second soft magnetic film. This accelerates the amorphization of the first soft magnetic film and the second soft magnetic film. As a result, it is possible to improve the alignment of the first underlayer (seed layer) and to decrease the floating amount of a magnetic head.

The soft magnetic layer 13 can be formed by, for example, a sputtering method.

"First Underlayer"

The first underlayer 14 is a layer that controls the alignment and the crystal size of the second underlayer 15 and the magnetic layer 16 provided thereon.

Examples of the first underlayer 14 include a Cr layer, a Ta layer, an Ru layer, a CrMo alloy layer, a CoW alloy layer, a CrW alloy layer, a CrV alloy layer, and a CrTi alloy layer.

The first underlayer 14 can be formed by, for example, a sputtering method.

"Second Underlayer"

The second underlayer 15 is a layer that controls the alignment of the magnetic layer 16 to be good. The second underlayer 15 is preferably a layer consisting of Ru or an Ru alloy.

The second underlayer 15 may be a single layer or may be composed of a plurality of layers. In a case where the second underlayer 15 consists of a plurality of layers, all the layers may be composed of the same material, or at least one layer may be composed of a different material.

The second underlayer 15 can be formed by, for example, a sputtering method.

"Magnetic Layer"

The magnetic layer 16 consists of a magnetic film in which a magnetization axis is oriented in a direction perpendicular or horizontal to the substrate surface. The magnetic layer 16 is a layer including Co and Pt. The magnetic layer 16 may be a layer including an oxide, Cr, B, Cu, Ta, Zr, or the like in order to improve the SNR characteristics.

Examples of the oxide contained in the magnetic layer 16 include $SiO_2$, SiO, $Cr_2O_3$, CoO, $Ta_2O_3$, and $TiO_2$.

The magnetic layer 16 may be composed of one layer, or may be composed of a plurality of magnetic layers made of materials with different compositions.

For example, in a case where the magnetic layer 16 consists of three layers of a first magnetic layer, a second magnetic layer, and a third magnetic layer which are laminated in this order from the bottom, the first magnetic layer preferably has a granular structure made of a material containing Co, Cr, and Pt and further containing an oxide. As the oxide contained in the first magnetic layer, for example, an oxide of Cr, Si, Ta, Al, Ti, Mg, Co, or the like is preferably used. Among these, $TiO_2$, $Cr_2O_3$, $SiO_2$, or the like can be particularly suitably used. In addition, it is preferable that the first magnetic layer consists of a composite oxide obtained by adding two or more kinds of oxides. Among these, $Cr_2O_3$—$SiO_2$, $Cr_2O_3$—$TiO_2$, $SiO_2$—$TiO_2$, or the like can be particularly suitably used.

The first magnetic layer can include one or more kinds of elements selected from B, Ta, Mo, Cu, Nd, W, Nb, Sm, Tb, Ru, and Re, in addition to Co, Cr, Pt, and oxides.

The same material as that for the first magnetic layer can be used for the second magnetic layer. The second magnetic layer preferably has a granular structure.

The third magnetic layer preferably has a non-granular structure consisting of a material including Co, Cr, and Pt and not including an oxide. The third magnetic layer can include one or more elements selected from B, Ta, Mo, Cu, Nd, W, Nb, Sm, Tb, Ru, Re, and Mn, in addition to Co, Cr, and Pt.

In a case where the magnetic layer 16 is formed of a plurality of magnetic layers, it is preferable to provide a non-magnetic layer between the adjacent magnetic layers. In a case where the magnetic layer 16 consists of three layers of a first magnetic layer, a second magnetic layer, and a third magnetic layer, it is preferable to provide a non-magnetic layer between the first magnetic layer and the second magnetic layer and between the second magnetic layer and the third magnetic layer.

As the non-magnetic layer provided between the adjacent magnetic layers of the magnetic layer 16, for example, Ru, an Ru alloy, a CoCr alloy, or a CoCrX1 alloy (X1 represents one or two or more kinds of elements selected from Pt, Ta, Zr, Re, Ru, Cu, Nb, Ni, Mn, Ge, Si, O, N, W, Mo, Ti, V, and B) can be suitably used.

It is preferable that an alloy material including an oxide, a metal nitride, or a metal carbide is used in the non-magnetic layer provided between the adjacent magnetic layers of the magnetic layer 16. Specifically, as the oxide, for example, $SiO_2$, $Al_2O_3$, $Ta_2O_5$, $Cr_2O_3$, MgO, $Y_2O_3$, or $TiO_2$, can be used. As the metal nitride, for example, AlN, $Si_3N_4$, TaN, or CrN can be used. As the metal carbide, for example, TaC, BC, or SiCe can be used.

The non-magnetic layer can be formed by, for example, a sputtering method.

The magnetic layer 16 is preferably a magnetic layer for perpendicular magnetic recording in which easy magnetization axis is directed to a direction perpendicular to the substrate surface in order to realize a higher recording density. The magnetic layer 16 may be a magnetic layer for in-plane magnetic recording.

The magnetic layer 16 may be formed by any of known methods in the related art, such as a deposition method, an ion beam sputtering method, and a magnetron sputtering method. The magnetic layer 16 is usually formed by a sputtering method.

"Protective Layer"

The protective layer 17 protects the magnetic layer 16. The protective layer 17 may be composed of one layer or may be composed of a plurality of layers. As the protective layer 17, a carbon-based protective layer can be preferably used, and in particular, an amorphous carbon protective layer is preferable. In a case where the protective layer 17 is a carbon-based protective layer, the interaction with the polar group (in particular, the hydroxy group) included in the fluorine-containing ether compound in the lubricating layer 18 is further enhanced, which is thus preferable.

An adhesive force between the carbon-based protective layer and the lubricating layer 18 can be controlled by forming the carbon-based protective layer with hydrogenated carbon and/or nitrogenated carbon and adjusting the hydrogen content and/or the nitrogen content in the carbon-based protective layer. The hydrogen content in the carbon-based protective layer, as measured by hydrogen forward scattering (HFS), is preferably 3 atomic % to 20 atomic %.

In addition, the nitrogen content in the carbon-based protective layer, measured by an X-ray photoelectron spectroscopy (XPS), is preferably 4 atomic % to 15 atomic %.

Hydrogen and/or nitrogen included in the carbon-based protective layer does not need to be evenly contained in the entire carbon-based protective layer. For example, the carbon-based protective layer is suitably formed as a composition gradient layer in which nitrogen is contained in the protective layer 17 on the lubricating layer 18 side and hydrogen is contained in the protective layer 17 on the magnetic layer 16 side. In this case, the adhesive force between the magnetic layer 16 and the carbon-based protective layer and between the lubricating layer 18 and the carbon-based protective layer is further improved.

A film thickness of the protective layer 17 is preferably 1 nm to 7 nm. In a case where the film thickness of the protective layer 17 is 1 nm or more, sufficient performance of the protective layer 17 can be obtained. The film thickness of the protective layer 17, which is 7 nm or less, is preferable from the viewpoint that the thickness of the protective layer 17 is reduced.

As a method for forming the protective layer 17, a sputtering method using a carbon-containing target material, a chemical vapor deposition (CVD) method using a hydrocarbon raw material such as ethylene and toluene, an ion beam deposition (IBD) method, or the like can be used.

In a case where the carbon-based protective layer is formed as the protective layer 17, the carbon-based protective layer can be formed, for example, by a DC magnetron sputtering method. In particular, in a case where the carbon-based protective layer is formed as the protective layer 17, it is preferable to form an amorphous carbon protective layer by a plasma CVD method. The amorphous carbon protective layer formed by the plasma CVD method has an even surface and a small roughness.

"Lubricating Layer"

The lubricating layer 18 prevents contamination of the magnetic recording medium 10. In addition, the lubricating layer 18 reduces a frictional force of a magnetic head of a magnetic recording and reproducing device which slides on the magnetic recording medium 10, thereby improving the durability of the magnetic recording medium 10.

As shown in FIG. 2, the lubricating layer 18 is formed in contact with the protective layer 17. The lubricating layer 18 is formed by applying the lubricant for a magnetic recording medium according to the above-described embodiment onto the protective layer 17. Therefore, the lubricating layer 18 includes the above-described fluorine-containing ether compound.

In a case where the protective layer 17 arranged below the lubricating layer 18 is a carbon-based protective layer, the lubricating layer 18 is particularly bonded to the protective layer 17 with a high bonding force. As a result, it is easy to obtain the magnetic recording medium 10 in which the surface of the protective layer 17 is coated at a high coating rate even in a case where the thickness of the lubricating layer 18 is small, and it is possible to effectively prevent the contamination of the surface of the magnetic recording medium 10.

An average film thickness of the lubricating layer 18 is preferably 0.5 nm (5 Å) to 2.0 nm (20 Å), and more preferably 0.5 nm (5 Å) to 1.2 nm (12 Å). In a case where the average film thickness of the lubricating layer 18 is 0.5 nm or more, the lubricating layer 18 is formed with an even film thickness without forming an island shape or a mesh shape. Therefore, the surface of the protective layer 17 can be coated with the lubricating layer 18 at a high coating rate. In addition, in a case where the average film thickness of the lubricating layer 18 is 2.0 nm or less, it is possible to sufficiently reduce the thickness of the lubricating layer 18, and to sufficiently decrease the floating amount of a magnetic head.

"Method for Forming Lubricating Layer"

Examples of a method for forming the lubricating layer 18 include a method in which a magnetic recording medium during production in which respective layers up to the protective layer 17 are formed on the substrate 11 is prepared, and a lubricating layer forming solution is applied onto the protective layer 17 and dried.

The lubricating layer forming solution can be obtained by dispersing and dissolving the lubricant for a magnetic recording medium of the above-described embodiment in a solvent as necessary, and setting the viscosity and concentration to be suitable for application methods.

Examples of the solvent used for the lubricating layer forming solution include a fluorine-based solvent such as VERTREL (registered trademark) XF (product name, manufactured by Mitsui DuPont Fluorochemicals Co., Ltd.).

A method for applying the lubricating layer forming solution is not particularly limited, and examples thereof include a spin coating method, a spraying method, a paper coating method, and a dipping method.

In a case where the dipping method is used, for example, the following method can be used. First, the substrate 11 on which each of layers up to the protective layer 17 is formed is immersed in the lubricating layer forming solution which has been put into an immersion vessel of a dip coater. Next, the substrate 11 is lifted from the immersion vessel at a predetermined speed. Thus, the lubricating layer forming solution is applied onto the surface of the protective layer 17 of the substrate 11.

By using the dipping method, the lubricating layer forming solution can be evenly applied onto the surface of the protective layer 17 and the lubricating layer 18 with an even film thickness can be formed on the protective layer 17.

In the present embodiment, it is preferable to perform a thermal treatment on the substrate 11 on which the lubricating layer 18 has been formed. By performing the thermal treatment, the adhesion between the lubricating layer 18 and the protective layer 17 is improved, and the adhesive force between the lubricating layer 18 and the protective layer 17 is improved.

The thermal treatment temperature is preferably 100° C. to 180° C., and more preferably 100° C. to 160° C. In a case where the thermal treatment temperature is 100° C. or higher, an effect of improving the adhesion between the lubricating layer 18 and the protective layer 17 can be sufficiently obtained. In addition, by setting the thermal treatment temperature to 180° C. or lower, it is possible to prevent thermal decomposition of the lubricating layer 18 due to the thermal treatment. The thermal treatment time can be appropriately adjusted depending on the thermal treatment temperature, and is preferably 10 minutes to 120 minutes.

In the present embodiment, in order to further improve the adhesion of the lubricating layer 18 to the protective layer 17, a treatment of irradiating the lubricating layer 18 with ultraviolet rays (UV) before or after the thermal treatment may be performed.

The magnetic recording medium 10 of the present embodiment is formed by sequentially providing at least the magnetic layer 16, the protective layer 17, and the lubricating layer 18 on the substrate 11. In the magnetic recording medium 10 of the present embodiment, the lubricating layer 18 including the above-described fluorine-containing ether compound is formed on and in contact with the protective layer 17. The lubricating layer 18 has excellent adhesion, good floating stability, and a high corrosion suppressing effect of a magnetic recording medium even in a case where the film thickness is small. Therefore, the magnetic recording medium 10 of the present embodiment has excellent reliability and durability. Thus, the magnetic recording medium 10 of the present embodiment can have a low floating amount (for example, 10 nm or less) of the magnetic head, and can be stably operated for a long period of time even in a severe environment due to the diversification of applications. Therefore, the magnetic recording medium 10 of the present embodiment is particularly suitable as a magnetic disk mounted in a magnetic disk device of a load unload (LUL) system.

EXAMPLES

Hereinafter, the present invention will be described in more detail with reference to Examples and Comparative Examples. The present invention is not limited to only Examples described below.

Example 1

The compound represented by Formula (A) was obtained by a method shown below.

(End Part Producing Step S1)

10 g of a compound (number-average molecular weight: 1,000, molecular weight distribution: 1.1) represented by $HOCH_2CF_2O(CF_2CF_2O)_h(CF_2O)_iCF_2CH_2OH$ (in the formula, h indicating an average degree of polymerization is 4.5 and i indicating an average degree of polymerization is 4.5), 2.06 g of the compound represented by Formula (5-1), and 10 mL of t-butanol were charged into a 100 mL eggplant flask in a nitrogen gas atmosphere, and stirred at room temperature until a homogenous mixture was obtained. 0.37 g of potassium tert-butoxide was added to the mixture and stirred at 70° C. for 16 hours to undergo a reaction.

Furthermore, the compound represented by Formula (5-1) was synthesized by protecting ethylene glycol monoallyl ether using dihydropyran, and then oxidizing the product by reacting m-chloroperbenzoic acid therewith.

The reaction product obtained after the reaction was cooled to 25° C., transferred to a separatory funnel into which 100 mL of water had been put, and extracted three times with 100 mL of ethyl acetate. The organic layer was washed with water and dehydrated over anhydrous sodium sulfate. After filtering the drying agent off, the filtrate was concentrated and the residue was purified by silica gel column chromatography to obtain 5.23 g of a compound represented by Formula (9) as the intermediate compound 1a (=the intermediate compound Tb).

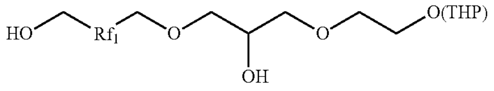
(9)

(in Formula (9), $Rf_1$ is the PFPE chain represented by Formula (4-1); in $Rf_1$, h indicating an average degree of polymerization represents 4.5 and i indicating an average degree of polymerization represents 4.5; and THP represents a tetrahydropyranyl group)

(Linked Structure Producing Step S2)

(Linking End Part Producing Step S21)

20 g of a compound (number-average molecular weight: 1,000, molecular weight distribution: 1.1) represented by $HOCH_2CF_2O(CF_2CF_2O)_h(CF_2O)_iCF_2CH_2OH$ (in the formula, h indicating an average degree of polymerization is 4.5 and i indicating an average degree of polymerization is 4.5) and 0.88 g of sodium hydride were charged into a 200 mL eggplant flask in a nitrogen gas atmosphere, and 20 mL of N,N-dimethylformamide was added thereto, and stirred in an ice bath until foaming was settled in the mixture. 2.42 g of the compound represented by Formula (7-1) (allyl bromide) was added to the mixture and stirred at room temperature for 4 hours to undergo a reaction.

The reaction product obtained after the reaction was cooled to 25° C., transferred to a separatory funnel into which 100 mL of water had been put, and extracted three times with 100 mL of ethyl acetate. The organic layer was washed with water and dehydrated over anhydrous sodium sulfate. After filtering the drying agent off, the filtrate was concentrated and the residue was purified by silica gel column chromatography to obtain 10.51 g of a compound represented by Formula (10) as the intermediate compound 2a (=the intermediate compound 2b).

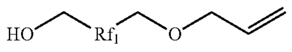
(10)

(in Formula (10), $Rf_1$ is the PFPE chain represented by Formula (4-1); and in $Rf_1$, h indicating an average degree of polymerization represents 4.5 and i indicating an average degree of polymerization represents 4.5)

($R^{2b}$-Side Reaction Step S22 and $R^{2c}$-Side Reaction Step S23)

10.51 g of the compound represented by Formula (10), which is the intermediate compound 2a (=the intermediate compound 2b) obtained above, 0.76 g of the compound represented by Formula (8-1) (epibromohydrin), and 20 mL of t-butanol were charged into a 100 mL eggplant flask in a nitrogen gas atmosphere, and stirred at room temperature until a homogenous mixture was obtained. 0.52 g of potassium tert-butoxide was added to the mixture and stirred at 70° C. for 16 hours to undergo a reaction.

The reaction solution obtained after the reaction was cooled to room temperature, 50 g of a 10% hydrochloric acid/methanol solution (hydrochloric acid-methanol reagent (5% to 10%) manufactured by Tokyo Chemical Industry Co., Ltd.) was added thereto, and the mixture was stirred at room temperature for 4 hours. Thereafter, the reaction solution was gradually transferred to a separatory funnel into which 100 mL of a saturated aqueous sodium bicarbonate solution had been put, and then extracted twice with 200 mL of ethyl acetate. The organic layer was washed with 100 mL of saline, 100 mL of a saturated aqueous sodium bicarbonate solution, and 100 mL of saline in this order, and then dehydrated over anhydrous sodium sulfate. After filtering the drying agent off, the filtrate was concentrated and the residue was purified by silica gel column chromatography to obtain 7.74 g of a compound represented by Formula (11) as the intermediate compound 3.

(11)

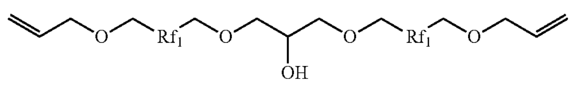

(in Formula (11), $Rf_1$ is the PFPE chain represented by Formula (4-1); and in the two $Rf_1$'s, h indicating an average degree of polymerization represents 4.5 and i indicating an average degree of polymerization represents 4.5)

(Compound Structure Producing Step S3)

7.74 g of the compound represented by Formula (11), which is the intermediate compound 3 obtained above, 1.22 g of dihydropyran, 0.07 g of p-toluenesulfonic acid monohydrate, and 20 mL of methylene chloride were charged into a 100 mL eggplant flask in a nitrogen gas atmosphere, and stirred at room temperature for 3 hours to undergo a reaction. 0.07 g of triethylamine was added to the reaction solution and the mixture was concentrated.

Subsequently, 2.50 g of m-chloroperbenzoic acid and 20 mL of methylene chloride were added to the obtained mixture and stirred at room temperature for 18 hours.

The reaction solution obtained after the reaction was gradually transferred to a separatory funnel into which 100 mL of water had been put, and then extracted three times with 100 mL of ethyl acetate. The organic layer was washed with 100 mL of saline, 100 mL of a saturated aqueous sodium bicarbonate solution, and 100 mL of saline in this order, and then dehydrated over anhydrous sodium sulfate. After filtering the drying agent off, the filtrate was concentrated and the residue was purified by silica gel column chromatography to obtain 4.65 g of a compound represented by Formula (12) as the intermediate compound 3-1.

(12)

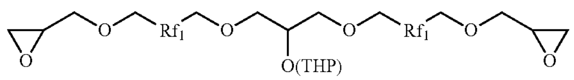

(in Formula (12), $Rf_1$ is the PFPE chain represented by Formula (4-1); and in the two $Rf_1$'s, h indicating an average degree of polymerization represents 4.5 and i indicating an average degree of polymerization represents 4.5; and THP represents a tetrahydropyranyl group)

($R_1$-Side Reaction Step S31 and $R^4$—Side Reaction Step S32)

5.23 g of the compound represented by Formula (9), which is the intermediate compound 1a (=the intermediate compound 1b) obtained above, 4.42 g of the compound represented by Formula (12), which is the intermediate compound 3-1 obtained above, and 20 mL of t-butanol were charged into a 100 mL eggplant flask in a nitrogen gas atmosphere, and stirred at room temperature until a homogenous mixture was obtained. 0.15 g of potassium tert-butoxide was added to the mixture and stirred at 70° C. for 16 hours to undergo a reaction.

The reaction solution obtained after the reaction was cooled to room temperature, 50 g of a 10% hydrochloric acid/methanol solution (hydrochloric acid-methanol reagent (5% to 10%) manufactured by Tokyo Chemical Industry Co., Ltd.) was added thereto, and the mixture was stirred at room temperature for 4 hours. Thereafter, the reaction solution was gradually transferred to a separatory funnel into which 100 mL of a saturated aqueous sodium bicarbonate solution had been put, and then extracted twice with 200 mL of ethyl acetate. The organic layer was washed with 100 mL of saline, 100 mL of a saturated aqueous sodium bicarbonate solution, and 100 mL of saline in this order, and then dehydrated over anhydrous sodium sulfate. After filtering the drying agent off, the filtrate was concentrated and the residue was purified by silica gel column chromatography to obtain 3.51 g of a compound (A) (in Formula (A), $Rf_1$ is the PFPE chain represented by Formula (4-1), and in the four $Rf_1$, h indicating an average degree of polymerization represents 4.5 and i indicating an average degree of polymerization represents 4.5).

The obtained compound (A) was subjected to $^1H$-NMR and $^{19}F$-NMR measurements, and a structure thereof was identified based on the following results.

$^1H$-NMR (acetone-$D_6$): δ [ppm]=3.65 to 3.85 (40H), 3.85 to 4.10 (16H)

$^{19}F$-NMR (acetone-$D_6$): δ [ppm]=−55.5 to −51.5 (36F), −78.5 (8F), −80.5 (8F), −91.0 to −88.5 (72F)

Example 2

The compound represented by Formula (B) was obtained by a method shown below.

The same operation as in Example 1, except that the compound represented by Formula (5-2) was used instead of the compound represented by Formula (5-1), was performed to obtain 3.72 g of the compound (B) (in Formula (B), $Rf_1$ is the PFPE chain represented by Formula (4-1); and in the four $Rf_1$'s, h indicating an average degree of polymerization represents 4.5, and i indicating an average degree of polymerization represents 4.5).

Furthermore, the compound represented by Formula (5-2) was synthesized by protecting one of hydroxy groups of 1,3-propanediol using dihydropyran, and then reacting the product with epibromohydrin.

The obtained compound (B) was subjected to $^1H$-NMR and $^{19}F$-NMR measurements, and a structure thereof was identified based on the following results.

$^1H$-NMR (acetone-$D_6$): δ [ppm]=1.65 to 1.85 (4H), 3.65 to 3.85 (40H), 3.85 to 4.10 (16H)

$^{19}F$-NMR (acetone-$D_6$): δ [ppm]=−55.5 to −51.5 (36F), −78.5 (8F), −80.5 (8F), −91.0 to −88.5 (72F)

Example 3

The compound represented by Formula (C) was obtained by a method shown below.

The same operation as in Example 1, except that the compound represented by Formula (5-3) was used instead of the compound represented by Formula (5-1), was performed to obtain 3.25 g of the compound (C) (in Formula (C), $Rf_1$ is the PFPE chain represented by Formula (4-1); and in the four $Rf_1$'s, h indicating an average degree of polymerization represents 4.5, and i indicating an average degree of polymerization represents 4.5).

Furthermore, the compound represented by Formula (5-3) was synthesized by protecting 3-buten-1-ol with dihydropyran, and then oxidizing the product by reacting m-chloroperbenzoic acid therewith.

The obtained compound (C) was subjected to $^1H$-NMR and $^{19}F$-NMR measurements, and a structure thereof was identified based on the following results.

$^1H$-NMR (acetone-$D_6$): δ [ppm]=1.65 to 1.85 (4H), 3.65 to 3.85 (32H), 3.85 to 4.10 (16H)

$^{19}F$-NMR (acetone-$D_6$): δ [ppm]=−55.5 to −51.5 (36F), −78.5 (8F), −80.5 (8F), −91.0 to −88.5 (72F)

Example 4

The compound represented by Formula (D) was obtained by a method shown below.

The same operation as in Example 1, except that the compound represented by Formula (5-4) was used instead of the compound represented by Formula (5-1), was performed to obtain 3.67 g of the compound (D) (in Formula (D), $Rf_1$ is the PFPE chain represented by Formula (4-1); and in the four $Rf_1$'s, h indicating an average degree of polymerization represents 4.5, and i indicating an average degree of polymerization represents 4.5).

Furthermore, the compound represented by Formula (5-4) was synthesized by reacting 3-buten-1-ol with 2-(2-bromoethoxy)tetrahydro-2H-pyran, and then oxidizing the product with m-chloroperbenzoic acid.

The obtained compound (D) was subjected to $^1H$-NMR and $^{19}F$-NMR measurements, and a structure thereof was identified based on the following results.

$^1H$-NMR (acetone-$D_6$): δ [ppm]=1.65 to 1.85 (4H), 3.65 to 3.85 (32H), 3.85 to 4.10 (16H)

$^{19}F$-NMR (acetone-$D_6$): δ [ppm]=−55.5 to −51.5 (36F), −78.5 (8F), −80.5 (8F), −91.0 to −88.5 (72F)

Example 5

The compound represented by Formula (E) was obtained by a method shown below.

(End Part Producing Step S1)

The same operation as in Example 1 was performed to obtain the compound represented by Formula (9) as the intermediate compound 1a.

In addition, the same operation as the end part producing step S1 in Example 1, except that a compound represented by Formula (5-5) was used instead of the compound represented by Formula (5-1), was performed to obtain a compound represented by Formula (13) as the intermediate compound 1b.

Furthermore, the compound represented by Formula (5-5) was synthesized by protecting allyl alcohol with dihydropyran, and then oxidizing the product by reacting m-chloroperbenzoic acid therewith.

(13)

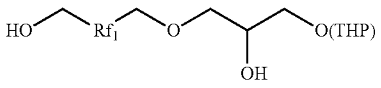

(in Formula (13), $Rf_1$ is the PFPE chain represented by Formula (4-1); in $Rf_1$, h indicating an average degree of polymerization represents 4.5 and i indicating an average degree of polymerization represents 4.5; and THP represents a tetrahydropyranyl group)

(Compound Structure Producing Step S3)

The compound represented by Formula (12) was obtained as the intermediate compound 3-1 in the same manner as in Example 1 using the intermediate compound 3 produced by performing the linked structure producing step S2 in the same manner as in Example 1.

($R^1$-Side Reaction Step S31)

2.65 g of the compound represented by Formula (9), which is the intermediate compound 1a, 4.84 g of the compound represented by Formula (12) which is the intermediate compound 3-1, and 20 mL of t-butanol were charged into a 100 mL eggplant flask in a nitrogen gas atmosphere, and stirred at room temperature until a homogenous mixture was obtained. 0.15 g of potassium tert-butoxide was added to the mixture and stirred at 70° C. for 16 hours to undergo a reaction.

The reaction product obtained after the reaction was cooled to 25° C., transferred to a separatory funnel into which 100 mL of water had been put, and extracted three times with 100 mL of ethyl acetate. The organic layer was washed with water and dehydrated over anhydrous sodium sulfate. After filtering the drying agent off, the filtrate was concentrated and the residue was purified by silica gel column chromatography to obtain 3.31 g of a compound represented by Formula (14), which is an intermediate compound.

(14)

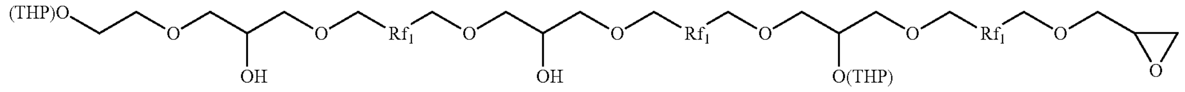

(in Formula (14), $Rf_1$ is the PFPE chain represented by Formula (4-1); in the three $Rf_1$'s, h indicating an average degree of polymerization represents 4.5 and i indicating an average degree of polymerization represents 4.5; and THP represents a tetrahydropyranyl group)

($R^4$—Side Reaction Step S32)

Subsequently, 2.32 g of the compound represented by Formula (13), which is intermediate compound 1b, 3.31 g of the compound represented by Formula (14), which is the intermediate compound produced in the $R^1$-side reaction step S31, and 20 mL of t-butanol were charged into a 100 mL eggplant flask under a nitrogen atmosphere, and stirred at room temperature until a homogenous mixture was obtained. 0.15 g of potassium tert-butoxide was added to the mixture and stirred at 70° C. for 16 hours to undergo a reaction.

The reaction solution obtained after the reaction was cooled to room temperature, 50 g of a 10% hydrochloric acid/methanol solution (hydrochloric acid-methanol reagent (5% to 10%) manufactured by Tokyo Chemical Industry Co., Ltd.) was added thereto, and the mixture was stirred at room temperature for 4 hours. Thereafter, the reaction solution was gradually transferred to a separatory funnel into which 100 mL of a saturated aqueous sodium bicarbonate solution had been put, and then extracted twice with 200 mL of ethyl acetate. The organic layer was washed with 100 mL of saline, 100 mL of a saturated aqueous sodium bicarbonate solution, and 100 mL of saline in this order, and then dehydrated over anhydrous sodium sulfate. After filtering off the drying agent, the filtrate was concentrated and the residue was purified by silica gel column chromatography to obtain 2.08 g of a compound (E) (in Formula (E), $Rf_1$ is the PFPE chain represented by Formula (4-1); and in the four $Rf_1$'s, h indicating an average degree of polymerization represents 4.5 and i indicating an average degree of polymerization represents 4.5).

The obtained compound (E) was subjected to $^1$H-NMR and $^{19}$F-NMR measurements, and a structure thereof was identified based on the following results.

$^1$H-NMR (acetone-$D_6$): δ [ppm]=3.65 to 3.85 (36H), 3.85 to 4.10 (16H)

$^{19}$F-NMR (acetone-$D_6$): δ [ppm]=−55.5 to −51.5 (36F), −78.5 (8F), −80.5 (8F), −91.0 to −88.5 (72F)

Example 6

The compound represented by Formula (F) was obtained by a method shown below.

The same operation as in Example 5, except that the compound represented by Formula (5-6) was used instead of the compound represented by Formula (5-5), was performed to obtain 2.11 g of the compound (F) (in Formula (F), $Rf_1$ is the PFPE chain represented by Formula (4-1); and in the four $Rf_1$'s, h indicating an average degree of polymerization represents 4.5, and i indicating an average degree of polymerization represents 4.5).

Furthermore, the compound represented by Formula (5-6) was synthesized by reacting one molecule of 3-allyloxy-1,2-propanediol with two molecules of dihydropyran, and then oxidizing the product with m-chloroperbenzoic acid.

The obtained compound (F) was subjected to $^1$H-NMR and $^{19}$F-NMR measurements, and a structure thereof was identified based on the following results.

$^1$H-NMR (acetone-$D_6$): δ [ppm]=3.65 to 3.85 (42H), 3.85 to 4.10 (16H)

$^{19}$F-NMR (acetone-$D_6$): δ [ppm]=−55.5 to −51.5 (36F), −78.5 (8F), −80.5 (8F), −91.0 to −88.5 (72F)

Example 7

The compound represented by Formula (G) was obtained by a method shown below.

The same operation as in Example 1, except that the compound represented by Formula (5-7) was used instead of the compound represented by Formula (5-1), was performed to obtain 3.83 g of the compound (G) (in Formula (G), $Rf_1$ is the PFPE chain represented by Formula (4-1); and in the four $Rf_1$'s, h indicating an average degree of polymerization represents 4.5, and i indicating an average degree of polymerization represents 4.5).

Furthermore, the compound represented by Formula (5-7) was synthesized by subjecting the compound represented by Formula (5-1) and an allyl alcohol to an addition reaction, then protecting the product with dihydropyran, and further oxidizing the product with m-chloroperbenzoic acid.

The obtained compound (G) was subjected to $^1$H-NMR and $^{19}$F-NMR measurements, and a structure thereof was identified based on the following results.

$^1$H-NMR (acetone-$D_6$): δ [ppm]=3.65 to 3.85 (52H), 3.85 to 4.10 (16H)

$^{19}$F-NMR (acetone-$D_6$): δ [ppm]=−55.5 to −51.5 (36F), −78.5 (8F), −80.5 (8F), −91.0 to −88.5 (72F)

Example 8

The compound represented by Formula (H) was obtained by a method shown below.

The same operation as in Example 5, except that the compound represented by Formula (5-7) was used instead of the compound represented by Formula (5-5), was performed to obtain 2.25 g of the compound (H) (in Formula (H), $Rf_1$ is the PFPE chain represented by Formula (4-1); and in the four $Rf_1$'s, h indicating an average degree of polymerization represents 4.5, and i indicating an average degree of polymerization represents 4.5).

The obtained compound (H) was subjected to $^1$H-NMR and $^{19}$F-NMR measurements, and a structure thereof was identified based on the following results.

$^1$H-NMR (acetone-$D_6$): δ [ppm]=3.65 to 3.85 (46H), 3.85 to 4.10 (16H)

$^{19}$F-NMR (acetone-$D_6$): δ [ppm]=−55.5 to −51.5 (36F), −78.5 (8F), −80.5 (8F), −91.0 to −88.5 (72F)

Example 9

The compound represented by Formula (I) was obtained by a method shown below.

The same operation as in Example 1, except that the compound represented by Formula (5-8) was used instead of the compound represented by Formula (5-1), was performed to obtain 3.53 g of the compound (1) (in Formula (1), $Rf_1$ is the PFPE chain represented by Formula (4-1); and in the four $Rf_1$'s, h indicating an average degree of polymerization represents 4.5, and i indicating an average degree of polymerization represents 4.5).

Furthermore, the compound represented by Formula (5-8) was synthesized by subjecting the compound represented by Formula (5-3) and an allyl alcohol to an addition reaction, then protecting the product with dihydropyran, and further oxidizing the product with m-chloroperbenzoic acid.

The obtained compound (I) was subjected to $^1$H-NMR and $^{19}$F-NMR measurements, and a structure thereof was identified based on the following results.

$^1$H-NMR (acetone-$D_6$): δ [ppm]=1.65 to 1.85 (4H), 3.65 to 3.85 (44H), 3.85 to 4.10 (16H)

$^{19}$F-NMR (acetone-$D_6$): δ [ppm]=−55.5 to −51.5 (36F), −78.5 (8F), −80.5 (8F), −91.0 to −88.5 (72F)

Example 10

The compound represented by Formula (J) was obtained by a method shown below.

The same operation as in Example 1, except that the compound represented by Formula (5-9) was used instead of the compound represented by Formula (5-1), was performed to obtain 3.24 g of the compound (J) (in Formula (J), $Rf_1$ is the PFPE chain represented by Formula (4-1); and in the four $Rf_1$'s, h indicating an average degree of polymerization represents 4.5, and i indicating an average degree of polymerization represents 4.5).

Furthermore, the compound represented by Formula (5-9) was synthesized by subjecting the compound represented by Formula (5-1) and 3-buten-1-ol to an addition reaction, protecting the product with dihydropyran, and further oxidizing the product with m-chloroperbenzoic acid.

The obtained compound (J) was subjected to $^1$H-NMR and $^{19}$F-NMR measurements, and a structure thereof was identified based on the following results.

$^1$H-NMR (acetone-$D_6$): δ [ppm]=1.65 to 1.85 (4H), 3.65 to 3.85 (52H), 3.85 to 4.10 (16H)

$^{19}$F-NMR (acetone-$D_6$): δ [ppm]=−55.5 to −51.5 (36F), −78.5 (8F), −80.5 (8F), −91.0 to −88.5 (72F)

Example 11

The compound represented by Formula (K) was obtained by a method shown below.

The same operation as in Example 1, except that the compound represented by Formula (5-10) was used instead of the compound represented by Formula (5-1), was performed to obtain 3.91 g of the compound (K) (in Formula (K), $Rf_1$ is the PFPE chain represented by Formula (4-1); and in the four $Rf_1$'s, h indicating an average degree of polymerization represents 4.5, and i indicating an average degree of polymerization represents 4.5).

Furthermore, the compound represented by Formula (5-10) was synthesized by reacting two molecules of allyl alcohol with one molecule of epibromohydrin, protecting the product with dihydropyran, and further oxidizing one of carbon-carbon double bonds with m-chloroperbenzoic acid.

The obtained compound (K) was subjected to $^1$H-NMR and $^{19}$F-NMR measurements, and a structure thereof was identified based on the following results.

$^1$H-NMR (acetone-$D_6$): δ [ppm]=3.65 to 3.85 (46H), 3.85 to 4.10 (16H), 5.40 to 6.10 (3H)

$^{19}$F-NMR (acetone-$D_6$): δ [ppm]=−55.5 to −51.5 (36F), −78.5 (8F), −80.5 (8F), −91.0 to −88.5 (72F)

Example 12

The compound represented by Formula (L) was obtained by a method shown below.

The same operation as in Example 1, except that the compound represented by Formula (5-11) was used instead of the compound represented by Formula (5-1), was performed to obtain 4.08 g of the compound (L) (in Formula (L), $Rf_1$ is the PFPE chain represented by Formula (4-1); in the four $Rf_1$'s, h indicating an average degree of polymerization represents 4.5, and i indicating an average degree of polymerization represents 4.5; and Me represents a methyl group).

Furthermore, the compound represented by Formula (5-11) was synthesized by reacting p-methoxyphenol with epibromohydrin.

The obtained compound (L) was subjected to $^1$H-NMR and $^{19}$F-NMR measurements, and a structure thereof was identified based on the following results.

$^1$H-NMR (acetone-$D_6$): δ [ppm]=3.65 to 3.85 (36H), 3.85 to 4.10 (16H), 6.70 to 7.40 (10H)

$^{19}$F-NMR (acetone-$D_6$): δ [ppm]=−55.5 to −51.5 (36F), −78.5 (8F), −80.5 (8F), −91.0 to −88.5 (72F)

Example 13

The compound represented by Formula (M) was obtained by a method shown below.

The same operation as in Example 5, except that the compound represented by Formula (5-11) was used instead of the compound represented by Formula (5-5), was performed to obtain 2.41 g of the compound (M) (in Formula (M), $Rf_1$ is the PFPE chain represented by Formula (4-1); in the four $Rf_1$'s, h indicating an average degree of polymerization represents 4.5, and i indicating an average degree of polymerization represents 4.5; and Me represents a methyl group).

The obtained compound (M) was subjected to $^1$H-NMR and $^{19}$F-NMR measurements, and a structure thereof was identified based on the following results.

$^1$H-NMR (acetone-$D_6$): δ [ppm]=3.65 to 3.85 (38H), 3.85 to 4.10 (16H), 6.70 to 7.40 (5H)

$^{19}$F-NMR (acetone-$D_6$): δ [ppm]=−55.5 to −51.5 (36F), −78.5 (8F), −80.5 (8F), −91.0 to −88.5 (72F)

Example 14

The compound represented by Formula (N) was obtained by a method shown below.

The same operation as in Example 1, except that the compound represented by Formula (5-12) was used instead of the compound represented by Formula (5-1), was performed to obtain 3.67 g of the compound (N) (in Formula (N), $Rf_1$ is the PFPE chain represented by Formula (4-1); and in the four $Rf_1$'s, h indicating an average degree of polymerization represents 4.5, and i indicating an average degree of polymerization represents 4.5).

Furthermore, the compound represented by Formula (5-12) was synthesized by reacting 2-thiophenethanol with epibromohydrin.

The obtained compound (N) was subjected to $^1$H-NMR and $^{19}$F-NMR measurements, and a structure thereof was identified based on the following results.

$^1$H-NMR (acetone-$D_6$): δ [ppm]=2.20 to 2.30 (4H), 3.65 to 3.85 (34H), 3.85 to 4.10 (16H), 6.30 to 7.60 (611)

$^{19}$F-NMR (acetone-$D_6$): δ [ppm]=−55.5 to −51.5 (36F), −78.5 (8F), −80.5 (8F), −91.0 to −88.5 (72F)

Example 15

The compound represented by Formula (O) was obtained by a method shown below.

The same operation as in Example 1, except that the compound represented by Formula (5-13) was used instead of the compound represented by Formula (5-1), was performed to obtain 3.94 g of the compound (O) (in Formula (O), $Rf_1$ is the PFPE chain represented by Formula (4-1); and in the four $Rf_1$'s, h indicating an average degree of polymerization represents 4.5, and i indicating an average degree of polymerization represents 4.5).

Furthermore, the compound represented by Formula (5-13) was synthesized by reacting 2-cyanoethanol with epibromohydrin.

The obtained compound (O) was subjected to $^1$H-NMR and $^{19}$F-NMR measurements, and a structure thereof was identified based on the following results.

$^1$H-NMR (acetone-$D_6$): δ [ppm]=2.00 to 2.10 (4H), 3.65 to 3.85 (34H), 3.85 to 4.10 (16H)

$^{19}$F-NMR (acetone-$D_6$): δ [ppm]=−55.5 to −51.5 (36F), −78.5 (8F), −80.5 (8F), −91.0 to −88.5 (72F)

Example 16

The compound represented by Formula (P) was obtained by a method shown below.

The same operation as in Example 5, except that the compound represented by Formula (5-13) was used instead of the compound represented by Formula (5-5), was performed to obtain 2.32 g of the compound (P) (in Formula (P), $Rf_1$ is the PFPE chain represented by Formula (4-1); and in the four $Rf_1$'s, h indicating an average degree of polymerization represents 4.5, and i indicating an average degree of polymerization represents 4.5).

The obtained compound (P) was subjected to $^1$H-NMR and $^{19}$F-NMR measurements, and a structure thereof was identified based on the following results.

$^1$H-NMR (acetone-$D_6$): δ [ppm]=2.00 to 2.10 (2H), 3.65 to 3.85 (37H), 3.85 to 4.10 (16H)

$^{19}$F-NMR (acetone-$D_6$): δ [ppm]=−55.5 to −51.5 (36F), −78.5 (8F), −80.5 (8F), −91.0 to −88.5 (72F)

Example 17

The compound represented by Formula (Q) was obtained by a method shown below.

The same operation as in Example 1, except that the compound represented by Formula (5-14) was used instead of the compound represented by Formula (5-1), was performed to obtain 3.61 g of the compound (Q) (in Formula (Q), $Rf_1$ is the PFPE chain represented by Formula (4-1); and in the four $Rf_1$'s, h indicating an average degree of polymerization represents 4.5, and i indicating an average degree of polymerization represents 4.5).

Furthermore, the compound represented by Formula (5-14) was synthesized by reacting 2-acetamidoethanol with epibromohydrin.

The obtained compound (Q) was subjected to $^{1}$H-NMR and $^{19}$F-NMR measurements, and a structure thereof was identified based on the following results.

$^{1}$H-NMR (acetone-$D_6$): δ [ppm]=1.90 to 2.05 (6H), 3.65 to 3.85 (38H), 3.85 to 4.10 (16H), 6.30 to 6.50 (211)

$^{19}$F-NMR (acetone-$D_6$): δ [ppm]=−55.5 to −51.5 (36F), −78.5 (8F), −80.5 (8F), −91.0 to −88.5 (72F)

Example 18

The compound represented by Formula (R) was obtained by a method shown below.

The same operation as in Example 5, except that the compound represented by Formula (5-14) was used instead of the compound represented by Formula (5-5), was performed to obtain 2.14 g of the compound (R) (in Formula (R), $Rf_1$ is the PFPE chain represented by Formula (4-1); and in the four $Rf_1$'s, h indicating an average degree of polymerization represents 4.5, and i indicating an average degree of polymerization represents 4.5).

The obtained compound (R) was subjected to $^{1}$H-NMR and $^{19}$F-NMR measurements, and a structure thereof was identified based on the following results.

$^{1}$H-NMR (acetone-$D_6$): δ [ppm]=1.90 to 2.05 (3H), 3.65 to 3.85 (39H), 3.85 to 4.10 (16H), 6.30 to 6.50 (1H)

$^{19}$F-NMR (acetone-$D_6$): δ [ppm]=−55.5 to −51.5 (36F), −78.5 (8F), −80.5 (8F), −91.0 to −88.5 (72F)

Example 19

The compound represented by Formula (S) was obtained by a method shown below.

The same operation as in Example 1, except that the compound represented by Formula (7-2) was used instead of the compound represented by Formula (7-1), was performed to obtain 3.41 g of the compound (S) (in Formula (S), $Rf_1$ is the PFPE chain represented by Formula (4-1); and in the four $Rf_1$'s, h indicating an average degree of polymerization represents 4.5, and i indicating an average degree of polymerization represents 4.5).

The obtained compound (S) was subjected to $^{1}$H-NMR and $^{19}$F-NMR measurements, and a structure thereof was identified based on the following results.

$^{1}$H-NMR (acetone-$D_6$): δ [ppm]=1.65 to 1.85 (4H), 3.65 to 3.85 (40H), 3.85 to 4.10 (16H)

$^{19}$F-NMR (acetone-$D_6$): δ [ppm]=−55.5 to −51.5 (36F), −78.5 (8F), −80.5 (8F), −91.0 to −88.5 (72F)

Example 20

The compound represented by Formula (T) was obtained by a method shown below.

The same operation as in Example 1, except that the compound represented by Formula (8-2) was used instead of the compound represented by Formula (8-1), was performed to obtain 3.75 g of the compound (T) (in Formula (T), $Rf_1$ is the PFPE chain represented by Formula (4-1); and in the four $Rf_1$'s, h indicating an average degree of polymerization represents 4.5, and i indicating an average degree of polymerization represents 4.5).

The obtained compound (T) was subjected to $^{1}$H-NMR and $^{19}$F-NMR measurements, and a structure thereof was identified based on the following results.

$^{1}$H-NMR (acetone-$D_6$): δ [ppm]=1.65 to 1.85 (2H), 3.65 to 3.85 (40H), 3.85 to 4.10 (16H)

$^{19}$F-NMR (acetone-$D_6$): δ [ppm]=−55.5 to −51.5 (36F), −78.5 (8F), −80.5 (8F), −91.0 to −88.5 (72F)

Example 21

The compound represented by Formula (U) was obtained by a method shown below.

The same operation as in Example 1, except that the compound represented by Formula (8-3) was used instead of the compound represented by Formula (8-1), was performed to obtain 3.62 g of the compound (U) (in Formula (U), $Rf_1$ is the PFPE chain represented by Formula (4-1); and in the four $Rf_1$'s, h indicating an average degree of polymerization represents 4.5, and i indicating an average degree of polymerization represents 4.5).

The obtained compound (U) was subjected to $^{1}$H-NMR and $^{19}$F-NMR measurements, and a structure thereof was identified based on the following results.

$^{1}$H-NMR (acetone-$D_6$): δ [ppm]=3.65 to 3.85 (46H), 3.85 to 4.10 (16H)

$^{19}$F-NMR (acetone-$D_6$): δ [ppm]=−55.5 to −51.5 (36F), −78.5 (8F), −80.5 (8F), −91.0 to −88.5 (72F)

Example 22

The compound represented by Formula (V) was obtained by a method shown below.

The same operation as in Example 1, except that the compound represented by Formula (8-4) was used instead of the compound represented by Formula (8-1), was performed to obtain 3.24 g of the compound (V) (in Formula (V), $Rf_1$ is the PFPE chain represented by Formula (4-1); and in the four $Rf_1$'s, h indicating an average degree of polymerization represents 4.5, and i indicating an average degree of polymerization represents 4.5).

The obtained compound (V) was subjected to $^{1}$H-NMR and $^{19}$F-NMR measurements, and a structure thereof was identified based on the following results.

$^{1}$H-NMR (acetone-$D_6$): δ [ppm]=3.65 to 3.85 (42H), 3.85 to 4.10 (16H)

$^{19}$F-NMR (acetone-$D_6$): δ [ppm]=−55.5 to −51.5 (36F), −78.5 (8F), −80.5 (8F), −91.0 to −88.5 (72F)

Example 23

The compound represented by Formula (W) was obtained by a method shown below.

The same operation as in Example 1, except that the compound represented by Formula (8-5) was used instead of the compound represented by Formula (8-1), was performed to obtain 3.24 g of the compound (W) (in Formula (W), $Rf_1$ is the PFPE chain represented by Formula (4-1); and in the four $Rf_1$'s, h indicating an average degree of polymerization represents 4.5, and i indicating an average degree of polymerization represents 4.5).

The obtained compound (W) was subjected to $^1$H-NMR and $^{19}$F-NMR measurements, and a structure thereof was identified based on the following results.

$^1$H-NMR (acetone-$D_6$): δ [ppm]=1.25 to 1.85 (8H), 3.65 to 3.85 (42H), 3.85 to 4.10 (16H)

$^{19}$F-NMR (acetone-$D_6$): δ [ppm]=−55.5 to −51.5 (36F), −78.5 (8F), −80.5 (8F), −91.0 to −88.5 (72F)

Example 24

The compound represented by Formula (X) was obtained by a method shown below.

The same operation as in Example 1, except that a compound (number-average molecular weight: 1,000, molecular weight distribution: 1.1) represented by $HOCH_2CF_2CF_2O(CF_2CF_2CF_2O)_jCF_2CF_2CH_2OH$ (in the formula, j indicating an average degree of polymerization is 4.5) was used instead of the compound represented by $HOCH_2CF_2O(CF_2CF_2O)_h(CF_2O)_iCF_2CH_2OH$ (in the formula, h indicating an average degree of polymerization is 4.5 and i indicating an average degree of polymerization is 4.5), was performed to obtain 3.92 g of the compound (X) (in Formula (X), $Rf_2$ is the PFPE chain represented by Formula (4-2); and in the four $Rf_2$'s, j indicating an average degree of polymerization represents 4.5).

The obtained compound (X) was subjected to $^1$H-NMR and $^{19}$F-NMR measurements, and a structure thereof was identified based on the following results.

$^1$H-NMR (acetone-$D_6$): δ [ppm]=3.65 to 3.85 (40H), 3.85 to 4.10 (16H)

$^{19}$F-NMR (acetone-$D_6$): δ [ppm]=−84.0 to −83.0 (72F), −86.4 (16F), −124.3 (16F), −130.0 to −129.0 (36F)

Example 25

The compound represented by Formula (Y) was obtained by a method shown below.

The same operation as in Example 1, except that a compound (number-average molecular weight: 1,000; molecular weight distribution: 1.1) represented by $HOCH_2CF_2CF_2CF_2O(CF_2CF_2CF_2CF_2O)_kCF_2CF_2CF_2CH_2OH$ (in the formula, k indicating an average degree of polymerization is 3.0) was used instead of the compound represented by $HOCH_2CF_2O(CF_2CF_2O)_h(CF_2O)_iCF_2CH_2OH$ (in the formula, h indicating an average degree of polymerization is 4.5 and i indicating an average degree of polymerization is 4.5), to obtain 3.67 g of the compound (Y) (in Formula (Y), $Rf_3$ is the PFPE chain represented by Formula (4-3); and in the four $Rf_3$'s, k indicating an average degree of polymerization represents 3.0).

The obtained compound (Y) was subjected to $^1$H-NMR and $^{19}$F-NMR measurements, and a structure thereof was identified based on the following results.

$^1$H-NMR (acetone-$D_6$): δ [ppm]=3.65 to 3.85 (40H), 3.85 to 4.10 (16H)

$^{19}$F-NMR (acetone-$D_6$): δ [ppm]=−84.0 to −83.0 (64F), −122.5 (16F), −126.0 (48F), −129.0 to −128.0 (16F)

Example 26

The compound represented by Formula (Z) was obtained by a method shown below.

The same operation as in Example 1, except that in the end part producing step S1, a compound (number-average molecular weight: 1,000, molecular weight distribution: 1.1) represented by $HOCH_2CF_2CF_2O(CF_2CF_2CF_2O)_jCF_2CF_2CH_2OH$ (in the formula, j indicating an average degree of polymerization is 4.5) was used instead of the compound represented by $HOCH_2CF_2O(CF_2CF_2O)_h(CF_2O)_iCF_2CH_2OH$ (in the formula, h indicating an average degree of polymerization is 4.5 and i indicating an average degree of polymerization is 4.5), and in the linked structure producing step S2, a compound represented by $HOCH_2CF_2O(CF_2CF_2O)_2CF_2CH_2OH$ was used instead of the compound represented by $HOCH_2CF_2O(CF_2CF_2O)_h(CF_2O)_iCF_2CH_2OH$ (in the formula, h indicating an average degree of polymerization is 4.5 and i indicating an average degree of polymerization is 4.5), to obtain 3.15 g of the compound (Z) ($Rf_1$ in Formula (Z) is the PFPE chain represented by Formula (4-1); in the two $Rf_1$'s, h indicating an average degree of polymerization represents 2.0, and i indicating an average degree of polymerization represents 0; $Rf_2$ in Formula (Z) is the PFPE chain represented by Formula (4-2); and in the two $Rf_2$'s, j indicating an average degree of polymerization represents 4.5).

The obtained compound (Z) was subjected to $^1$H-NMR and $^{19}$F-NMR measurements, and a structure thereof was identified based on the following results.

$^1$H-NMR (acetone-$D_6$): δ [ppm]=3.65 to 3.85 (40H), 3.85 to 4.10 (16H)

$^{19}$F-NMR (acetone-$D_6$): δ [ppm]=−80.5 (8F), −91.0 to −88.5 (16F), −84.0 to −83.0 (36F), −86.4 (8F), −124.3 (8F), −130.0 to −129.0 (18F)

The structures of $R^1$, $R^2$ ($R^{2a}$, $R^{2b}$, $R^{2c}$, and $R^{2d}$), $R^3$ ($R^{3a}$, $R^{3b}$, and $R^{3c}$), and $R^4$ in a case where the compounds (A) to (Z) of Examples 1 to 26 were each applied to Formula (1) are shown in Tables 1 and 2.

TABLE 1

| Compound | $R^1$ | $R^2$ | $R^3$ | $R^4$ |
|---|---|---|---|---|
| (A) | (2-1) p = 1, q = 1 | (4-1) | (3) | (2-1) p = 1, q = 1 |
| (B) | (2-1) p = 1, q = 2 | (4-1) | (3) | (2-1) p = 1, q = 2 |
| (C) | (2-2) r = 0, s = 1 | (4-1) | (3) | (2-2) r = 0, s = 1 |
| (D) | (2-3) t = 1, u = 0, v = 1 | (4-1) | (3) | (2-3) t = 1, u = 0, v = 1 |
| (E) | (2-1) p = 1, q = 1 | (4-1) | (3) | $—OCH_2CH(OH)CH_2OH$ |
| (F) | (2-1) p = 1, q = 1 | (4-1) | (3) | $—OCH_2CH(OH)CH_2OCH_2CH(OH)CH_2OH$ |
| (G) | (2-1) p = 2, q = 1 | (4-1) | (3) | (2-1) p = 2, q = 1 |
| (H) | (2-1) p = 1, q = 1 | (4-1) | (3) | (2-1) p = 2, q = 1 |
| (I) | (2-2) r = 1, s = 1 | (4-1) | (3) | (2-2) r = 1, s = 1 |
| (J) | (2-3) t = 1, u = 1, v = 1 | (4-1) | (3) | (2-3) t = 1, u = 1, v = 1 |
| (K) | (2-4) l = 2, m = 1, n = 1<br>X = allyl group | (4-1) | (3) | (2-4) l = 2, m = 1, n = 1<br>X = allyl group |
| (L) | (2-4) l = 1, m = 1, n = 1<br>X = p-methoxyphenyl group | (4-1) | (3) | (2-4) l = 1, m = 1, n = 1<br>X = p-methoxyphenyl group |

TABLE 2

| Compound | $R^1$ | $R^2$ | $R^3$ | $R^4$ |
|---|---|---|---|---|
| (M) | (2-1) p = 1, q = 1 | (4-1) | (3) | (2-4) l = 1, m = 1, n = 1<br>X = p-methoxyphenyl group |
| (N) | (2-4) l = 1, m = 1, n = 1<br>X = thienylethyl group | (4-1) | (3) | (2-4) l = 1, m = 1, n = 1<br>X = thienylethyl group |
| (O) | (2-4) l = 1, m = 1, n = 1<br>X = cyanoethyl group | (4-1) | (3) | (2-4) l = 1, m = 1, n = 1<br>X = cyanoethyl group |
| (P) | (2-1) p = 1, q = 1 | (4-1) | (3) | (2-4) l = 1, m = 1, n = 1<br>X = cyanoethyl group |
| (Q) | (2-4) l = 1, m = 1, n = 1<br>X = acetamidoethyl<br>group | (4-1) | (3) | (2-4) l = 1, m = 1, n = 1<br>X = acetamidoethyl group |
| (R) | (2-1) p = 1, q = 1 | (4-1) | (3) | (2-4) l = 1, m = 1, n = 1<br>X = acetamidoethyl group |
| (S) | (2-1) p = 1, q = 1 | (4-1) | $R^{3a}$ = (3-3) f = 2<br>$R^{3b}$ = (3)<br>$R^{3c}$ = (3-2) e = 2 | (2-1) p = 1, q = 1 |
| (T) | (2-1) p = 1, q = 1 | (4-1) | $R^{3a}$ = (3)<br>$R^{3b}$ = (3-3) f = 2<br>$R^{3c}$ = (3) | (2-1) p = 1, q = 1 |
| (U) | (2-1) p = 1, q = 1 | (4-1) | $R^{3a}$ = (3)<br>$R^{3b}$ = (3-1) d = 2<br>$R^{3c}$ = (3) | (2-1) p = 1, q = 1 |
| (V) | (2-1) p = 1, q = 1 | (4-1) | $R^{3a}$ = (3)<br>$R^{3b}$ = (3-4) g = 0<br>$R^{3c}$ = (3) | (2-1) p = 1, q = 1 |
| (W) | (2-1) p = 1, q = 1 | (4-1) | $R^{3a}$ = (3)<br>$R^{3b}$ = (3-4) g = 4<br>$R^{3c}$ = (3) | (2-1) p = 1, q = 1 |
| (X) | (2-1) p = 1, q = 1 | (4-2) | (3) | (2-1) p = 1, q = 1 |
| (Y) | (2-1) p = 1, q = 1 | (4-3) | (3) | (2-1) p = 1, q = 1 |
| (Z) | (2-1) p = 1, q = 1 | $R^{2a}$ = $R^{2d}$ = (4-2)<br>$R^{2b}$ = $R^{2c}$ = (4-1) | (3) | (2-1) p = 1, q = 1 |

Comparative Example 1

A compound represented by Formula (ZA) was synthesized by the method described in Patent Document 1.

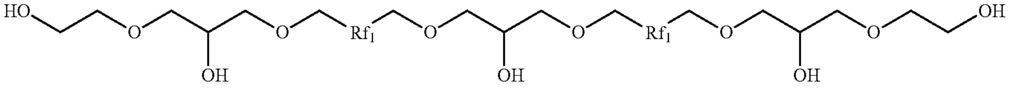

(ZA)

(in Formula (ZA), $Rf_1$ is the PFPE chain represented by Formula (4-1); and in the two $Rf_1$'s, h indicating an average degree of polymerization is 4.5 and i is 4.5.)

Comparative Example 2

A compound represented by Formula (ZB) was synthesized by the method described in Patent Document 2.

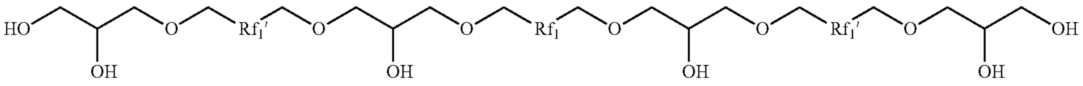

(ZB)

(in Formula (ZB), $Rf_1$ and $Rf_1'$ are each the PFPE chain represented by Formula (4-1); in $Rf_1$, h indicating an average degree of polymerization is 4.5 and i is 4.5; in the two $Rf_1'$, h indicating an average degree of polymerization is 7.0 and i is 0.)

Comparative Example 3

A compound represented by Formula (ZC) was synthesized by the method described in Patent Document 3.

(ZC)

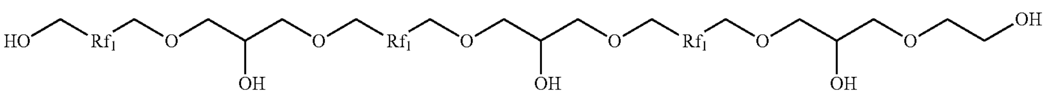

(in Formula (ZC), $Rf_1$ is the PFPE chain represented by Formula (4-1); in the three $Rf_1$'s, h indicating an average degree of polymerization is 4.5 and i is 4.5.)

Comparative Example 4

A compound represented by Formula (ZD) was synthesized by the method described in Patent Document 4.

(ZD)

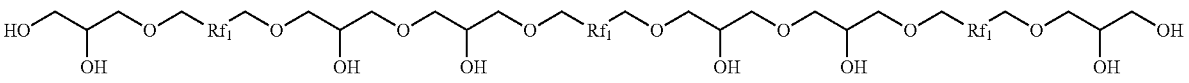

(in Formula (ZD), $Rf_1$ is the PFPE chain represented by Formula (4-1); in the three $Rf_1$'s, h indicating an average degree of polymerization is 7.0 and i is 0.)

Comparative Example 5

The compound represented by Formula (ZE) was obtained by a method shown below.

The same operation as in Example 24, except that in the end part producing step S1, one hydroxy group of a compound represented by $HOCH_2CF_2CF_2O(CF_2CF_2CF_2O)_jCF_2CF_2CH_2OH$ (in the formula, j indicating an average degree of polymerization is 4.5) was protected using dihydropyran, and the obtained compound was used as the intermediate compound 1a (=the intermediate compound 1b), was performed to obtain the compound (ZE).

(ZE)

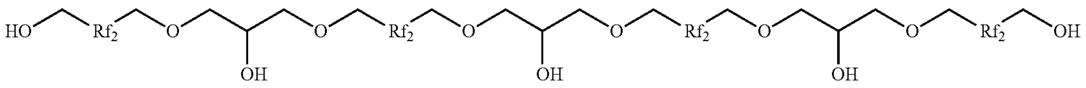

(in Formula (ZE), $R_f$ is the PFPE chain represented by Formula (4-2); and in the four $Rf_2$'s, j indicating an average degree of polymerization represents 4.5)

Furthermore, the compound (ZE) corresponds to the one resulting from extraction of only the compound having four PFPE chains from the mixture described in Examples of Patent Document 5.

Comparative Example 6

The compound represented by Formula (ZF) was obtained by a method shown below.

The same operation as in Example 24, except that the compound represented by Formula (5-5) was used instead of the compound represented by Formula (5-1), the compound represented by Formula (7-5) was used instead of the compound represented by Formula (7-1), and the compound represented by Formula (8-5) was used instead of the compound represented by Formula (8-1), was performed to obtain the compound (ZF).

(ZF)

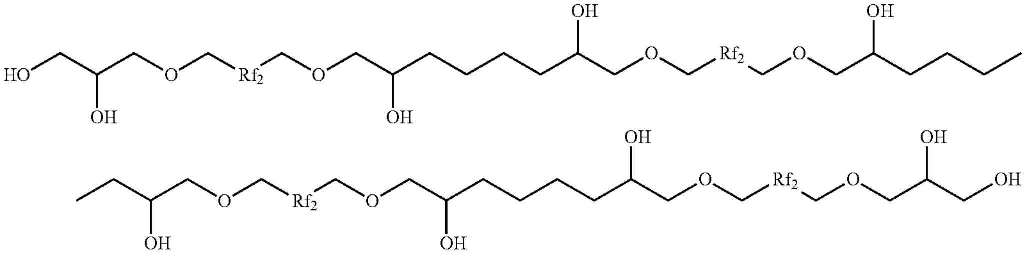

(in Formula (ZF), $Rf_2$ is the PFPE chain represented by Formula (4-2); and in the four $Rf_2$'s, j indicating an average degree of polymerization represents 4.5)

Furthermore, the compound (ZF) corresponds to the one resulting from extraction of only the compound having four PFPE chains from the mixture described in Examples of Patent Document 6.

Furthermore, the compound represented by Formula (7-5) was obtained by oxidizing one of carbon-carbon double bonds of 1,7-octadiene using m-chloroperbenzoic acid.

The number-average molecular weight (Mn) of the compounds of Examples 1 to 26 and Comparative Examples 1 to 6 obtained as above were measured by the above-described method. The results thereof are shown in Tables 3 and 4.

Next, a lubricating layer forming solution was prepared using the compounds obtained in Examples 1 to 26 and Comparative Examples 1 to 6 by a method shown below. Then, a lubricating layer of a magnetic recording medium was formed by a method shown below using the obtained lubricating layer forming solution, thereby obtaining a magnetic recording medium of each of Examples 1 to 26 and Comparative Examples 1 to 6.

"Lubricating Layer Forming Solution"

The compounds obtained in Examples 1 to 26 and Comparative Examples 1 to 6 were each dissolved in a fluorine-based solvent, Vertrel (registered trademark) XF (product name, manufactured by Mitsui DuPont Fluorochemicals Co., Ltd.), and diluted with Vertrel XF such that a film thickness in a case of being applied onto the protective layer was 9.0 Å to 9.5 Å, thereby obtaining a lubricating layer forming solution.

"Magnetic Recording Medium"

A magnetic recording medium in which an adhesion layer, a soft magnetic layer, a first underlayer, a second underlayer, a magnetic layer, and a protective layer had been sequentially provided on a substrate having a diameter of 65 mm was prepared. The protective layer was made of carbon.

The lubricating layer forming solutions of Examples 1 to 26 and Comparative Examples 1 to 6 were each applied on the protective layer of the magnetic recording medium, on which each of the layers up to the protective layer had been formed, by a dipping method. Furthermore, the dipping method was performed under the conditions of an immersion speed of 10 mm/sec, an immersion time of 30 sec, and a pulling-up speed of 1.2 mm/sec.

Thereafter, the magnetic recording medium on which the lubricating layer forming solution had been applied was placed in a thermostatic chamber and subjected to a thermal treatment at 120° C. for 10 minutes to remove the solvent in the lubricating layer forming solution and to improve the adhesion between the protective layer and the lubricating layer, thereby forming a lubricating layer on the protective layer to obtain a magnetic recording medium.

(Measurement of Film Thickness)

The film thickness of the lubricating layer contained in the magnetic recording medium of each of Examples 1 to 26 and Comparative Examples 1 to 6 obtained as above was measured using a Fourier transform infrared spectrophotometer (FT-IR, product name: Nicolet iS50, manufactured by Thermo Fisher Scientific). The results thereof are shown in Tables 3 and 4.

Next, the magnetic recording medium of each of Examples 1 to 26 and Comparative Examples 1 to 6 was subjected to a floating stability test and a corrosion resistance test, each shown below.

(Floating Stability Test)

The following glide test and credence measurement were performed, and the floating stability was evaluated based on the following evaluation criteria. The results thereof are shown in Tables 3 and 4.

"Glide Test"

In the glide test, it is examined whether or not the magnetic recording medium has protrusions on the surface. That is, in a case where a floating amount (an interval between the magnetic recording medium and the magnetic head) is a height equal to or more than the height of the protrusion on the surface of the magnetic recording medium at a time of performing recording and reproduction on the magnetic recording medium using the magnetic head, the magnetic head may collide with the protrusion to cause a damage to the magnetic head or a defect in the magnetic recording medium. In the glide test, the presence or absence of a protrusion having a height equal to or more than the floating amount of the front surface is examined for 50 magnetic recording media.

Specifically, an interval between the magnetic head for inspection and the magnetic recording medium was set to 0.25 microinches and the magnetic head for inspection was moved over the magnetic recording medium. In a case where a signal caused by the collision of the magnetic head for inspection with a protrusion on the surface of the magnetic recording medium was output from the magnetic head for inspection, the magnetic recording medium was determined to be a defective product, and otherwise, the magnetic recording medium was determined to be acceptable. Then, the evaluation was performed using the number of magnetic recording media determined to be acceptable among the 50 magnetic recording media.

"Credence Measurement"

In a case where the glide test is performed, noise temporarily increases, and in a plurality of measurements at the same location on the magnetic recording medium, a signal caused by a collision with a protrusion on the surface may be detected or may not be detected. Such a phenomenon is referred to as a credence. The credence is not detected as a protrusion in the glide test, and is not used to determine to be acceptable or not in the glide test. However, a temporary increase in noise in the glide test generally indicates the unevenness of the lubricant layer or the presence of a relatively soft foreign matter. Thus, the glide test was performed on the magnetic recording medium, and the total number of times that the credence was detected was divided by the number of magnetic recording media (50 magnetic recording media) on which the glide test was performed to calculate an average value of the credences, which was used as an index indicating the smoothness and the cleanliness of the lubricant layer.

"Evaluation Criteria"

A+: The number of the magnetic recording media that have passed the glide test is 45 or more and the average value of credences is less than 0.5.

A: The number of the magnetic recording media that have passed the glide test is 45 or more and the average value of credences is 0.5 or more and less than 1.0.

B: The number of the magnetic recording media that have passed the glide test is 45 or more and the average value of credences is 1.0 or more and less than 5.0.

C: The number of the magnetic recording media that have passed the glide test is 45 or more and the average value of credences is 5.0 or more.

D: The number of the magnetic recording media that have passed the glide test is less than 45.

(Corrosion Resistance Test)

The magnetic recording medium was exposed for 48 hours under the conditions of a temperature of 85° C. and a relative humidity of 90%. Thereafter, the number of the corrosion spots having a diameter of 5 microns or more generated on a surface of the magnetic recording medium was counted using an optical surface analyzer (Candela 7140 manufactured by KLA-Tencor Corporation), and evaluated based on the following evaluation criteria. The results thereof are shown in Tables 3 and 4.

"Evaluation Criteria"

A+: The number of the spots is less than 100.

A: The number of the spots is 100 or more and less than 200.

B: The number of the spots is 200 or more and less than 300.

C: The number of the spots is 300 or more and less than 1,000.

D: The number of the spots is 1,000 or more.

(Comprehensive Evaluations)

From the results of the floating stability test and the corrosion resistance test, a comprehensive evaluation was performed based on the following criteria.

[Comprehensive Evaluations]

A: Both the evaluation of the floating stability test and the evaluation of the corrosion resistance test were A+ or A.

B: One of the evaluation of the floating stability test and the evaluation of the corrosion resistance test was B, and the other was A+, A, or B.

C: One of the evaluation of the floating stability test and the evaluation of the corrosion resistance test was C, and the other was A+, A, B, or C.

D: At least one of the evaluation of the floating stability test and the evaluation of the corrosion resistance test was D.

TABLE 3

| | Compound | Molecular weight | Film thickness (Å) | Floating stability | Corrosion resistance | Comprehensive evaluation |
|---|---|---|---|---|---|---|
| Example 1 | (A) | 4,404 | 9.3 | A | A | A |
| Example 2 | (B) | 4,430 | 9.3 | A | A+ | A |
| Example 3 | (C) | 4,331 | 9.4 | A | A+ | A |
| Example 4 | (D) | 4,425 | 9.1 | A | A+ | A |
| Example 5 | (E) | 4,361 | 9.3 | A | A | A |
| Example 6 | (F) | 4,435 | 9.2 | A | A | A |
| Example 7 | (G) | 4,548 | 9.4 | A+ | B | B |
| Example 8 | (H) | 4,481 | 9.1 | A+ | A | A |
| Example 9 | (I) | 4,492 | 9.5 | A+ | A | A |
| Example 10 | (J) | 4,475 | 9.2 | A+ | A | A |
| Example 11 | (K) | 4,446 | 9.3 | A | A+ | A |
| Example 12 | (L) | 4,569 | 9.1 | B | A+ | B |
| Example 13 | (M) | 4,481 | 9.4 | A | A | A |
| Example 14 | (N) | 4,553 | 9.1 | B | A+ | B |
| Example 15 | (O) | 4,427 | 9.3 | A | A | A |
| Example 16 | (P) | 4,412 | 9.2 | A | A | A |
| Example 17 | (Q) | 4,494 | 9.0 | A+ | A | A |
| Example 18 | (R) | 4,451 | 9.4 | A | A | A |
| Example 19 | (S) | 4,425 | 9.1 | A | A+ | A |
| Example 20 | (T) | 4,416 | 9.3 | A | A+ | A |
| Example 21 | (U) | 4,453 | 9.2 | A+ | A | A |
| Example 22 | (V) | 4,402 | 9.2 | A+ | A | A |
| Example 23 | (W) | 4,471 | 9.2 | A | A | A |
| Example 24 | (X) | 4,408 | 9.4 | A | A | A |

TABLE 3-continued

| | Compound | Molecular weight | Film thickness (Å) | Floating stability | Corrosion resistance | Comprehensive evaluation |
|---|---|---|---|---|---|---|
| Example 25 | (Y) | 4,407 | 9.1 | A | A | A |
| Example 26 | (Z) | 3,301 | 9.2 | A | A | A |

TABLE 4

| | Compound | Molecular weight | Film thickness (Å) | Floating stability | Corrosion resistance | Comprehensive evaluation |
|---|---|---|---|---|---|---|
| Comparative Example 1 | (ZA) | 2,288 | 9.4 | C | B | C |
| Comparative Example 2 | (ZB) | 3,243 | 9.3 | C | C | C |
| Comparative Example 3 | (ZC) | 3,201 | 9.1 | D | C | D |
| Comparative Example 4 | (ZD) | 3,415 | 9.2 | C | D | D |
| Comparative Example 5 | (ZE) | 4,183 | 9.2 | D | C | D |
| Comparative Example 6 | (ZF) | 4,611 | 9.1 | D | C | D |

As shown in Table 3, for all the magnetic recording media of Examples 1 to 26, the evaluation results in all the evaluation items were A+, A, or B, and the comprehensive evaluation was A or B. Thus, it was confirmed that the lubricating layers of the magnetic recording media of Examples 1 to 26 had good floating stability of a magnetic head and a high corrosion suppressing effect on a magnetic recording medium.

In particular, for the lubricating layers of the magnetic recording media of Examples 7 to 10, 17, 21, and 22 using the compounds (G) to (J), (Q), (U), and (V), the evaluation of the floating stability was A+, which was good.

In the compounds (G) to (J), the total number of the hydroxy groups in the compound is 8 or more, three $R^3$'s each represent Formula (3), and carbon atoms to which hydroxy groups are bonded in both terminal groups are bonded to each other through a linking group including carbon atoms to which hydroxy groups are not bonded. Therefore, it is considered that in Examples 7 to 10 in which the compounds (G) to (J) were used, lubricating layers having a high adsorption force of the entire molecule with respect to the protective layer, better adhesion to the protective layer, and more excellent floating stability were obtained.

In addition, the compound (Q) has a group having an amide bond with high polarity at both terminals. Therefore, it is considered that in Example 17 in which the compound (Q) was used, a lubricating layer having a high adsorption force on the protective layer and better floating stability was obtained.

In addition, in the compounds (U) and (V), the total number of the hydroxy groups in the compound is 8 or more, the number of the hydroxy groups included in $R^{3b}$ is 2, and at both terminal groups, carbon atoms to which hydroxy groups are bonded are bonded to each other through a linking group including carbon atoms to which hydroxy groups are not bonded. Since $R^{3b}$ is represented by Formula (3-1) and d is 2 in the compound (U), and $R^{3b}$ is represented by Formula (3-4) and g is 0 in the compound (V), the structure between carbon atoms to which two hydroxy groups in $R^{3b}$ are bonded is flexible, and the two hydroxy groups in $R^{3b}$ easily interact with the protective layer. Therefore, it is considered that in Examples 21 and 22 in which the compounds (U) and (V) were used, lubricating layers having a high adsorption force of the entire molecule with respect to the protective layer, good adhesion to the protective layer, and more excellent floating stability were obtained.

In all of Compounds (L), (N), (O), and (Q) used in Examples 12, 14, 15, and 17, the total number of the hydroxy groups in the compound was 5. Among these, in Examples 15 and 17 in which the compound (O) and the compound (Q) were used, the floating stability was better, as compared with Examples 12 and 14. This is presumed to be because the cyano group contained in the compound (O) and the group having an amide bond contained in the compound (Q) have high polarity and can interact with both a locally charged site and a site having charges distributed widely on the protective layer.

In addition, in the lubricating layers of the magnetic recording media of Examples 2 to 4, 11, 12, 14, 19, and 20 in which the compounds (B) to (D), (K), (L), (N), (S), and (T) were used, the evaluation of the corrosion resistance was A+, which was particularly good.

$R^1$ and $R^4$ of the compounds (B) and (D) have a structure in which one methylene group is extended with respect to $R^1$ and $R^4$ of the compound (A). In addition, $R^3$ of the compounds (S) and (T) has a structure in which one or two of $R^3$'s of the three $R^3$'s of the compound (A) are extended by one methylene group. In this way, the compounds (B), (D), (S), and (T) have a structure in which the methylene group is extended, and thus, have high hydrophobicity of the entire molecule, as compared with the compound (A). Therefore, it is considered that Examples 2, 4, 19, and 20 have high evaluations of the corrosion resistance, as compared with Example 1.

$R^1$ and $R^4$ of the compound (C) have a structure with less ether bonds, as compared with $R^1$ and $R^4$ of the compound (A). As a result, the compound (C) has high hydrophobicity of the entire molecule, as compared with the compound (A). Therefore, it is considered that Example 3 has a good evaluation of the corrosion resistance, as compared with Example 1.

In addition, the compounds (K), (L), and (N) have any of a highly hydrophobic allyl group, a methoxyphenyl group, and a thienylethyl group at both terminals. Therefore, the compounds (K), (L), and (N) have high hydrophobicity of the entire molecule, as compared with the compound (A). As a result, it is considered that Examples 11, 12, and 14 have high evaluations of corrosion resistance, as compared with Example 1.

All of the compounds (G), (I), and (J) used in Examples 7, 9, and 10 had three hydroxy groups in both $R^1$ and $R^4$. Among these, in Examples 9 and 10 in which the compounds (I) and (J) were used, the corrosion resistance was better, as compared with Example 7 in which the compound (G) was used. This is considered to be because the compounds (I) and (J) have high hydrophobicity of the entire molecule, as compared with the compound (G).

More specifically, $R^1$ and $R^4$ of the compound (I) have less ether bonds, as compared with $R^1$ and $R^4$ of the compound (G). In addition, $R^1$ and $R^4$ of the compound (J) have a structure in which one methylene group is extended, as compared with $R^1$ and $R^4$ of the compound (G). Thus, it is presumed that the compounds (I) and (J) have high hydrophobicity of the entire molecule, as compared with the compound (G).

In addition, as shown in Table 4, in Comparative Example 1 in which the compound (ZA) having a skeleton where two perfluoropolyether chains were bonded through a glycerin structure ($—OCH_2CH(OH)CH_2O—$) was used, the evaluation of the floating stability was C and the comprehensive evaluation was C. In addition, in Comparative Examples 2 to 4 in which the compound (ZB) to (ZD) having a skeleton where three perfluoropolyether chains were bonded through two divalent linking groups was used, both the evaluation of the floating stability and the evaluation of the corrosion resistance were C or D.

It is presumed that the results of Comparative Examples 1 to 4 are due to the small number of perfluoropolyether chains in the compounds (ZA) to (ZD) and the small number of divalent linking groups that are arranged between the perfluoropolyether chains. Thus, it is considered that the compounds (ZA) to (ZD) have insufficient adhesion (adsorption force) to the protective layer.

In addition, in Comparative Example 5, the evaluation of the floating stability was D and the evaluation of the corrosion resistance was C. In Comparative Example 5, the compound (ZE) having a skeleton where four perfluoropolyether chains were bonded through three glycerin structures ($—OCH_2CH(OH)CH_2O—$), in which hydroxy groups were bonded to both sides of the skeleton through methylene groups, was used. In the compound (ZE), the terminal hydroxy group is bonded to the methylene group to which the perfluoropolyether chain is bonded. Therefore, the terminal hydroxy group has high acidity, and the terminal portion of the fluorine-containing ether compound cannot be sufficiently adsorbed to the protective layer. Thus, it is considered that the lubricating layer of Comparative Example 5 resulted in poor adhesion to the protective layer, and remarkably deteriorated floating stability and corrosion resistance of the magnetic head.

Furthermore, in Comparative Example 6, the evaluation of the floating stability was D and the evaluation of the corrosion resistance was C. In Comparative Example 6, the compound (ZF) having a skeleton where four perfluoropolyether chains were bonded through three linking groups having 8 carbon atoms and two hydroxy groups was used. In the compound (ZF), all three linking groups arranged among the four perfluoropolyether chains have a relatively rigid structure having alkylene groups having 4 carbon atoms between carbon atoms to which hydroxy groups are bonded, and do not have a glycerin structure ($—OCH_2CH(OH)CH_2O—$) having excellent flexibility. Therefore, all three linking groups of the compound (ZF) cannot move flexibly, and the hydroxy groups contained in each of the three linking groups cannot be sufficiently adsorbed to the protective layer. This is considered to result in the lubricating layer of Comparative Example 6 having poor adhesion, and remarkably deteriorated floating stability and corrosion resistance of a magnetic head.

INDUSTRIAL APPLICABILITY

By using the lubricant for a magnetic recording medium, including the fluorine-containing ether compound of the present invention, it is possible to form a lubricating layer having excellent adhesion, good floating stability of a magnetic head, and a high corrosion suppressing effect on a magnetic recording medium even in a case where the thickness is small.

REFERENCE SIGNS LIST

10: magnetic recording medium
11: substrate
12: adhesion layer
13: soft magnetic layer
14: first underlayer
15: second underlayer
16: magnetic layer
17: protective layer
18: lubricating layer

What is claimed is:

1. A fluorine-containing ether compound represented by Formula (1), $$R^1—CH_2—R^{2a}—CH_2—R^{3a}—CH_2—R^{2b}—CH—R^{3b}—CH_2—R^{2c}—CH_2—R^{3c}—CH_2—R^{2a}—CH_2—R^4 \quad (1)$$

(in Formula (1), $R^{2a}$, $R^{2b}$, $R^{2c}$, and $R^{2d}$ are each a perfluoropolyether chain; $R^{3a}$, $R^{3b}$, and $R^{3c}$ are each a divalent linking group having one or more polar groups; at least one of $R^{3a}$, $R^{3b}$, and $R^{3c}$ is represented by Formula (3); and R1 and R4 are each a terminal group having 1 to 50 carbon atoms and one or more polar groups, and may be the same as or different from each other)

$$—OCH_2CH(OH)CH_2O— \quad (3).$$

2. The fluorine-containing ether compound according to claim 1, wherein at least one of $R^1$ and $R^4$ in Formula (1) is a terminal group of any of Formulae (2-1) to (2-4), (2-1)

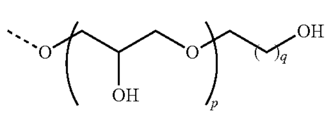

(2-2)

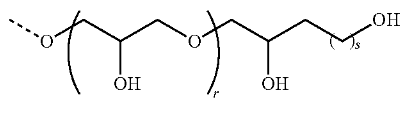

-continued (2-3)

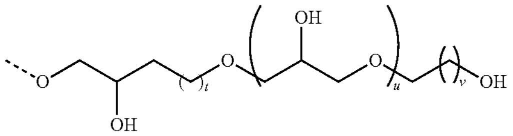

(2-4)

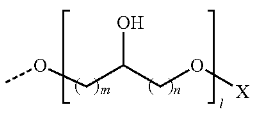

(in Formula (2-1), p represents an integer of 1 to 3, and q represents an integer of 1 to 3)

(in Formula (2-2), r represents an integer of 0 to 2, and s represents an integer of 1 to 3)

(in Formula (2-3), t represents an integer of 1 to 3, u represents an integer of 0 to 2, and v represents an integer of 1 to 3)

(in Formula (2-4), l represents an integer of 1 to 3, m represents an integer of 1 to 4, and n represents an integer of 1 to 4; and X represents an organic group including a double bond or a triple bond).

3. The fluorine-containing ether compound according to claim 1, wherein all of the polar groups contained in $R^{3a}$, $R^{3b}$, and $R^{3c}$ in Formula (1) are hydroxy groups.

4. The fluorine-containing ether compound according to claim 1, wherein a total number of hydroxy groups contained in $R^1$ and hydroxy groups contained in $R^4$ in Formula (1) is 2 to 6.

5. The fluorine-containing ether compound according to claim 1, wherein all of $R^{3a}$, $R^{3b}$, and $R^{3c}$ in Formula (1) are represented by Formula (3).

6. The fluorine-containing ether compound according to claim 1, wherein one or two of $R^{3a}$, $R^{3b}$, and $R^{3c}$ in Formula (1) are divalent linking groups that are not Formula (3), and the divalent linking groups that are not Formula (3) are each independently a divalent linking group having one to three hydroxy groups and 4 to 9 carbon atoms.

7. The fluorine-containing ether compound according to claim 6, wherein the divalent linking groups that are not Formula (3) are each independently a linking group represented by any of Formulae (3-1) to (3-4) and arranged between two perfluoropolyether chains selected from $R^{2a}$, $R^{2b}$, $R^{2c}$, and $R^{2d}$, (3-1)

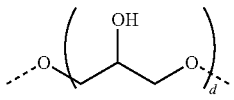

(3-2)

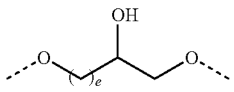

(3-3)

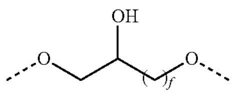

-continued (3-4)

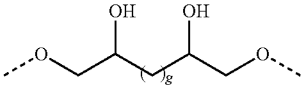

(in Formula (3-1), d represents 2 or 3)

(in Formula (3-2), e represents an integer of 2 to 4; in Formula (3-2), an oxygen atom on a left side is bonded to the perfluoropolyether chain having a side chain containing $R^1$ at the end in Formula (1) through the methylene group, and an oxygen atom on a right side is bonded to the perfluoropolyether chain having a side chain containing $R^4$ at the end in Formula (1) through the methylene group)

(in Formula (3-3), f represents an integer of 2 to 4; in Formula (3-3), an oxygen atom on a left side is bonded to the perfluoropolyether chain having a side chain containing $R^1$ at the end in Formula (1) through the methylene group, and an oxygen atom on a right side is bonded to the perfluoropolyether chain having a side chain containing $R^4$ at the end in Formula (1) through the methylene group) (in Formula (3-4), g represents an integer of 0 to 4).

8. The fluorine-containing ether compound according to claim 1, wherein in Formula (1), $R^{2a}$ and $R^{2d}$ are the same as each other, $R^{2b}$ and $R^{2c}$ are the same as each other, atoms included in $R^{3a}$ and atoms included in $R^{3c}$ are symmetrically arranged with respect to $R^{3b}$, and $R^1$ and $R^4$ are the same as each other, $R^{3b}$ is represented by any of the Formula (3) and the Formulae (3-1) to (3-4), the fluorine-containing ether compound comprises:

a compound in which $R^{3a}$ and $R^{3c}$ are each represented by Formula (3):

a compound in which $R^{3a}$ and $R^{3c}$ are each represented by Formula (3-1) and the values of d in Formula (3-1) are the same; a compound in which one of $R^{3a}$ and $R^{3c}$ is represented by Formula (3-2), and the other is represented by Formula (3-3), and e in Formula (3-2) and f in Formula (3-3) have the same value; or a compound in which $R^{3a}$ and $R^{3c}$ are each represented by Formula (3-4) and the values of g in Formula (3-4) are the same.

9. The fluorine-containing ether compound according to claim 5, wherein $R^{2a}$, $R^{2b}$, $R^{2c}$, and $R^{2d}$ in Formula (1) are entirely the same as each other, all of $R^{3a}$, $R^{3b}$, and $R^{3c}$ are represented by Formula (3), and $R^1$ and $R^4$ are the same as each other.

10. The fluorine-containing ether compound according to claim 1, wherein $R^{2a}$, $R^{2b}$, $R^{2c}$, and $R^{2d}$ in Formula (1) are each independently any one selected from perfluoropolyether chains represented by Formulae (4-1) to (4-4), $$-CF_2-(OCF_2CF_2)_h-(OCF_2)_i-OCF_2- \quad (4-1)$$

(in Formula (4-1), h and i each indicate an average degree of polymerization, h represents 1 to 20, and i represents 0 to 20)

$$-CF_2CF_2-(OCF_2CF_2CF_2)_j-OCF_2CF_2- \quad (4-2)$$

(in Formula (4-2), j indicates an average degree of polymerization and represents 1 to 15)

$$-CF_2CF_2CF_2-(OCF_2CF_2CF_2CF_2)_k-OCF_2CF_2CF_2- \quad (4-3)$$

(in Formula (4-3), k indicates an average degree of polymerization and represents 1 to 10)

$$-(CF_2)_{w7}-O-(CF_2CF_2CF_2O)_{w8}-(CF_2CF_2O)_{w9}-(CF_2)_{w10}- \quad (4\text{-}4)$$

(in Formula (4-4), w8 and w9 each indicate an average degree of polymerization and each independently represent 1 to 20; and w7 and w10 are each an average value indicating the number of $CF_2$'s and each independently represent 1 or 2).

11. The fluorine-containing ether compound according to claim 1, wherein the fluorine-containing ether compound has a number-average molecular weight in a range of 500 to 10,000.

12. A lubricant for a magnetic recording medium, comprising:

the fluorine-containing ether compound according to claim 1.

13. A magnetic recording medium comprising, in the following order, on a substrate, at least:

a magnetic layer;

a protective layer; and a lubricating layer, wherein the lubricating layer includes the fluorine-containing ether compound according to claim 1.

14. The magnetic recording medium according to claim 13, wherein an average film thickness of the lubricating layer is 0.5 nm to 2.0 nm.

15. A method for producing the fluorine-containing ether compound according to claim 1, the method comprising:

an end part producing step of producing an intermediate compound 1a having a group corresponding to $R^1-CH_2-R^{2a}-CH_2-$ in Formula (1) and an intermediate compound 1b having a group corresponding to $-CH_2-R^{2d}-CH_2-R^4$ in Formula (1);

a linked structure producing step of producing an intermediate compound 3 having a group corresponding to $-R^{3a}-CH_2-R^{2b}-CH_2-R^{3b}-CH_2-R^{2c}-CH_2-R^{3c}-$ in Formula (1); and a compound structure producing step including an $R^1$-side reaction step of reacting an $R^{3a}$-side end part of the intermediate compound 3 with the intermediate compound 1a, and an $R^4$-side reaction step of reacting an $R^{3c}$-side end part of the intermediate compound 3 with the intermediate compound 1b, wherein the linked structure producing step includes: a linking end part producing step of producing an intermediate compound 2a having a group corresponding to $-R^{3a}-CH_2-R^{2b}-CH_2-$ in Formula (1) and an intermediate compound 2b having a group corresponding to $-CH_2-R^{2c}-CH_2-R^{3c}-$ in Formula (1); an $R^{2b}$-side reaction step of reacting an $R^{2b}$-side end part of a compound having a group corresponding to $R^{3b}$ in Formula (1) with the intermediate compound 2a; and an $R^{2c}$-side reaction step of reacting an $R^{2c}$-side end part of the compound having a group corresponding to $R^{3b}$ with the intermediate compound 2b, and in the end part producing step, the intermediate compound 1a is produced by reacting $R^{2a}$ and the epoxy compound having a group corresponding to $R^1$ in Formula (1), and the intermediate compound 1b is produced by reacting $R^{2d}$ and the epoxy compound having a group corresponding to $R^4$ in Formula (1), in the linked structure producing step, the intermediate compound 2a is produced by reacting $R^{2b}$ and a compound having a group corresponding to $R^{3a}$ in Formula (1), and the intermediate compound 2b is produced by reacting $R^{2c}$ and a compound having a group corresponding to $R^{3c}$ in Formula (1), and the compound structure producing step comprises:

a step of reacting the intermediate compound 1a and the epoxy group corresponding to $R^{3a}$ present at the terminal of the intermediate compound 3:

a step of reacting the intermediate compound 1b and the epoxy group corresponding to $R^{3c}$ present at the terminal of the intermediate compound 3.

16. The method for producing a fluorine-containing ether compound according to claim 15, wherein in Formula (1), $R^{2a}$ and $R^{2d}$ are the same as each other, $R^{2b}$ and $R^{2c}$ are the same as each other, atoms included in $R^{3a}$ and atoms included in $R^{3c}$ are symmetrically arranged with respect to $R^{3b}$, and $R^1$ and $R^4$ are the same as each other, in the end part producing step, the intermediate compound 1a and the intermediate compound 1b are produced at the same time, in the linking end part producing step, the intermediate compound 2a and the intermediate compound 2b are produced at the same time, and the $R^{2b}$-side reaction step and the $R^{2c}$-side reaction step are performed at the same time, and in the compound structure producing step, the $R^1$-side reaction step and the $R^4$-side reaction step are performed at the same time.

* * * * *